US012773844B2

(12) United States Patent
Tominaga et al.

(10) Patent No.: US 12,773,844 B2
(45) Date of Patent: Oct. 27, 2026

(54) DECORATIVE SHEET AND DECORATIVE MATERIAL

(71) Applicant: TOPPAN INC., Tokyo (JP)

(72) Inventors: Takashi Tominaga, Tokyo (JP); Takashi Orihara, Tokyo (JP); Aya Akashi, Tokyo (JP); Mayuko Fujisawa, Tokyo (JP); Kensuke Kuwamura, Tokyo (JP); Shota Noguchi, Tokyo (JP)

(73) Assignee: TOPPAN INC., Tokyo (JP)

( * ) Notice: Subject to any disclaimer, the term of this patent is extended or adjusted under 35 U.S.C. 154(b) by 451 days.

(21) Appl. No.: 18/370,769

(22) Filed: Sep. 20, 2023

(65) Prior Publication Data

US 2024/0017536 A1 Jan. 18, 2024

Related U.S. Application Data

(63) Continuation of application No. PCT/JP2022/009808, filed on Mar. 7, 2022.

(30) Foreign Application Priority Data

Mar. 24, 2021 (JP) ................................ 2021-050735
Feb. 9, 2022 (JP) ................................ 2022-018710
(Continued)

(51) Int. Cl.
*B32B 27/32* (2006.01)
*B32B 7/12* (2006.01)
(Continued)

(52) U.S. Cl.
CPC ................ *B32B 27/32* (2013.01); *B32B 7/12* (2013.01); *B32B 27/20* (2013.01); *B32B 27/308* (2013.01);
(Continued)

(58) Field of Classification Search
CPC ... B32B 27/32; B32B 27/327; B32B 2323/04; B32B 2323/043; B32B 2323/046;
(Continued)

(56) References Cited

U.S. PATENT DOCUMENTS

2018/0186135 A1* 7/2018 Higashikawa ....... C08K 5/0083
2020/0079939 A1 3/2020 Müller et al.

FOREIGN PATENT DOCUMENTS

JP H09-011410 A 1/1997
JP H10-071683 A 3/1998
(Continued)

OTHER PUBLICATIONS

Machine Translation of JP 2010-162748 (Year: 2010).*
(Continued)

*Primary Examiner* — Zachary M Davis
(74) *Attorney, Agent, or Firm* — Foley & Lardner LLP

(57) ABSTRACT

A decorative material including a substrate and a decorative sheet laminated on at least one side of the substrate is provided. The decorative sheet includes a colored substrate layer; and a transparent resin layer laminated on one side of the colored substrate layer, where the transparent resin layer is made of a resin composition containing plant-derived high-density polyethylene, and a nucleating agent is added to the resin composition containing the high-density polyethylene.

11 Claims, 1 Drawing Sheet

(30) Foreign Application Priority Data

Feb. 21, 2022 (JP) ................................ 2022-024450
Feb. 22, 2022 (JP) ................................ 2022-025812
Feb. 22, 2022 (JP) ................................ 2022-025813
Feb. 22, 2022 (JP) ................................ 2022-025814
Feb. 25, 2022 (JP) ................................ 2022-028098
Feb. 25, 2022 (JP) ................................ 2022-028099

(51) Int. Cl.
*B32B 27/20* (2006.01)
*B32B 27/30* (2006.01)

(52) U.S. Cl.
CPC . *B32B 2307/4026* (2013.01); *B32B 2307/412* (2013.01); *B32B 2307/7376* (2023.05); *B32B 2451/00* (2013.01)

(58) Field of Classification Search
CPC ........ C08G 18/10; C08G 18/12; C08G 18/32; C08G 18/3203; C08G 18/3206; C08G 18/3221; C08G 18/48; C08G 18/4825; C08G 18/4829; C08G 18/4854; C08G 18/4858; C08G 18/15021; C08G 18/5036; C08G 18/5045; C08G 18/5048
See application file for complete search history.

(56) References Cited

FOREIGN PATENT DOCUMENTS

| | | | | |
|---|---|---|---|---|
| JP | 2000-343667 | A | | 12/2000 |
| JP | 2003-266549 | A | | 9/2003 |
| JP | 2008-080703 | A | | 4/2008 |
| JP | 2008-195959 | A | | 8/2008 |
| JP | 2008-238780 | A | | 10/2008 |
| JP | 2010-052305 | A | | 3/2010 |
| JP | 2010-162748 | A | † | 7/2010 |
| JP | 2011-225863 | A | | 11/2011 |
| JP | 2012-066505 | A | | 4/2012 |
| JP | 2012-240399 | A | | 12/2012 |
| JP | 2012-251006 | A | | 12/2012 |
| JP | 2013-022836 | A | | 2/2013 |
| JP | 2014-188941 | A | | 10/2014 |
| JP | 2016-168786 | A | | 9/2016 |
| JP | 2016-196151 | A | † | 11/2016 |
| JP | 2017-105889 | A | | 6/2017 |
| JP | 2017-164942 | A | | 9/2017 |
| JP | 2017-171941 | A | | 9/2017 |
| JP | 2017-193722 | A | | 10/2017 |
| JP | 2017-226849 | A | | 12/2017 |
| JP | 2018-167860 | A | | 11/2018 |
| JP | 2019-001856 | A | | 1/2019 |
| JP | 2019-038195 | A | | 3/2019 |
| JP | 2020-055160 | A | | 4/2020 |
| JP | 2020-055179 | A | | 4/2020 |
| JP | 2020-056194 | A | | 4/2020 |
| JP | 2020-157501 | A | | 10/2020 |
| JP | 2020-179553 | A | | 11/2020 |
| JP | 2021-008569 | A | | 1/2021 |
| JP | 2021-084271 | A | | 6/2021 |
| JP | 2021-154629 | A | | 10/2021 |
| JP | 2021-176684 | A | | 11/2021 |
| JP | 2021-536526 | A | | 12/2021 |
| JP | 7006821 | B1 | | 1/2022 |
| JP | 2022-151878 | A | | 10/2022 |
| JP | 7156563 | B2 | | 10/2022 |
| WO | WO-98/06568 | A1 | | 2/1998 |
| WO | WO-2014/065380 | A1 | | 5/2014 |
| WO | WO-2017/038472 | A1 | | 3/2017 |
| WO | WO-2020/049366 | A1 | | 3/2020 |

OTHER PUBLICATIONS

Machine Translation of JP 2011-225863 (Year: 2011).*
Machine Translation of JP 2020-055160 (Year: 2020).*
European Extended Search Report issued in corresponding European Patent Application No. 22775053.6 dated Jan. 27, 2025.
Office Action issued in corresponding Japanese Patent Application No. 2022-196921 dated Jan. 24, 2023 (8 pages).
Notice of Opposition issued in corresponding Japanese Patent Opposition No. 2023-700558 dated Jun. 26, 2023 (5 pages).
Office Action issued in corresponding Japanese Patent Application No. 2021-050735 dated Sep. 14, 2021 (5 pages).
Office Action issued in corresponding Japanese Patent Application No. 2022-034792 dated Nov. 14, 2023 (5 pages).
International Searching Authority, "International Search Report," issued in connection with International Patent Application No. PCT/JP2022/009808, dated May 24, 2022.
International Searching Authority, "Written Opinion," issued in connection with International Patent Application No. PCT/JP2022/009808, dated May 24, 2022.
Chemistry Dictionary, Tokyo Kagaku Dojin, 1st edition, pp. 1368-1369, "Polyethylene" entry, published Oct. 1, 1994.
Office Action issued in corresponding Japanese Patent Application No. 2024-700923 dated Oct. 18, 2024.
Practical Plastics Dictionary, p. 17, table 1-7, Industrial Research Institute, first edition published on May 1, 1993.
Office Action issued in corresponding Korean Patent Application No. 10-2023-7034203 dated Sep. 29, 2025.
Office Action issued in corresponding Japanese Patent Application No. 2022-125477 dated Feb. 12, 2025.
Office Action issued in corresponding Chinese Patent Application No. 202280023429.5 dated May 1, 2025.
Office Action issued in corresponding Japanese Patent Application No. 2022-025813 dated Mar. 3, 2026.
Office Action issued in corresponding Japanese Patent Application No. 2022-018710 dated May 19, 2026.
Office Action issued in corresponding Japanese Patent Application No. 2022-025813 dated May 19, 2026.
Office Action issued in corresponding Japanese Patent Application No. 2022-028098 dated May 12, 2026.
Office Action issued in corresponding Japanese Patent Application No. 2022-028099 dated May 19, 2026.
Aqdas et al., "Bio-based polyurethane: An efficient and environment friendly coating systems: A review", Progress in Organic Coatings , vol. 91, Feb. 2016, pp. 25-32.†
Tawade, Bhausaheb et al., "Bio-Based Di-/Poly-isocyanates for Polyurethanes: An Overview", Polyurethanes Today, Dec. 2017, pp. 41-46.†
Salzano de Luna, Martina, "Recent Trends in Waterborne and Bio-Based Polyurethane Coatings for Corrosion Protection," Advanced Materials Interfaces, published online Feb. 7, 2022 (see p. 11 of the document).†

* cited by examiner
† cited by third party

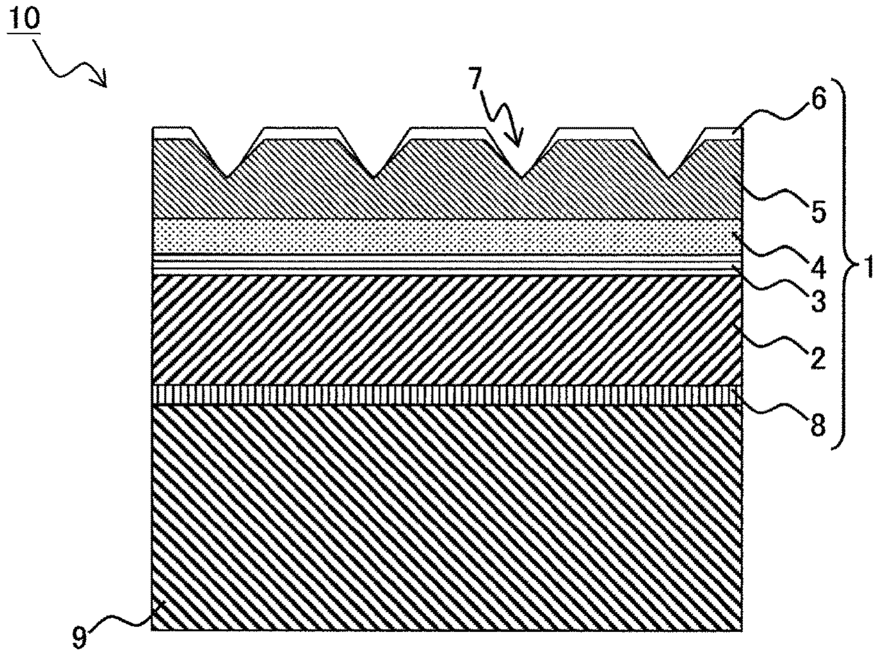
10
7
6
5
4
3
2
8
1
9

DECORATIVE SHEET AND DECORATIVE MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/009808, filed on Mar. 7, 2022, which is based upon and claims the benefit of priority to Japanese Patent Application No. 2021-050735, filed on Mar. 24, 2021, to Japanese Patent Application No. 2022-018710, filed on Feb. 9, 2022, to Japanese Patent Application No. 2022-024450, filed on Feb. 21, 2022, to Japanese Patent Application No. 2022-025812, filed on Feb. 22, 2022, to Japanese Patent Application No. 2022-025813, filed on Feb. 22, 2022, to Japanese Patent Application No. 2022-025814, filed on Feb. 22, 2022, to Japanese Patent Application No. 2022-028098, filed on Feb. 25, 2022, to Japanese Patent Application No. 2022-028099, filed on Feb. 25, 2022, the disclosures of which are incorporated herein by reference in their entirety.

TECHNICAL FIELD

The present invention relates to a decorative sheet and a decorative material.

BACKGROUND

As disclosed in, for example, PTL 1, decorative sheets that use olefin-based resin have been proposed as an alternative to polyvinyl chloride decorative sheets.

[Citation List] [Patent Literature] [PTL 1] JP 2014-188941 A

SUMMARY OF THE INVENTION

Technical Problem

In recent years, in view of environmental issues, there has been a demand to change the materials of decorative sheets from the conventional petroleum-derived materials to plant-derived materials. However, when biomass polyethylene is used as a plant-derived material that can be used for a decorative sheet, the surface hardness becomes too low to be used as a decorative sheet.

To address the problems described above, an object of the present invention is to provide a decorative sheet and decorative material capable of suppressing a decrease in surface hardness even when they are formed using a plant-derived material.

Solution to Problem

To attempt to improve or solve the above problems, an aspect of the present invention is a decorative sheet including: a colored substrate layer having a first surface and a second surface opposite the first surface; and a transparent resin layer laminated on the first surface of the colored substrate layer, wherein the transparent resin layer is made of a resin composition containing plant-derived high-density polyethylene, and a nucleating agent is added to the resin composition containing the high-density polyethylene.

Also, to attempt to improve or solve the above problems, an aspect of the present invention is a decorative material that includes a substrate having a first surface and a second surface opposite the first surface, and a decorative sheet laminated on at least one of the first and second surfaces of the substrate.

Advantageous Effects of the Invention

According to aspects of the present invention, a decorative sheet and a decorative material capable of suppressing a decrease in surface hardness can be provided even when they are formed using a plant-derived high-density polyethylene, which is a plant-derived material.

BRIEF DESCRIPTION OF THE DRAWINGS

The FIGURE is a cross-sectional view illustrating the structures of a decorative sheet and a decorative material according to the first embodiment of the present invention.

DETAILED DESCRIPTION

With reference to the drawings, hereinafter are described some embodiments of the present technique. In the following description of the drawings, components identical with or similar to each other are given the same or similar reference signs, and will not be described repeatedly. The drawings are schematic, and items may be illustrated differently from how they are in reality. The embodiments described below only exemplify a device or a method embodying the technical idea of the present technique. The technical idea of the present technique is not limited to the devices or methods exemplified by the embodiments described below. The technical idea of the present technique can be modified variously within the technical scope defined by the claims. Also, “left and right” directions and “upper and lower” directions in the following description are merely a definition for convenience of description, and do not restrict the technical idea of the present invention. Therefore, for example, “left and right” and “upper and lower” are interchanged with each other if the paper sheet is rotated by 90 degrees, and “left” becomes “right” while “right” becomes “left” if the paper sheet is rotated by 180 degrees.

First Embodiment

The structure of a decorative material 10 will be described with reference to the FIGURE.

As shown in the FIGURE, the decorative material 10 includes a decorative sheet 1 and a substrate 9. The specific structure of the decorative sheet 1 will be described later.

The substrate 9 is formed of a plate using, for example, a wooden board, inorganic board, or a metal plate, and the decorative sheet 1 is laminated on one side (the upper side in the FIGURE) thereof. That is, the decorative material 10 includes the substrate 9 and the decorative sheet 1 laminated on one side thereof (Structure of Decorative Sheet)

As shown in the FIGURE, the decorative sheet 1 includes a colored substrate layer 2, a pattern layer 3, an adhesive layer 4, a transparent resin layer 5, a surface protection layer 6, an uneven part 7, and a primer layer 8.

<Colored Substrate Layer>

The colored substrate layer 2 is formed with a thermoplastic resin.

The thermoplastic resin forming the colored substrate layer 2 may be, for example, a colored thermoplastic polyolefin-based resin. Examples of polyolefin-based resins include one or a mixture, copolymer, composite, laminate, or the like of two or more of polyolefin resins such as polyethylene, polypropylene, polymethylpentene, polybutene, ethylene-propylene copolymers, ethylene-α-olefin copolymers, and propylene-α-olefin copolymers; and polyolefin-based resins such as ethylene-vinyl acetate copolymers, ethylene-vinyl alcohol copolymers, ethylene-(meth)acrylic acid (ester) copolymers, and metal-neutralized ethylene-unsaturated carboxylic acid copolymers (ionomers).

The polyolefin-based resin may be selected from the types described above according to the purpose of use of the decorative sheet 1 and other factors as appropriate. In particular, polypropylene-based resins, that is, a homopolymer or a copolymer containing propylene as the main component is most suited for general use. For example, a homopolypropylene resin, random polypropylene resin, block polypropylene resin, or the like may be used alone or appropriately mixed, and a resin in which atactic polypropylene is appropriately additionally mixed with these resins may be used. The polyolefin resin may be a copolymer containing an olefin monomer other than propylene, e.g., a propylene-α-olefin copolymer or the like having a crystalline polypropylene portion and containing α-olefin, other than propylene, with 2 to 20 carbons, preferably containing one or more comonomers from among ethylene, butene-1, 4-methylpentene-1, hexene-1, and octene-1, at a ratio of 15 mol % or more. Also, a modifier which is typically used for softening polypropylene-based resins, such as low density polyethylene, ethylene-α-olefin copolymers, ethylene-propylene copolymer rubbers, ethylene-propylene-non-conjugated diene copolymer rubbers, styrene-butadiene copolymers, or a hydrogenated product thereof, can be added as appropriate.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The thickness of the colored substrate layer 2 is preferably in the range of 40 [μm] or more and 150 [μm] or less, more preferably in the range of 50 [μm] or more and 130 [μm] or less. This is because, when the thickness of the colored substrate layer 2 is 40 [μm] or more, it can absorb irregularities or bumps on the underlying floor material or the like, which improves the finish of the decorative sheet 1. When the thickness of the colored substrate layer 2 is 150 [μm] or less, the manufacturing cost of the decorative sheet 1 can be reduced without forming the colored substrate layer 2 thicker than necessary.

<Pattern Layer>

The pattern layer 3 is laminated on one side (the upper side in the FIGURE) of the colored substrate layer 2, and is a layer for adding a pattern for imparting design. The design layer 3 may be replaced with the coloring of the colored substrate layer 2, in which case the design layer 3 may be omitted.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

Examples of binder resins that can be used include, but are not limited to, urethane-based resins, acrylic resins, vinyl chloride-acetate resins, polyimide-based resins, nitrocellulose, or a mixture of these.

Any pattern may be used as the pattern, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The thickness of the pattern layer 3 is preferably within the range of 1 [μm] or more and 10 [μm] or less. This is because when the pattern layer 3 has a thickness of 1 [μm] or more, clear printing is possible. When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

The pattern layer 3 may include, for example, a solid colored substrate layer for hiding the color and pattern of a base to which the decorative sheet 1 is attached, and a pattern layer for adding a pattern for imparting the designability.

<Adhesive Layer>

The adhesive layer 4 is laminated on one side (upper side in the FIGURE) of the pattern layer 3 to bond the pattern layer 3 and the transparent resin layer 5 together.

For example, urethane, acrylic, ethylene-vinyl acetate copolymer, vinyl chloride-vinyl acetate copolymer, polyester, polyolefin, or the like can be used as the material of the adhesive layer 4.

<Transparent Resin Layer>

The transparent resin layer 5 is laminated on one side (the upper side in the FIGURE) of the adhesive layer 4, and is made of a transparent, plant-derived high-density polyethylene (for example, the "green polyethylene (SHC7260)" manufactured by Braskem)).

Plant-derived high-density polyethylene may be, for example, polyethylene having a density greater than 0.94.

A nucleating agent (for example, "Rikemaster CN-002" manufactured by Riken Vitamin Co., Ltd.) is added to the high-density polyethylene forming the transparent resin layer 5. That is, a nucleating agent is added to the high density polyethylene-containing resin composition used to form the transparent resin layer 5.

The nucleating agent is added to the high-density polyethylene in an amount of 500 [ppm] or more and 2000 [ppm] or less relative to the mass of the high-density polyethylene.

The first embodiment shows, as an example, a case where the nucleating agent is added to the high-density polyethylene in an amount of 1500 [ppm] or more and 2000 [ppm] or less relative to the mass of the high-density polyethylene. The density of the transparent resin layer 5 is, for example, within the range of 0.92 [g/cm$^3$] or more and 0.99 [g/cm$^3$]

or less, preferably [g/cm$^3$] or more and 0.98 [g/cm$^3$] or less, more preferably 0.95 [g/cm$^3$] or more and 0.97 [g/cm$^3$] or less.

The transparent resin layer 5 may have added thereto, for example, one or more selected from various additives such as a coloring agent, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The transparent resin layer 5 preferably has sufficient transparency (transparent with no color, transparent with color, translucent) to allow one to see the pattern of the pattern layer 3 through the surface (upper side) of the decorative sheet 1.

The transparent resin layer 5 has a thickness of, for example, 20 μm or more and 200 μm or less.

<Surface Protection Layer>

The surface protection layer 6 is laminated on one side (the upper side in the FIGURE) of the transparent resin layer 5 in order to provide the decorative sheet 1 with weather resistance, scratch resistance, stain resistance, design, or the like.

The surface protection layer 6 may be formed using, for example, an acrylic resin composition.

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antimicrobial agent and an antifungal agent, for example, may be added to the surface protection layer 6 as needed.

<Uneven Part>

The uneven part 7 is formed by recesses provided in the transparent resin layer 5 and the surface protection layer 6 at a plurality of locations.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

An anticorrosion pigment may be added to the primer layer 8 to improve corrosion resistance.

The thickness of the primer layer 8 may be, for example, in the range of 1 [μm] or more and 10 [μm] or less.

Note that the first embodiment is merely an example of the present invention, and the present invention is not limited to the first embodiment, but various modifications can be made according to a design and the like without departing from the technical idea of the present invention.

Effects of First Embodiment

The decorative sheet 1 of the first embodiment achieves the effects described below.

(1) A colored substrate layer 2 and a transparent resin layer 5 laminated on one side of the colored substrate layer 2 are provided. The transparent resin layer 5 is made of a resin composition containing plant-derived high-density polyethylene. A nucleating agent is added to the resin composition containing high-density polyethylene. The density of the transparent resin layer 5 is, for example, within the range of 0.92 [g/cm$^3$] or more and 0.99 [g/cm$^3$] or less, preferably 0.94 [g/cm$^3$] or more and 0.98 [g/cm$^3$] or less, more preferably 0.95 [g/cm$^3$] or more and 0.97 [g/cm$^3$] or less.

Therefore, even when a plant-derived high-density polyethylene, which is a plant-derived material, is used, a transparent resin layer 5 can be formed having a high degree of hardness equivalent to the hardness of a structure formed using fossil fuel-derived polyethylene.

As a result, a decorative sheet 1 capable of suppressing a decrease in surface hardness can be provided even when it is formed using a plant-derived high-density polyethylene, which is a plant-derived material.

In addition, even when a plant-derived high-density polyethylene, which is a plant-derived material, is used, a transparent resin layer 5 can be formed having a high degree of transparency equivalent to the transparency of a structure formed using fossil fuel-derived polyethylene or the like.

(2) The nucleating agent is added in an amount of 500 [ppm] or more and 2000 [ppm] or less relative to the mass of the high-density polyethylene.

This makes it possible to provide a decorative sheet 1 with less haze.

(3) The nucleating agent is added in an amount of 1500 [ppm] or more and 2000 [ppm] or less relative to the mass of the high-density polyethylene.

This makes it possible to provide a decorative sheet 1 with less haze than a structure to which the nucleating agent is added in an amount of less than 1500 [ppm] relative to the mass of the high-density polyethylene.

The decorative material 10 of the first embodiment achieves the effect described below.

(4) The decorative material 10 includes the substrate 9 and the decorative sheet 1 laminated on at least one side thereof.

As a result, a decorative material 10 capable of suppressing a decrease in surface hardness can be provided even when it is formed using a plant-derived high-density polyethylene, which is a plant-derived material.

Modification of First Embodiment (1) Although the decorative material 10 includes the decorative sheet 1 laminated on one side of the substrate 9 in the first embodiment, the present invention is not limited to this. That is, the decorative material 10 may be formed so that the decorative sheet 1 is laminated on not only one side of the substrate 9, but also on the other side of the substrate 9 (the lower side in the FIGURE).

First Example

The decorative materials of Examples 1 to 3 and Comparative Examples 1 and 2 will be described below with reference to the first embodiment.

Example 1

The colored substrate layer with a thickness of 55 [μm] was formed using a colored polyethylene resin.

The pattern layer was formed by using urethane-based printing ink after applying a corona discharge to one side of the colored substrate layer.

The adhesive layer was formed using a maleic anhydride-modified polyethylene resin.

The transparent resin layer is formed by using "green polyethylene", a plant-derived high-density polyethylene (HDPE) manufactured by Braskem, and adding, to the "green polyethylene", "Rikemaster-CN-002", a nucleating agent manufactured by Riken Vitamin Co., Ltd., in an amount of 1500 [ppm] relative to the mass of the "green polyethylene". The thickness of the transparent resin layer was 70 [μm].

The surface protection layer was formed using an acrylic resin composition as a main component.

The primer layer was formed having a thickness of 1 [μm] or more and 2 [μm] or less using a polyester urethane resin after applying corona discharge to one side of the colored substrate layer.

Then, extrusion lamination was carried out to form the decorative sheet of Example 1 having a thickness of 135 [μm].

After forming the decorative sheet of Example 1, the substrate and the side of the primer layer facing the substrate were bonded together using "BA-10L (curing agent: BA-11B)" manufactured by Japan Coating Resin Corporation. The decorative material of Example 1 was thus formed.

Example 2

The decorative sheet and decorative material of Example 2 were formed in the same manner as in Example 1, except that the nucleating agent "Rikemaster CN-002" manufactured by Riken Vitamin Co., Ltd. was added in an amount of 500 [ppm] relative to the mass of the high-density polyethylene.

Example 3

The decorative sheet and decorative material of Example 3 were formed in the same manner as in Example 1, except that the nucleating agent "Rikemaster CN-002" manufactured by Riken Vitamin Co., Ltd. was added in an amount of 2000 [ppm] relative to the mass of the high-density polyethylene.

(Performance Evaluation and Evaluation Results)

The surface hardness, productivity, transmittance, and haze of the decorative materials of Examples 1 to 3 and Comparative Examples 1 and 2 were evaluated. The evaluation was carried out as follows.

<Surface Hardness>

After carrying out a pencil hardness test using pencils with different hardnesses on each decorative material, damage (scratching) on the surface (surface protection layer) thereof was checked to evaluate the surface hardness. When damage on the surface was confirmed after conducting the pencil hardness test using a pencil having a hardness of 2 B or greater, the sample was rated as "A", and when damage on the surface was confirmed after conducting the pencil hardness test using a pencil having a hardness of 4 B or greater, the sample was rated as "B". When damage on the surface was confirmed after conducting the pencil hardness test using a pencil having a hardness of 5 B or lower, the sample was rated as "C".

<Productivity>

Productivity was evaluated according to whether there was a problem in the production of the decorative sheet. The sample was rated as "A" when there was no problem at all in the production of the decorative sheet, rated as "B" when there was no productivity problem in the production of the decorative sheet, and rated as "C" when there was a problem in the production of the decorative sheet.

<Transmittance>

Using the transparent resin layers having a thickness within the range of 70 [μm] or more and 80 [μm] or less, the total light transmittance at a wavelength of 555 [nm] was measured with a spectrophotometer (integrating sphere) in order to evaluate their transmittance. The sample was rated as "A" when the total light transmittance was 85%, rated as "B" when the total light transmittance was in the range of 80% or more and 85% or less, and rated as "C" when the total light transmittance was less than 80%.

<Haze>

Haze was evaluated by evaluating whether there was any design issue for use as a decorative sheet using criteria established by the inventors.

TABLE 1

| | | Ex. 1 | Ex. 2 | Ex. 3 | Comp. Ex. 1 | Comp. Ex. 2 |
|---|---|---|---|---|---|---|
| Structure | HDPE (SHC7260) | 100 | 100 | 100 | 100 | 80 |
| | LDPE (SPB681) | — | — | — | — | 20 |
| | Nucleating agent | 1500 ppm | 500 ppm | 2000 ppm | — | — |
| Evaluation results | Surface hardness | A | B | A | B | C |
| | Productivity | B | B | B | B | A |
| | Transmittance | A | A | A | A | A |
| | Haze | B | B | A | C | A |

Comparative Example 1

The decorative sheet and decorative material of Comparative Example 1 were formed in the same manner as in Example 1, except that no nucleating agent was added to the high-density polyethylene.

Comparative Example 2

The decorative sheet and decorative material of Comparative Example 2 were formed in the same manner as in Comparative Example 2, except that no nucleating agent was added to the high-density polyethylene.

The various kinds of performance evaluation results obtained as described above showed that the decorative materials of Examples 1 to 3 exhibited good performance in all evaluation tests. On the other hand, the decorative materials of Comparative Examples 1 and 2 could only exhibit good performance in part of the evaluation tests at the most.

Second Embodiment

The structure of a decorative material 10 will be described with reference to the FIGURE.

As shown in the FIGURE, the decorative material 10 includes a decorative sheet 1 and a substrate 9.

Since the structure of the decorative material 10 of the second embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer 2, a pattern layer 3, an adhesive layer 4, a transparent resin layer 5, a surface protection layer 6, an uneven part 7, and a primer layer 8.

<Colored Substrate Layer>

The colored substrate layer 2 is formed with a thermoplastic resin.

The thermoplastic resin forming the colored substrate layer 2 may be, for example, a colored thermoplastic polyolefin-based resin. Examples of polyolefin-based resins include one or a mixture, copolymer, composite, laminate, or the like of two or more of polyolefin resins such as polyethylene, polypropylene, polymethylpentene, polybutene, ethylene-propylene copolymers, ethylene-α-olefin copolymers, and propylene-α-olefin copolymers; and polyolefin-based resins such as ethylene-vinyl acetate copolymers, ethylene-vinyl alcohol copolymers, ethylene-(meth)acrylic acid (ester) copolymers, and metal-neutralized ethylene-unsaturated carboxylic acid copolymers (ionomers).

The colored substrate layer 2 may be made of a resin composition containing plant-derived high-density polyethylene. The colored substrate layer 2 may contain plant-derived low-density polyethylene or plant-derived linear low-density polyethylene in addition to the plant-derived high-density polyethylene.

The polyolefin-based resin may be selected from the types described above according to the purpose of use of the decorative sheet 1 and other factors as appropriate. In particular, polypropylene-based resins, that is, a homopolymer or a copolymer containing propylene as the main component is most suited for general use. For example, a homopolypropylene resin, random polypropylene resin, block polypropylene resin, or the like may be used alone or appropriately mixed, and a resin in which atactic polypropylene is appropriately additionally mixed with these resins may be used. The polyolefin resin may be a copolymer containing an olefin monomer other than propylene, e.g., a propylene-α-olefin copolymer or the like having a crystalline polypropylene portion and containing α-olefin, other than propylene, with 2 to 20 carbons, preferably containing one or more comonomers from among ethylene, butene-1, 4-methylpentene-1, hexene-1, and octene-1, at a ratio of 15 mol % or more. Also, a modifier which is typically used for softening polypropylene-based resins, such as low density polyethylene, ethylene-α-olefin copolymers, ethylene-propylene copolymer rubbers, ethylene-propylene-non-conjugated diene copolymer rubbers, styrene-butadiene copolymers, or a hydrogenated product thereof, can be added as appropriate.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The thickness of the colored substrate layer 2 is preferably in the range of 40 [μm] or more and 150 [μm] or less, more preferably in the range of 50 [μm] or more and 130 [μm] or less. This is because, when the thickness of the colored substrate layer 2 is 40 [μm] or more, it can absorb irregularities or bumps on the underlying floor material or the like, which improves the finish of the decorative sheet 1. When the thickness of the colored substrate layer 2 is 150 [μm] or less, the manufacturing cost of the decorative sheet 1 can be reduced without forming the colored substrate layer 2 thicker than necessary.

The density of the colored substrate layer 2 is, for example, within the range of 0.92 [g/cm$^3$] or more and 1.12 [g/cm$^3$] or less, preferably 0.98 [g/cm$^3$] or more and 1.10 [g/cm$^3$] or less.

The density of the colored substrate layer 2 is a value measured according to the method specified in the method A of JIS K 7112-1980 after annealing it according to JIS K 6760-1995.

When the density of the colored substrate layer 2 is 0.92 [g/cm$^3$] or more, the rigidity of the colored substrate layer 2 can be increased as compared to when the density is lower than 0.92 [g/cm$^3$]. When the density of the colored substrate layer 2 is 1.12 [g/cm$^3$] or lower, the colored substrate layer 2 can have increased transparency and mechanical strength as compared to when the density is higher than 1.12 [g/cm$^3$].

<Pattern Layer>

The pattern layer 3 is laminated on one side (the upper side in the FIGURE) of the colored substrate layer 2 and is a layer for adding a pattern for imparting design. The design layer 3 may be replaced with the coloring of the colored substrate layer 2, in which case the design layer 3 may be omitted.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

Examples of binder resins that can be used include, but are not limited to, urethane-based resins, acrylic resins, vinyl chloride-acetate resins, polyimide-based resins, nitrocellulose, or a mixture of these.

Any pattern may be used as the pattern, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The thickness of the pattern layer 3 is preferably within the range of 1 [μm] or more and 10 [μm] or less. This is because when the pattern layer 3 has a thickness of 1 [μm] or more, clear printing is possible. When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

The pattern layer 3 may include, for example, a solid colored substrate layer for hiding the color and pattern of a base to which the decorative sheet 1 is attached, and a pattern layer for adding a pattern for imparting the designability.

<Adhesive Layer>

The adhesive layer 4 is laminated on one side (upper side in the FIGURE) of the pattern layer 3 to bond the pattern layer 3 and the transparent resin layer 5 together.

For example, urethane, acrylic, olefin, ethylene-vinyl acetate copolymer, vinyl chloride-vinyl acetate copolymer, polyester, polyolefin, or the like can be used as the material of the adhesive layer 4.

<Transparent Resin Layer>

The transparent resin layer 5 is laminated on one side (the upper side in the FIGURE) of the adhesive layer 4, and is formed using a resin composition containing a transparent, plant-derived high-density polyethylene (for example, the "green polyethylene (SHC7260)" manufactured by Braskem)).

The transparent resin layer 5 may contain plant-derived low-density polyethylene or plant-derived linear low-density polyethylene.

The density of the transparent resin layer 5 is, for example, within the range of 0.92 [g/cm$^3$] or more and 0.99 [g/cm$^3$] or less, preferably 0.94 [g/cm$^3$] or more and 0.98 [g/cm$^3$] or less, more preferably 0.95 [g/cm$^3$] or more and 0.97 [g/cm$^3$] or less.

When the density of the transparent resin layer 5 is 0.92 [g/cm$^3$] or higher, the rigidity of the transparent resin layer 5 can be increased as compared to when the density is lower than 0.92 [g/cm$^3$]. When the density of the transparent resin layer 5 is 0.99 [g/cm$^3$] or lower, the transparent resin layer 5 can have increased transparency and mechanical strength as compared to when the density is higher than 0.99 [g/cm$^{3]}$.

It is also possible to use, for example, a plant-derived polypropylene having a density within the range of 0.90 [g/cm$^3$] or more and 0.91 [g/cm$^3$] or less for the transparent resin layer 5.

A nucleating agent (for example, "Rikemaster CN-002" manufactured by Riken Vitamin Co., Ltd.) is added to the high-density polyethylene forming the transparent resin layer 5.

The nucleating agent is added to the high-density polyethylene in an amount of 500 [ppm] or more and 2000 [ppm] or less relative to the mass of the high-density polyethylene.

The first embodiment shows, as an example, a case where the nucleating agent is added to the high-density polyethylene in an amount of 1500 [ppm] or more and 2000 [ppm] or less relative to the mass of the high-density polyethylene.

The transparent resin layer 5 may have added thereto, for example, one or more selected from various additives such as a coloring agent, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The transparent resin layer 5 preferably has sufficient transparency (transparent with no color, transparent with color, translucent) to allow one to see the pattern of the pattern layer 3 through the surface (upper side) of the decorative sheet 1.

The thickness of the transparent resin layer 5 is, for example, within the range of [μm] or more and 200 [μm] or less, preferably 55 [μm] or more and 150 [μm] or less, more preferably 60 [μm] or more and 80 [μm] or less.

<Surface Protection Layer>

The surface protection layer 6 is laminated on one side (the upper side in the FIGURE) of the transparent resin layer 5 in order to provide the decorative sheet 1 with weather resistance, scratch resistance, stain resistance, design, or the like.

The surface protection layer 6 may be formed using, for example, an acrylic resin composition.

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antiviral agent, an antimicrobial agent, and an antifungal agent, may be added to the surface protection layer 6 as needed.

<Uneven Part>

The uneven part 7 is formed by recesses provided in the transparent resin layer 5 and the surface protection layer 6 at a plurality of locations.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

In the second embodiment, as an example, a case is described where the primer layer 8 is formed using a polyester urethane obtained by isocyanate-crosslinking polyester polyol.

An anticorrosion pigment may be added to the primer layer 8 to improve corrosion resistance.

The thickness of the primer layer 8 may be, for example, in the range of 1 [μm] or more and 10 [μm] or less.

Note that the second embodiment is merely an example of the present invention, and the present invention is not limited to the second embodiment, but various modifications can be made according to a design and the like without departing from the technical idea of the present invention.

Effects of Second Embodiment

The decorative sheet 1 of the second embodiment achieves the effects described below.

(1) A colored substrate layer 2 and a transparent resin layer 5 laminated on one side of the colored substrate layer 2 are provided. The transparent resin layer 5 is made of a resin composition containing plant-derived high-density polyethylene. A nucleating agent is added to the high-density polyethylene.

Therefore, even when a plant-derived high-density polyethylene, which is a plant-derived material, is used, a transparent resin layer 5 can be formed having a high degree of hardness equivalent to the hardness of a structure formed using fossil fuel-derived polyethylene.

As a result, a decorative sheet 1 capable of suppressing a decrease in surface hardness can be provided even when it is formed using a plant-derived high-density polyethylene, which is a plant-derived material.

In addition, even when a plant-derived high-density polyethylene, which is a plant-derived material, is used, a transparent resin layer 5 can be formed having a high degree of transparency equivalent to the transparency of a structure formed using fossil fuel-derived polyethylene.

(2) The nucleating agent is added in an amount of 500 [ppm] or more and 2000 [ppm] or less relative to the mass of the high-density polyethylene.

This makes it possible to provide a decorative sheet 1 with less haze.

(3) The nucleating agent is added in an amount of 1500 [ppm] or more and 2000 [ppm] or less relative to the mass of the high-density polyethylene.

This makes it possible to provide a decorative sheet 1 with less haze than a structure to which the nucleating agent is added in an amount of less than 1500 [ppm] relative to the mass of the high-density polyethylene.

The decorative material 10 of the second embodiment achieves the effect described below.

(4) The decorative material 10 includes the substrate 9 and the decorative sheet 1 laminated on at least one side thereof.

As a result, a decorative material 10 capable of suppressing a decrease in surface hardness can be provided even when it is formed using a plant-derived high-density polyethylene, which is a plant-derived material.

Third Embodiment

The structure of a decorative material 10 will be described with reference to the FIGURE.

As shown in the FIGURE, the decorative material 10 includes a decorative sheet 1 and a substrate 9.

Since the structure of the decorative material 10 of the third embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer 2, a pattern layer 3, an adhesive layer 4, a transparent resin layer 5, a surface protection layer 6, an uneven part 7, and a primer layer 8.

Since the structure of the decorative sheet 1 of the third embodiment is the same as that of the first embodiment described above except for the structure of the colored substrate layer 2, only the structure of the colored substrate layer 2 will be described.

<Colored Substrate Layer>

The structure of the colored substrate layer 2 is the same as that of the above-described first embodiment, except that it is formed using a resin composition obtained by mixing plant-derived high-density polyethylene and low-density polyethylene.

An example of plant-derived high-density polyethylene is "green polyethylene (SHC7260)" manufactured by Braskem.

An example of low-density polyethylene is a polyethylene having a density of 0.94 or less.

In the third embodiment, as an example, a case is described where the low-density polyethylene forming the colored substrate layer 2 is plant-derived low-density polyethylene.

An example of plant-derived low-density polyethylene is "green polyethylene (SPB681)" manufactured by Braskem.

The content of the low-density polyethylene forming the colored substrate layer 2 in the colored substrate layer 2 is within the range of 5% by mass or more and 30% by mass or less relative to 100% by mass of the colored substrate layer 2.

In the third embodiment, as an example, a case is described where the high-density polyethylene and low-density polyethylene in the colored substrate layer 2 are mixed at a ratio within the range of 95:5 to 70:30, respectively.

Note that the third embodiment is merely an example of the present invention, and the present invention is not limited to the third embodiment, but various modifications can be made according to a design and the like without departing from the technical idea of the present invention.

Effects of Third Embodiment

The decorative sheet 1 of the third embodiment achieves the effects described below.

(1) The colored substrate layer 2 is formed using a resin composition obtained by mixing plant-derived high-density polyethylene and low-density polyethylene.

As a result, it is possible to provide a decorative sheet 1 capable of suppressing deterioration in suitability for bending and suitability for cutting.

(2) The low-density polyethylene forming the colored substrate layer 2 is plant-derived low-density polyethylene.

This makes it possible to reduce the environmental burden.

(3) The content of the low-density polyethylene forming the colored substrate layer 2 in the colored substrate layer 2 is within the range of 5% by mass or more and 30% by mass or less relative to 100% by mass of the colored substrate layer 2.

This makes it possible to prevent the film formation stability and strength of the decorative sheet 1 from decreasing.

That is, when the content of the low-density polyethylene is low, the film formation of the decorative sheet 1 becomes unstable, and when the content of the low-density polyethylene is high, the decorative sheet 1 becomes too soft. However, when the content of the low-density polyethylene forming the colored substrate layer 2 in the colored substrate layer 2 is within the range of 5% by mass or more and 30% by mass or less relative to 100% by mass of the colored substrate layer 2, these problems can be solved.

(4) The high-density polyethylene and low-density polyethylene in the colored substrate layer 2 are mixed at a ratio within the range of 95:5 to 70:30, respectively.

This makes it possible to prevent the film formation stability and strength of the decorative sheet 1 from decreasing.

That is, when the content of the low-density polyethylene is low, the film formation of the decorative sheet 1 becomes unstable, and when the content of the low-density polyethylene is high, the decorative sheet 1 becomes too soft. However, when the high-density polyethylene and low-density polyethylene in the colored substrate layer 2 are mixed at a ratio within the range of 95:5 to 70:30, respectively, these problems can be solved.

Fourth Embodiment

The structure of a decorative material 10 will be described with reference to the FIGURE.

As shown in the FIGURE, the decorative material 10 includes a decorative sheet 1 and a substrate 9.

Since the structure of the decorative material 10 of the second embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer 2, a pattern layer 3, an adhesive layer 4, a transparent resin layer 5, a surface protection layer 6, an uneven part 7, and a primer layer 8.

Since the structure of the decorative sheet 1 of the fourth embodiment is the same as that of the second embodiment described above except for the structure of the transparent resin layer 5, only the structure of the transparent resin layer 5 will be described.

<Transparent Resin Layer>

The structure of the transparent resin layer 5 is the same as that of the above-described first embodiment, except that it is formed using a resin composition obtained by mixing plant-derived high-density polyethylene and plant-derived low-density polyethylene.

In the fourth embodiment, as an example, a case is described where the high-density polyethylene and low-density polyethylene in the transparent resin layer 5 are mixed at a ratio within the range of 80:20 to 60:40, respectively.

Note that the fourth embodiment is merely an example of the present invention, and the present invention is not limited to the fourth embodiment, but various modifications can be made according to a design and the like without departing from the technical idea of the present invention.

Effects of Fourth Embodiment

The decorative sheet 1 of the fourth embodiment achieves the effects described below.

(1) The transparent resin layer 5 is formed using a resin composition obtained by mixing plant-derived high-density polyethylene and plant-derived low-density polyethylene.

This increases the flexibility and transparency of the transparent resin layer 5.

(2) The high-density polyethylene and low-density polyethylene in the transparent resin layer 5 are mixed at a ratio within the range of 80:20 to 60:40, respectively.

This increases the flexibility and transparency of the transparent resin layer 5.

Second Example

The decorative materials of Examples 1 to 22 and Comparative Examples 1 and 5 will be described below with reference to the second to fourth embodiments.

Example 1

The colored substrate layer with a thickness of 55 [μm] was formed using a colored polyethylene resin.

The pattern layer was formed by using urethane-based printing ink after applying a corona discharge to one side of the colored substrate layer.

The adhesive layer was formed using a urethane-based adhesive.

The transparent resin layer is formed by using "green polyethylene", a plant-derived high-density polyethylene (HDPE) manufactured by Braskem, and adding, to the "green polyethylene", "Rikemaster-CN-002", a nucleating agent manufactured by Riken Vitamin Co., Ltd., in an amount of 1500 [ppm] relative to the mass of the "green polyethylene". The thickness of the transparent resin layer was 70 [μm].

The surface protection layer was formed using an acrylic resin composition as a main component.

The primer layer was formed having a thickness of 1 [μm] or more and 2 [μm] or less using a polyester urethane resin after applying corona discharge to one side of the colored substrate layer.

Further, lamination was carried out to form the decorative sheet of Example 1 having a thickness of 135 [μm].

After forming the decorative sheet of Example 1, the substrate and the side of the primer layer facing the substrate were bonded together using "BA-10L (curing agent: BA-11B)" manufactured by Japan Coating Resin Corporation. The decorative material of Example 1 was thus formed.

Example 2

The decorative sheet and decorative material of Example 2 were formed in the same manner as in Example 1, except that the nucleating agent "Rikemaster CN-002" manufactured by Riken Vitamin Co., Ltd. was added in an amount of 500 [ppm] relative to the mass of the high-density polyethylene.

Example 3

The decorative sheet and decorative material of Example 3 were formed in the same manner as in Example 1, except that the nucleating agent "Rikemaster CN-002" manufactured by Riken Vitamin Co., Ltd. was added in an amount of 2000 [ppm] relative to the mass of the high-density polyethylene.

Example 4

The decorative sheet and decorative material of Example 4 were formed in the same manner as in Example 1 except that the colored substrate layer was formed using a resin composition obtained by mixing a plant-derived high-density polyethylene (HDPE) and a plant-derived low-density polyethylene (LDPE) at a ratio of 95:5, respectively.

Example 5

The decorative sheet and decorative material of Example 5 were formed in the same manner as in Example 2 except that the colored substrate layer was formed using a resin composition obtained by mixing a plant-derived high-density polyethylene (HDPE) and a plant-derived low-density polyethylene (LDPE) at a ratio of 95:5, respectively.

Example 6

The decorative sheet and decorative material of Example 6 were formed in the same manner as in Example 3 except that the colored substrate layer was formed using a resin composition obtained by mixing a plant-derived high-density polyethylene (HDPE) and a plant-derived low-density polyethylene (LDPE) at a ratio of 95:5, respectively.

Example 7

The decorative sheet and decorative material of Example 7 were formed in the same manner as in Example 1 except that the colored substrate layer was formed using a resin composition obtained by mixing a plant-derived high-density polyethylene (HDPE) and a plant-derived low-density polyethylene (LDPE) at a ratio of 70:30, respectively.

Example 8

The decorative sheet and decorative material of Example 8 were formed in the same manner as in Example 2 except that the colored substrate layer was formed using a resin composition obtained by mixing a plant-derived high-density polyethylene (HDPE) and a plant-derived low-density polyethylene (LDPE) at a ratio of 70:30, respectively.

Example 9

The decorative sheet and decorative material of Example 9 were formed in the same manner as in Example 3 except that the colored substrate layer was formed using a resin composition obtained by mixing a plant-derived high-density polyethylene (HDPE) and a plant-derived low-density polyethylene (LDPE) at a ratio of 70:30, respectively.

Example 10

The decorative sheet and decorative material of Example 10 were formed in the same manner as in Example 4 except that the transparent resin layer was formed using a resin composition obtained by mixing a plant-derived high-density polyethylene (HDPE) and a plant-derived low-density polyethylene (LDPE) at a ratio of 80:20, respectively.

Example 11

The decorative sheet and decorative material of Example 11 were formed in the same manner as in Example 5 except that the transparent resin layer was formed using a resin composition obtained by mixing a plant-derived high-density polyethylene (HDPE) and a plant-derived low-density polyethylene (LDPE) at a ratio of 80:20, respectively.

Example 12

The decorative sheet and decorative material of Example 12 were formed in the same manner as in Example 6 except that the transparent resin layer was formed using a resin composition obtained by mixing a plant-derived high-density polyethylene (HDPE) and a plant-derived low-density polyethylene (LDPE) at a ratio of 80:20, respectively.

Example 13

The decorative sheet and decorative material of Example 13 were formed in the same manner as in Example 10 except that the colored substrate layer was formed using a resin composition obtained by mixing a plant-derived high-density polyethylene (HDPE) and a plant-derived low-density polyethylene (LDPE) at a ratio of 70:30, respectively.

Example 14

The decorative sheet and decorative material of Example 14 were formed in the same manner as in Example 11 except that the colored substrate layer was formed using a resin composition obtained by mixing a plant-derived high-density polyethylene (HDPE) and a plant-derived low-density polyethylene (LDPE) at a ratio of 70:30, respectively.

Example 15

The decorative sheet and decorative material of Example 15 were formed in the same manner as in Example 12 except that the colored substrate layer was formed using a resin composition obtained by mixing a plant-derived high-density polyethylene (HDPE) and a plant-derived low-density polyethylene (LDPE) at a ratio of 70:30, respectively.

Example 16

The decorative sheet and decorative material of Example 16 were formed in the same manner as in Example 10 except that the transparent resin layer was formed using a resin composition obtained by mixing a plant-derived high-density polyethylene (HDPE) and a plant-derived low-density polyethylene (LDPE) at a ratio of 60:40, respectively.

Example 17

The decorative sheet and decorative material of Example 17 were formed in the same manner as in Example 11 except that the transparent resin layer was formed using a resin composition obtained by mixing a plant-derived high-density polyethylene (HDPE) and a plant-derived low-density polyethylene (LDPE) at a ratio of 60:40, respectively.

Example 18

The decorative sheet and decorative material of Example 18 were formed in the same manner as in Example 12 except that the transparent resin layer was formed using a resin composition obtained by mixing a plant-derived high-density polyethylene (HDPE) and a plant-derived low-density polyethylene (LDPE) at a ratio of 60:40, respectively.

Example 19

The decorative sheet and decorative material of Example 19 were formed in the same manner as in Example 16 except that the colored substrate layer was formed using a resin composition obtained by mixing a plant-derived high-density polyethylene (HDPE) and a plant-derived low-density polyethylene (LDPE) at a ratio of 70:30, respectively.

Example 20

The decorative sheet and decorative material of Example 20 were formed in the same manner as in Example 17 except that the colored substrate layer was formed using a resin composition obtained by mixing a plant-derived high-density polyethylene (HDPE) and a plant-derived low-density polyethylene (LDPE) at a ratio of 70:30, respectively.

Example 21

The decorative sheet and decorative material of Example 21 were formed in the same manner as in Example 18 except that the colored substrate layer was formed using a resin composition obtained by mixing a plant-derived high-density polyethylene (HDPE) and a plant-derived low-density polyethylene (LDPE) at a ratio of 70:30, respectively.

Example 22

The decorative sheet and decorative material of Example 22 were formed in the same manner as in Example 1 except that the adhesive layer was formed using a maleic anhydride-modified polyethylene resin.

Comparative Example 1

The decorative sheet and decorative material of Comparative Example 1 were formed in the same manner as in Example 1, except that no nucleating agent was added to the high-density polyethylene.

Comparative Example 2

The decorative sheet and decorative material of Comparative Example 2 were formed in the same manner as in Example 1 except that the transparent resin layer was formed using a polyethylene obtained by mixing a plant-derived high-density polyethylene (HDPE) and a plant-derived low-density polyethylene (LDPE) at a ratio of 50:50, respectively.

Comparative Example 3

The decorative sheet and decorative material of Comparative Example 3 were formed in the same manner as in Comparative Example 2, except that no nucleating agent was added to the high-density polyethylene.

Comparative Example 4

The decorative sheet and decorative material of Comparative Example 4 were formed in the same manner as in Example 1 except that the transparent resin layer was formed using a plant-derived low-density polyethylene (LDPE).

Comparative Example 5

The decorative sheet and decorative material of Comparative Example 5 were formed in the same manner as in Example 1 except that the colored substrate layer was formed using a resin composition obtained by mixing a plant-derived high-density polyethylene (HDPE) and a plant-derived low-density polyethylene (LDPE) at a ratio of 60:40, respectively.

(Performance Evaluation and Evaluation Results)

The surface hardness, productivity, transmittance, haze, suitability for bending, and suitability for cutting of the decorative materials of Examples 1 to 22 and Comparative Examples 1 to 5 were evaluated. The evaluation was carried out as follows.

<Surface Hardness>

After carrying out a pencil hardness test using pencils with different hardnesses on each decorative material, damage (scratching) on the surface (surface protection layer) thereof was checked to evaluate the surface hardness. When damage on the surface was confirmed after conducting the pencil hardness test using a pencil having a hardness of 2 B or greater, the sample was rated as “A”, and when damage on the surface was confirmed after conducting the pencil hardness test using a pencil having a hardness of 4 B or greater, the sample was rated as “B”. When damage on the surface was confirmed after conducting the pencil hardness test using a pencil having a hardness of 5 B or lower, the sample was rated as “C”.

<Productivity>

Productivity was evaluated according to whether there was a problem in the production of the decorative sheet. The sample was rated as “A” when there was no problem at all in the production of the decorative sheet, rated as “B” when there was no productivity problem in the production of the decorative sheet, and rated as “C” when there was a problem in the production of the decorative sheet.

<Transmittance>

Using the transparent resin layers having a thickness within the range of 70 [μm] or more and 80 [μm] or less, the total light transmittance at a wavelength of 555 [nm] was measured with a spectrophotometer (integrating sphere) in order to evaluate their transmittance. The sample was rated as “A” when the total light transmittance was 85%, rated as “B” when the total light transmittance was in the range of 80% or more and 85% or less, and rated as “C” when the total light transmittance was less than 80%.

<Haze>

The haze % of the transparent resin layer was measured using an ultraviolet-visible-near-infrared spectrophotometer (“UV-3600” manufactured by Shimadzu Corporation).

When measuring the haze % of the transparent resin layer, first, resins having the same compositions as the transparent resin layers of the decorative sheets of Examples 1 to 22 and the transparent resin layers of the decorative sheets of Comparative Examples 1 to 5 were extruded so that the formed resin films had a thickness within the range of 70 [μm] or more and 80 [μm] or less. The haze at a wavelength of 555 [nm] was measured with a spectrophotometer (integrating sphere) to evaluate the haze. The sample was rated as “A” when the haze was lower than 15%, rated as “B” when the haze was in the range of 15% or higher and lower than 25%, and rated as “C” when the haze was 25% or higher.

<Suitability for Bending>

The suitability for V-cutting (whether the bent part turns white or not) was checked using a decorative sheet laminated to an MDF (Medium Density Fiberboard) (that is, a decorative material) to thereby evaluate the suitability for bending. Those that did not have whitening were evaluated as “Good” (suitable), those that had slight whitening were evaluated as “Fair” (suitable), and those that had whitening were evaluated as “Poor” (defective).

<Suitability for Cutting>

The decorative sheet laminated with an MDF (that is, the decorative material) was sliced with a circular saw. In addition, it was cut with a handheld router so that the cut reached the MDF. The burrs formed on the decorative sheet were observed to evaluate the suitability for cutting thereof. Samples with no burrs were rated as “Good”, and those with extensive burrs that are difficult to fix were rated as “Poor”.

TABLE 2

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| Structure | Transparent resin layer | HDPE (SHC7260) | 100 | 100 | 100 | 100 | 100 | 100 | 100 | 100 | 100 | 80 | 80 | 80 | 80 | 80 |
| | | LDPE (SPB681) | — | — | — | — | — | — | — | — | — | 20 | 20 | 20 | 20 | 20 |

TABLE 2-continued

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| | | Nucleating agent | 1500 ppm | 500 ppm | 2000 ppm | 1500 ppm | 500 ppm | 2000 ppm | 1500 ppm | 500 ppm | 2000 ppm | 1500 ppm | 500 ppm | 2000 ppm | 1500 ppm | 500 ppm |
| | Colored substrate | HDPE (SHC7260) | — | — | — | 95 | 95 | 95 | 70 | 70 | 70 | 95 | 95 | 95 | 70 | 70 |
| | | LDPE (SPB681) | — | — | — | 5 | 5 | 5 | 30 | 30 | 30 | 5 | 5 | 5 | 30 | 30 |
| Evaluation results | | Surface hardness | A | B | A | A | B | A | A | B | A | A | B | A | A | B |
| | | Productivity | B | B | B | B | B | B | B | B | B | B | B | B | B | B |
| | | Transmittance | A | A | A | A | A | A | A | A | A | A | A | A | A | A |
| | | Haze | B | B | A | B | B | A | B | B | A | B | B | A | B | B |
| | | Suitability for bending | Good | Good | Good | Good | Good | Good | Good | Good | Good | Good | Good | Good | Good | Good |
| | | Suitability for cutting | Good | Good | Good | Good | Good | Good | Good | Good | Good | Good | Good | Good | Good | Good |

TABLE 3

| | | | Ex. 15 | Ex. 16 | Ex. 17 | Ex. 18 | Ex. 19 | Ex. 20 | Ex. 21 | Ex. 22 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|---|---|
| Structure | Transparent resin layer | HDPE (SHC7260) | 80 | 60 | 60 | 60 | 60 | 60 | 60 | 100 | 100 | 50 | 50 | — | 100 |
| | | LDPE (SPB681) | 20 | 40 | 40 | 40 | 40 | 40 | 40 | — | — | 50 | 50 | 100 | — |
| | | Nucleating agent | 2000 ppm | 1500 ppm | 500 ppm | 2000 ppm | 1500 ppm | 500 ppm | 2000 ppm | 1500 ppm | — | 1500 ppm | — | 1500 ppm | 1500 ppm |
| | Colored substrate layer | HDPE (SHC7260) | 70 | 95 | 95 | 95 | 70 | 70 | 70 | — | — | — | — | — | 60 |
| | | LDPE (SPB681) | 30 | 5 | 5 | 5 | 30 | 30 | 30 | — | — | — | — | — | 40 |
| Evaluation results | | Surface hardness | A | A | B | A | A | B | A | A | B | C | C | C | B |
| | | Productivity | B | B | B | B | B | B | B | B | B | A | A | A | C |
| | | Transmittance | A | A | A | A | A | A | A | A | A | A | A | A | A |
| | | Haze | A | B | B | A | B | B | A | B | C | A | A | A | B |
| | | Suitability for bending | Good | Good | Good | Good | Good | Good | Good | Good | Poor | Poor | Poor | Poor | Poor |
| | | Suitability for cutting | Good | Good | Good | Good | Good | Good | Good | Good | Poor | Poor | Poor | Poor | Poor |

The various kinds of performance evaluation results obtained as described above showed that the decorative materials of Examples 1 to 22 exhibited good performance in all evaluation tests. On the other hand, the decorative materials of Comparative Examples 1 to 5 could only exhibit good performance in part of the evaluation tests at the most.

Fifth Embodiment

The structure of a decorative material 10 will be described with reference to the FIGURE.

As shown in the FIGURE, the decorative material 10 includes a decorative sheet 1 and a substrate 9. The specific structure of the decorative sheet 1 will be described later.

Since the structure of the decorative material 10 of the fifth embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer (colored thermoplastic resin layer) 2, a pattern layer 3, an adhesive layer 4, a transparent resin layer (transparent thermoplastic resin layer) 5, a surface protection layer 6, an uneven part 7, and a primer layer 8.

<Colored Substrate Layer>

The colored substrate layer 2 is a resin layer formed using a thermoplastic resin, and is a colored resin layer formed using a resin composition containing biomass-derived (plant-derived) polyethylene.

The composition of the colored substrate layer 2 will be described in detail below.

(Biomass-Derived Polyethylene)

In the fifth embodiment, the biomass-derived polyethylene is obtained by polymerizing monomers containing biomass-derived ethylene. The biomass-derived ethylene is not particularly limited, and an ethylene produced by a conventionally known method can be used. Since biomass-derived ethylene is used as the raw material monomer, the polyethylene obtained by the polymerization thereof will be biomass-derived.

The raw material monomer for polyethylene does not have to contain 100% by mass of biomass-derived ethylene.

The monomer, which is a raw material for biomass-derived polyethylene, may further contain at least one of fossil fuel-derived ethylene and fossil fuel-derived α-olefin, and/or may further contain a biomass-derived α-olefin.

Although the number of carbon atoms of the α-olefin is not particularly limited, those having 3 to 20 carbon atoms can usually be used, and preferably butylene, hexene, or octene may be used. This is because butylene, hexene, and octene can be produced by polymerization of ethylene as a biomass-derived raw material. In addition, when such an α-olefin is contained, the polyethylene obtained by the polymerization has an alkyl group as a branched structure. This allows it to have more flexibility than a simple linear polyethylene.

By using an ethylene as a biomass-derived raw material, it is theoretically possible to produce a polyethylene from 100% biomass-derived components.

The biomass-derived ethylene concentration in the polyethylene (hereinafter may also referred to as "biomass degree") is a value obtained by measuring the biomass-derived carbon content by radioactive carbon (C14) measurement. It is known that, since carbon dioxide in the atmosphere contains some C14 (105.5 pMC), the C14 content in plants that grow by taking in carbon dioxide in the atmosphere, such as corn, is also about 105.5 pMC. It is also known that fossil fuels contain almost no C14. Therefore, the proportion of biomass-derived carbon can be calculated by measuring the proportion of C14 in all the carbon atoms in polyethylene. In the fifth embodiment, the content P bio of biomass-derived carbon can be determined as follows, where P C14 is the content of C14 in polyethylene.

$$P\ bio\ (\%) = P\ C14/105.5 \times 100$$

In the fifth embodiment, theoretically, if the raw material of polyethylene is completely biomass-derived ethylene, the biomass-derived ethylene concentration is 100%, and the biomass degree of the biomass-derived polyethylene is 100. The concentration of biomass-derived ethylene in a fossil fuel-derived polyethylene produced only from a fossil fuel-derived raw material is 0%, and the biomass degree of the fossil fuel-derived polyethylene is 0.

In the fifth embodiment, the biomass-derived polyethylene and the decorative sheet containing the polyethylene need not have a biomass degree of 100.

In the fifth embodiment, the polymerization method of the biomass-derived ethylene-containing monomers is not particularly limited, and a conventionally known method can be used. The polymerization temperature and polymerization pressure should be adjusted as appropriate according to the polymerization method and polymerization device. The polymerization device is also not particularly limited, and a conventionally known device can be used. An example of a method for polymerizing ethylene-containing monomers will now be described.

The polymerization method for an ethylene polymer or a copolymer of ethylene and α-olefin can be selected as appropriate depending on the type of polyethylene desired, for example, the difference in density and branching, such as high-density polyethylene (HDPE), medium-density polyethylene (HDPE), low-density polyethylene (LDPE), and linear low-density polyethylene (LLDPE). For example, the polymerization is preferably performed using a multi-site catalyst, such as a Ziegler-Natta catalyst, or a single-site catalyst, such as a metallocene catalyst, as the polymerization catalyst by one of gas phase polymerization, slurry polymerization, solution polymerization, and high pressure ion polymerization, and in one or more stages.

An ethylene polymer or an ethylene/α-olefin copolymer may be used alone as the biomass-derived polyethylene, or two or more of them may be used in combination.

(Resin Composition Containing Biomass-Derived Polyethylene)

In the fifth embodiment, the resin composition contains the above-described polyethylene as a main component. The resin composition contains biomass-derived ethylene in an amount of 5% by mass or more, preferably 5 to 95% by mass, more preferably 25 to 75% by mass, relative to the total amount of the resin composition. When the concentration of biomass-derived ethylene in the resin composition is 5% by mass or more, it is possible to reduce the amount of fossil fuel used compared to conventional methods, and a carbon-neutral decorative sheet can be achieved.

The above resin composition may contain two or more polyethylenes having different biomass degrees. In this case, the concentration of biomass-derived ethylene in the resin composition as a whole needs to be within the above range.

The above resin composition may further contain a fossil fuel-derived polyethylene obtained by polymerizing a monomer containing a fossil fuel-derived ethylene and at least one of a fossil fuel-derived ethylene and α-olefin. That is, in the fifth embodiment, the resin composition may be a mixture of biomass-derived polyethylene and fossil fuel-derived polyethylene. The mixing method is not particularly limited, and a known mixing method can be used. For example, dry blending or melt blending may be used.

According to the fifth embodiment, the resin composition preferably contains 5 to 90% by mass, more preferably 25 to 75% by mass of biomass-derived polyethylene and preferably to 95% by mass, more preferably 25 to 75% by mass of fossil fuel-derived polyethylene. Even when such a mixed resin composition is used, the concentration of biomass-derived ethylene in the resin composition as a whole needs to be within the above range.

Various additives other than polyethylene, which is the main component, may be added to the resin composition produced in the production process of the resin composition as long as the characteristics thereof are not impaired. Examples of additives include plasticizers, ultraviolet stabilizers, anti-coloring agents, matting agents, deodorants, flame retardants, anti-weathering agents, antistatic agents, yarn friction reducing agents, slip agents, release agents, antioxidants, ion exchange agents, and color pigments. These additives are added in an amount of preferably 1 to 20% by mass, preferably 1 to 10% by mass, relative to the total amount of the resin composition.

As described above, the colored substrate layer 2 contains biomass-derived ethylene in an amount of 5% by mass or more, preferably 5 to 90% by mass, more preferably 25 to 75% by mass, most preferably 40 to 75% by mass relative to the total amount of the colored substrate layer 2. When the concentration of biomass-derived ethylene in the colored substrate layer 2 is 5% by mass or more, it is possible to reduce the amount of fossil fuel used compared to conventional methods, and a carbon-neutral decorative sheet can be achieved.

The density of the colored substrate layer 2 is within the range of 0.92 [g/cm$^3$] or more and 1.12 [g/cm$^3$] or less, preferably 0.98 [g/cm$^3$] or more and 1.10 [g/cm$^3$] or less. The density of the colored substrate layer 2 is a value measured according to the method specified in the method A of JIS K 7112-1980 after annealing it according to JIS K 6760-1995. When the density of the colored substrate layer 2 is 0.92 [g/cm$^3$] or more, the rigidity of the colored substrate layer 2 can be increased. When the density of the colored substrate layer 2 is 1.12 [g/cm$^3$] or less, the transparency and mechanical strength of the colored substrate layer 2 can be increased.

The biomass-derived polyethylene contained in the colored substrate layer 2 may contain biomass-derived high-density polyethylene and biomass-derived low-density polyethylene, biomass-derived high-density polyethylene and fossil fuel-derived low-density polyethylene, or fossil fuel-derived high-density polyethylene and biomass-derived low-density polyethylene.

The biomass degree of the colored substrate layer 2 as a whole may be in the range of 10% or higher and 90% or lower.

Biomass-derived high-density polyethylene is polyethylene having a density greater than 0.94. Biomass-derived low-density polyethylene is polyethylene having a density of or less.

The colored substrate layer 2 preferably contains, as the biomass-derived polyethylene, one that is obtained by blending biomass-derived high-density polyethylene and low-density polyethylene (either biomass-derived or fossil fuel-derived) at a ratio within the range of 95:5 to 70:30, respectively. When the content of the low-density polyethylene is low, the film formation becomes unstable, and when the content of the low-density polyethylene is high, the product becomes too soft.

The production method of the colored substrate layer 2 is not particularly limited, and a known production method can be used. In the fifth embodiment, preferably calendaring is used.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The thickness of the colored substrate layer 2 is preferably in the range of 40 [μm] or more and 200 [μm] or less, more preferably in the range of 51 [μm] or more and 120 [μm] or less, and even more preferably in the range of 55 [μm] or more and 100 [μm] or less. This is because, when the thickness of the colored substrate layer 2 made of biomass-derived polyethylene is 40 [μm] or more, it can absorb irregularities or bumps on the underlying floor material or the like, which improves the finish of the decorative sheet 1. When the thickness of the colored substrate layer 2 is 200 [μm] or less, the manufacturing cost of the decorative sheet 1 can be reduced without forming the colored substrate layer 2 thicker than necessary.

Although the biomass-derived resin forming the colored substrate layer 2 was a biomass-derived polyethylene in the fifth embodiment, the present invention is not limited to this. For example, biomass-derived polypropylene, biomass-derived polybutylene, or the like may be used instead of the biomass-derived polyethylene described above. That is, in the fifth embodiment, a wide range of biomass-derived polyolefins can be used as the biomass-derived resin forming the colored substrate layer 2.

<Pattern Layer>

The pattern layer 3 is laminated on one side (the upper side in the FIGURE) of the colored substrate layer 2, and is a layer for adding a pattern for imparting design. The design layer 3 may be replaced with the coloring of the colored substrate layer 2, in which case the design layer 3 may be omitted.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

Examples of binder resins that can be used include, but are not limited to, urethane-based resins, acrylic resins, vinyl chloride-acetate resins, polyimide-based resins, nitrocellulose, or a mixture of these.

Any pattern may be used as the pattern, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The thickness of the pattern layer 3 is preferably within the range of 1 [μm] or more and 10 [μm] or less. This is because when the pattern layer 3 has a thickness of 1 [μm] or more, clear printing is possible. When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

The pattern layer 3 may include, for example, a solid colored substrate layer for hiding the color and pattern of a base to which the decorative sheet 1 is attached, and a pattern layer for adding a pattern for imparting the designability.

<Adhesive Layer>

The adhesive layer 4 is laminated on one side (upper side in the FIGURE) of the pattern layer 3 to bond the pattern layer 3 and the transparent resin layer 5 together.

For example, urethane, acrylic, ethylene-vinyl acetate copolymer, vinyl chloride-vinyl acetate copolymer, polyester, polyolefin, or the like can be used as the material of the adhesive layer 4. Polyolefin resin is particularly preferred because it provides good adhesion with the transparent resin layer 5.

<Transparent Resin Layer>

The transparent resin layer 5 is laminated on one side (the top side in the FIGURE) of the adhesive layer 4, and is formed of a resin composition containing the above-described biomass-derived (plant-derived) polyethylene. More specifically, the transparent resin layer 5 is a resin layer formed of a resin composition containing biomass-derived polyethylene obtained by polymerizing the above-described biomass-derived ethylene-containing monomer. That is, the transparent resin layer 5 may be formed using a resin composition containing the biomass-derived polyethylene used in the colored substrate layer 2. It may also contain a fossil fuel-derived polyethylene obtained by polymerizing a monomer containing a fossil fuel-derived ethylene and at least one of a fossil fuel-derived ethylene and α-olefin.

The transparent resin layer 5 may contain the above-described biomass-derived ethylene in an amount of 5% by mass or more, preferably 5 to 90% by mass, more preferably 25 to 75% by mass, most preferably 40 to 75% by mass relative to the total amount of the transparent resin layer 5. When the concentration of biomass-derived ethylene in the transparent resin layer 5 is 5% by mass or more, it is possible to reduce the amount of fossil fuel used compared to conventional methods, and a carbon-neutral decorative sheet can be achieved.

The density of the transparent resin layer 5 is within the range of 0.92 [g/cm$^3$] or more and 0.99 [g/cm$^3$] or less, preferably 0.94 [g/cm$^3$] or more and 0.98 [g/cm$^3$] or less, more preferably 0.95 [g/cm$^3$] or more and 0.97 [g/cm$^3$] or less. The density of the transparent resin layer is a value measured according to the method specified in the method A of JIS K 7112-1980 after annealing it according to JIS K 6760-1995. When the density of the transparent resin layer 5 is [g/cm$^3$] or more, the rigidity of the transparent resin layer 5 can be increased. When the density of the transparent resin layer 5 is 0.99 [g/cm$^3$] or less, the transparency and mechanical strength of the transparent resin layer 5 can be increased.

The transparent resin layer 5 has a thickness of 55 to 150 [μm], preferably 55 to 100 [μm], more preferably 60 to 80 [μm].

The transparent resin layer 5 may contain biomass-derived high-density polyethylene as the biomass-derived polyethylene.

The transparent resin layer 5 may also contain, as the biomass-derived polyethylene, one that is obtained by blending biomass-derived high-density polyethylene and biomass-derived low-density polyethylene at a ratio within the range of 100:0 to 20:80, respectively.

The biomass degree of the transparent resin layer 5 as a whole may be in the range of 10% or higher and 90% or lower.

The production method of the transparent resin layer 5 is not particularly limited, and a known production method can be used. In the fifth embodiment, preferably extrusion molding is used, and more preferably extrusion molding is performed by T-die extrusion or inflation molding.

In the fifth embodiment, it is preferable that the transparent resin layer 5 and the colored substrate layer 2 satisfy the following specific relationship with respect to density, thickness, and biomass degree (concentration of biomass-derived ethylene).

In the fifth embodiment, a density d1 of the transparent resin layer 5 and a density required to function as the transparent resin layer 5, whereas productivity is required to function as the colored substrate layer 2.

The ratio (d2/d1) of the density d1 of the transparent resin layer 5 and the density d2 of the colored substrate layer 2 is preferably in the range of 1.1 or higher and 1.5 or lower, more preferably 1.1 or higher and 1.3 or lower, and even more preferably 1.1 or higher and 1.2 or lower. When the density ratio of the transparent resin layer and the colored substrate layer is within this range, even when biomass-derived polyethylene is used, the decorative sheet can have the required suitability for extrusion and suitability for bending.

In the fifth embodiment, a thickness t1 of the transparent resin layer 5 and a thickness t2 of the colored substrate layer 2 preferably satisfy $t1 \geq t2$. This is because some thickness is required to function as the transparent resin layer 5, whereas the colored substrate layer 2 does not require a thickness as large as that of the transparent resin layer 5 to provide its function.

The ratio (t1/t2) of the thickness t1 of the transparent resin layer 5 and the thickness t2 of the colored substrate layer 2 is preferably in the range of 1.1 or higher and 3 or lower, more preferably 1.1 or higher and 2 or lower, and even more preferably 1.1 or higher and 1.5 or lower.

In the fifth embodiment, it is preferable that the concentration C1 of biomass-derived ethylene in the transparent resin layer 5 and the concentration C2 of biomass-derived ethylene in the colored substrate layer 2 satisfy C1>C2. This is because since a large thickness is required to function as the transparent resin layer 5 and thus a large amount of ethylene is used, the amount of fossil fuel used can be reduced by increasing the biomass degree of the transparent resin layer 5.

A nucleating agent (for example, "Rikemaster CN-002" manufactured by Riken Vitamin Co., Ltd.) may be added to the biomass-derived polyethylene forming the transparent resin layer 5.

The nucleating agent is preferably added to polyethylene within the range of 500 [ppm] or more and 2000 [ppm] or less relative to the mass of polyethylene, more preferably within the range of 1500 [ppm] or more and 2000 [ppm] or less.

The transparent resin layer 5 may have added thereto, for example, one or more selected from various additives such as a coloring agent, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The transparent resin layer 5 preferably has sufficient transparency (transparent with no color, transparent with color, translucent) to allow one to see the pattern of the pattern layer 3 through the surface (upper side) of the decorative sheet 1.

Although the biomass-derived resin forming the transparent resin layer 5 was a biomass-derived polyethylene in the fifth embodiment, the present invention is not limited to this. For example, biomass-derived polypropylene, biomass-derived polybutylene, or the like may be used instead of the biomass-derived polyethylene described above. That is, in the fifth embodiment, a wide range of biomass-derived polyolefins can be used as the biomass-derived resin forming the transparent resin layer 5.

<Surface Protection Layer>

The surface protection layer 6 is laminated on one side (the upper side in the FIGURE) of the transparent resin layer 5 in order to provide the decorative sheet 1 with weather resistance, scratch resistance, stain resistance, design, or the like.

Thermosetting resin or ionizing radiation curing resin can be used for the surface protection layer 6, and, for example, can be formed using an acrylic resin composition.

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antimicrobial agent and an antifungal agent, for example, may be added to the surface protection layer 6 as needed.

<Uneven Part>

The uneven part 7 is formed by recesses provided in the transparent resin layer 5 and the surface protection layer 6 at a plurality of locations.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

An anticorrosion pigment may be added to the primer layer 8 to improve corrosion resistance.

The thickness of the primer layer 8 may be, for example, in the range of 1 [μm] or more and 10 [μm] or less.

The embodiment described above is an example of the present invention, and the present invention is not limited to the embodiment described above. Various modifications can be made according to a design and the like without departing from the technical idea of the present invention.

Effects of Fifth Embodiment

The decorative sheet 1 of the fifth embodiment achieves the effects described below.

(1) The colored substrate layer 2 and the transparent resin layer 5 are both resin layers formed of a resin composition containing biomass-derived polyethylene obtained by polymerizing a monomer containing biomass-derived ethylene. The transparent resin layer 5 contains biomass-derived ethylene, has a density within the range of 0.92 [g/cm$^3$] or more and 0.99 [g/cm$^3$] or less, and a thickness within the range of 55 [μm] or more and 150 [μm] or less. The colored substrate layer 2 contains biomass-derived ethylene, has a density within the range of 0.92 [g/cm$^3$] or more and 1.12 [g/cm$^3$] or less, and has a thickness within the range of 51 [μm] or more and 120 [μm] or less.

Therefore, even when a biomass-derived polyethylene, which is a plant-derived material, is used, a colored substrate layer 2 and a transparent resin layer 5 can be formed that have a high degree of hardness equivalent to the hardness of a structure formed using, for example, polypropylene.

As a result, a decorative sheet 1 capable of suppressing a decrease in surface hardness can be provided even when it is formed using a biomass-derived polyethylene, which is a plant-derived material.

Further, even when a biomass-derived polyethylene, which is a plant-derived material, is used, a transparent resin layer 5 can be formed having a high degree of transparency equivalent to the transparency of a structure formed using, for example, polypropylene.

(2) At least one of the transparent resin layer 5 and colored substrate layer 2 contains, as the biomass-derived polyethylene, biomass-derived high-density polyethylene and biomass-derived low-density polyethylene.

This makes it possible to form a transparent resin layer 5 and a colored substrate layer 2 having more flexibility.

(3) The transparent resin layer 5 contains, as the biomass-derived polyethylene, one that is obtained by blending biomass-derived high-density polyethylene and biomass-derived low-density polyethylene at a ratio within the range of 100:0 to 20:80, respectively. This makes it possible to form an even harder transparent resin layer 5.

(4) The colored substrate layer 2 contains, as the biomass-derived polyethylene, biomass-derived high-density polyethylene and low-density polyethylene, and the biomass degree is in the range of 10% or higher and 90% or lower.

This makes it possible to form a colored substrate layer 2 having good film-forming stability and sufficient softness as a decorative sheet.

(5) Assuming that the density of the transparent resin layer 5 is d1 and the density of the colored substrate layer 2 is d2, they satisfy d2≥d1.

As a result, a decorative sheet 1 having sufficient suitability for extrusion can be obtained.

(6) Assuming that the thickness of the transparent resin layer 5 is t1 and the thickness of the colored substrate layer 2 is t2, they satisfy t1≥t2.

As a result, a decorative sheet 1 having sufficient suitability for bending can be obtained.

The decorative material 10 of the fifth embodiment achieves the effect described below.

(7) The decorative material 10 includes the substrate 9 and the decorative sheet 1 laminated on at least one side thereof.

As a result, a decorative material 10 capable of suppressing a decrease in surface hardness can be provided even when it is formed using a biomass-derived polyethylene, which is a plant-derived material.

Third Example

The decorative materials of Examples 1 to 11 and Comparative Examples 1 to 5 will be described below with reference to the fifth embodiment.

Example 1

After applying corona discharge to one side of the substrate, a pattern layer printed with urethane-based printing ink, a urethane-based adhesive layer, a maleic anhydride-modified polyethylene resin layer (a transparent adhesive layer), a transparent resin layer, and a surface protection layer containing an acrylic resin composition as a main component were laminated on that side of the substrate in this order. After applying corona discharge to the other side of the substrate, a primer layer (thickness: 1 to 2 [μm]) made of polyester urethane resin was formed. A decorative sheet (total thickness: 135 [μm]) of Example 1 was thus obtained.

In Example 1, a colored substrate layer (thickness: 55 [μm]) formed of a resin composition containing biomass-derived high-density polyethylene and fossil fuel-derived low-density polyethylene was used as the substrate. The colored substrate layer was obtained by subjecting this resin composition to calendaring. The biomass degree of the colored substrate layer thus formed is 80%, and the density of the colored substrate layer is 1.08 [g/cm$^3$].

A transparent resin layer (thickness: 80 [μm]) formed of a resin composition containing biomass-derived polyethylene ("biomass polyethylene" manufactured by Braskem) was used as the transparent resin layer. This biomass-derived polyethylene was obtained by blending biomass-derived high-density polyethylene (SHC7260) and biomass-derived low-density polyethylene (SPB681) at a ratio (high-density polyethylene/low-density polyethylene) of 80/20. The transparent resin layer was obtained by extrusion-laminating this resin. The biomass degree of the transparent resin layer thus formed is 94%, and the density of the transparent resin layer is 0.95 [g/cm$^3$].

Example 2

The decorative sheet of Example 2 was obtained in the same manner as in Example 1, except that it was formed by, using the "biomass polyethylene" manufactured by Braskem, mixing biomass-derived high-density polyethylene (SHC7260) and biomass-derived low-density polyethylene (SPB681) at a ratio (high-density polyethylene/low-density polyethylene) of 100/0, and extrusion-laminating that resin. The biomass degree of the transparent resin layer thus formed was 94%, and the density was 0.96 [g/cm$^3$].

Example 3

The decorative sheet of Example 3 was obtained in the same manner as in Example 1, except that it was formed by, using the "biomass polyethylene" manufactured by Braskem, mixing biomass-derived high-density polyethylene (SHC7260) and biomass-derived low-density polyethylene (SPB681) at a ratio (high-density polyethylene/low-density polyethylene) of 60/40, and extrusion-laminating that resin. The density of the transparent resin layer thus formed was 0.94 [g/cm$^3$].

Example 4

The decorative sheet of Example 4 was obtained in the same manner as in Example 1, except that it was formed by, using the "biomass polyethylene" manufactured by Braskem, mixing biomass-derived high-density polyethylene (SHC7260) and biomass-derived low-density polyethylene (SPB681) at a ratio (high-density polyethylene/low-density polyethylene) of 50/50, and extrusion-laminating that resin. The density of the transparent resin layer thus formed was 0.93 [g/cm$^3$].

Example 5

The decorative sheet of Example 5 was obtained in the same manner as in Example 1, except that it was formed by, using the "biomass polyethylene" manufactured by Braskem, mixing biomass-derived high-density polyethylene (SHC7260) and biomass-derived low-density polyethylene (SPB681) at a ratio (high-density polyethylene/low-density polyethylene) of 30/70, and extrusion-laminating that resin. The density of the transparent resin layer thus formed was 0.92 [g/cm$^3$].

Example 6

The decorative sheet of Example 6 was obtained in the same manner as in Example 1 except that the thickness of the transparent resin layer was 55 [μm] and the thickness of the colored substrate layer was 55 [μm].

Example 7

The decorative sheet of Example 7 was obtained in the same manner as in Example 1 except that the thickness of the transparent resin layer was 150 [μm].

Example 8

The decorative sheet of Example 8 was obtained in the same manner as in Example 1 except that the density of the colored substrate layer was 0.92 [g/cm$^3$].

Example 9

The decorative sheet of Example 9 was obtained in the same manner as in Example 1 except that the density of the colored substrate layer was 1.12 [g/cm$^3$].

Example 10

The decorative sheet of Example 10 was obtained in the same manner as in Example 1 except that the thickness of the colored substrate layer was 51 [μm].

Example 11

The decorative sheet of Example 11 was obtained in the same manner as in Example 1 except that the thickness of the colored substrate layer was 120 [μm].

Comparative Example 1

The decorative sheet of Comparative Example 1 was obtained in the same manner as in Example 1, except that it was formed by, using the "biomass polyethylene" manufactured by Braskem, mixing biomass-derived high-density polyethylene (SHC7260) and biomass-derived low-density polyethylene (SPB681) at a ratio (high-density polyethylene/low-density polyethylene) of 0/100, and extrusion-laminating that resin. The density of the transparent resin layer thus formed was 0.91 [g/cm$^3$].

Comparative Example 2

The decorative sheet of Comparative Example 2 was obtained in the same manner as in Example 1 except that the thickness of the transparent resin layer was 30 [μm].

Comparative Example 3

The decorative sheet of Comparative Example 3 was obtained in the same manner as in Example 1 except that the thickness of the transparent resin layer was 200 [μm].

Comparative Example 4

The decorative sheet of Comparative Example 4 was obtained in the same manner as in Example 1 except that the thickness of the colored substrate layer was 40 [μm].

Comparative Example 5

The decorative sheet of Comparative Example 5 was obtained in the same manner as in Example 1 except that the thickness of the colored substrate layer was 150 [μm].

(Performance Evaluation and Evaluation Results)

The decorative sheets of Examples 1 to 11 and Comparative Examples 1 to 5 were evaluated on "haze (%) of the transparent resin layer", "pencil hardness", "Hoffman scratch test", "suitability for extrusion", and "bend whitening". The evaluation was carried out as follows.

<Haze (%) of Transparent Resin Layer>

The haze % of the transparent resin layer was measured using an ultraviolet-visible-near-infrared spectrophotometer (UV-3600 manufactured by Shimadzu Corporation).

For each of the Examples and Comparative Examples, a resin having the same composition as the transparent resin layer of the corresponding Example was extruded so that the obtained resin film had a thickness of 70 [μm] or more and 80 [μm] or less. The haze at a wavelength of 555 [nm] was measured with a spectrophotometer (integrating sphere) to evaluate the haze. The sample was rated as "A" when the haze was lower than 15%, rated as "B" when the haze was in the range of 15% or higher and lower than 25%, and rated as "C" when the haze was 25% or higher.

In this example, it was assumed that samples rated "A" and "B" are suitable.

<Pencil Hardness>

The pencil hardness was measured with a (automatic) pencil hardness tester (C221A manufactured by Yoshimitsu Seiki).

For each of the Examples and Comparative Examples, after carrying out a pencil hardness test using pencils with different hardnesses on the decorative material including the decorative sheet, damage (scratching) on the surface (surface protection layer) was checked to evaluate the surface hardness. When damage on the surface was confirmed after conducting the pencil hardness test using a pencil having a hardness of 2 B or greater, the sample was rated as "A", and when damage on the surface was confirmed after conducting the pencil hardness test using a pencil having a hardness of 4 B or greater, the sample was rated as "B". When damage on the surface was confirmed after conducting the pencil hardness test using a pencil having a hardness of 5 B or lower, the sample was rated as "C".

In this example, it was assumed that samples rated "A" and "B" are suitable.

<Hoffman Scratch Test>

The Hoffman scratch test was conducted by setting a scratch blade (φ7 cylindrical blade) so that it came into contact with the surface of the decorative sheet at an angle of 45°, and moving the tester over the decorative sheet.

The scratching load (weight) was gradually increased from 200 to 2000 g (in increments of 200 g), and the samples were evaluated based on the load (g) at which a scratch was formed in the sample surface. When a scratch was formed at a load of 800 g, it was specified as "600 g" in the table as the withstand load.

In this example, a sample with a withstand load of "200 g" was considered defective.

<Suitability for Extrusion>

A transparent resin layer was extruded to check the suitability for production (suitability for extrusion).

When it was able to be produced (molded) without any problems, it was rated as "Good" (suitable). On the other hand, samples that had the possibility of being defective were rated as "Poor" (unsuitable).

<Bend Whitening>

Using a decorative sheet laminated with a MDF (that is, a decorative material), the suitability for V-cutting (whether there is whitening at the bent part or not) was checked.

Those that did not have whitening were rated as "Good" (suitable), those that had slight whitening were rated as "Fair" (suitable), and those that had whitening were rated as "Poor" (unsuitable).

TABLE 4

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Haze | B | B | A | A | A | B | B | B | B |
| Pencil hardness | B | A | B | B | B | B | B | B | B |
| Hoffman scratch test | 600 | 600 | 500 | 400 | 300 | 600 | 600 | 600 | 600 |
| Suitability for extrusion | Good | Good | Good | Good | Good | Good | Good | Fair | Good |
| Suitability for bending | Good | Good | Good | Good | Good | Good | Good | Good | Good |

TABLE 5

| | Ex. 10 | Ex. 11 | Comp. Ex. 1 | Comp. Ex. 2 | Comp. Ex. 3 | Comp. Ex. 4 | Comp. Ex. 5 |
|---|---|---|---|---|---|---|---|
| Haze | B | B | A | B | B | B | B |
| Pencil hardness | B | B | D | B | B | B | B |
| Hoffman scratch test | 600 | 600 | 200 | 600 | 600 | 200 | 600 |
| Suitability for extrusion | Good | Good | Acceptable | Poor | Good | Good | Good |
| Suitability for bending | Good | Acceptable | Good | Good | Poor | Good | Poor |

The various kinds of performance evaluation results obtained as described above showed that the decorative sheets of Examples 1 to 11 exhibited good performance in all evaluation tests. On the other hand, the decorative sheets of Comparative Examples 1 to 5 exhibited insufficient performance in at least part of the evaluation tests.

Sixth Embodiment

The structure of a decorative material 10 will be described with reference to the FIGURE.

As shown in the FIGURE, the decorative material 10 includes a decorative sheet 1 and a substrate 9. The specific structure of the decorative sheet 1 will be described later.

Since the structure of the decorative material 10 of the sixth embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer (colored thermoplastic resin layer) 2, a pattern layer 3, an adhesive layer 4, a transparent resin layer (transparent thermoplastic resin layer) 5, a surface protection layer 6, an uneven part 7, and a primer layer 8.

<Colored Substrate Layer>

The colored substrate layer 2 is a resin layer formed using a thermoplastic resin, and is a colored resin layer formed using a resin composition containing biomass-derived (plant-derived) polyethylene.

The composition of the colored substrate layer 2 will be described in detail below.

(Biomass-Derived Polyethylene)

In the sixth embodiment, the biomass-derived polyethylene is obtained by polymerizing monomers containing biomass-derived ethylene. The biomass-derived ethylene is not particularly limited, and an ethylene produced by a conventionally known method can be used. Since biomass-derived ethylene is used as the raw material monomer, the polyethylene obtained by the polymerization thereof will be biomass-derived.

The raw material monomer for polyethylene does not have to contain 100% by mass of biomass-derived ethylene.

The monomer, which is a raw material for biomass-derived polyethylene, may further contain at least one of fossil fuel-derived ethylene and fossil fuel-derived α-olefin, and/or may further contain a biomass-derived α-olefin.

Although the number of carbon atoms of the α-olefin is not particularly limited, those having 3 to 20 carbon atoms can usually be used, and preferably butylene, hexene, or octene may be used. This is because butylene, hexene, and octene can be produced by polymerization of ethylene as a biomass-derived raw material. In addition, when such an α-olefin is contained, the polyethylene obtained by the polymerization has an alkyl group as a branched structure. This allows it to have more flexibility than a simple linear polyethylene.

By using an ethylene as a biomass-derived raw material, it is theoretically possible to produce a polyethylene from 100% biomass-derived components.

The biomass-derived ethylene concentration in the polyethylene (hereinafter may also referred to as "biomass degree") is a value obtained by measuring the biomass-derived carbon content by radioactive carbon (C14) measurement. It is known that, since carbon dioxide in the atmosphere contains some C14 (105.5 pMC), the C14 content in plants that grow by taking in carbon dioxide in the atmosphere, such as corn, is also about 105.5 pMC. It is also known that fossil fuels contain almost no C14. Therefore, the proportion of biomass-derived carbon can be calculated by measuring the proportion of C14 in all the carbon atoms in polyethylene. In the sixth embodiment, the content P bio of biomass-derived carbon can be determined as follows, where P C14 is the content of C14 in polyethylene.

$$P\ bio\ (\%)=P\ C14/105.5\times 100$$

In the sixth embodiment, theoretically, if the raw material of polyethylene is completely biomass-derived ethylene, the biomass-derived ethylene concentration is 100%, and the biomass degree of the biomass-derived polyethylene is 100. The concentration of biomass-derived ethylene in a fossil fuel-derived polyethylene produced only from a fossil fuel-derived raw material is 0%, and the biomass degree of the fossil fuel-derived polyethylene is 0.

In the sixth embodiment, the biomass-derived polyethylene and the decorative sheet containing the polyethylene need not have a biomass degree of 100.

In the sixth embodiment, the polymerization method of the biomass-derived ethylene-containing monomers is not particularly limited, and a conventionally known method can be used. The polymerization temperature and polymerization pressure should be adjusted as appropriate according to the polymerization method and polymerization device. The polymerization device is also not particularly limited, and a conventionally known device can be used. An example of a method for polymerizing ethylene-containing monomers will now be described.

The polymerization method for an ethylene polymer or a copolymer of ethylene and α-olefin can be selected as appropriate depending on the type of polyethylene desired, for example, the difference in density and branching, such as high-density polyethylene (HDPE), medium-density polyethylene (MDPE), low-density polyethylene (LDPE), and linear low-density polyethylene (LLDPE). For example, the polymerization is preferably performed using a multi-site catalyst, such as a Ziegler-Natta catalyst, or a single-site catalyst, such as a metallocene catalyst, as the polymerization catalyst by one of gas phase polymerization, slurry polymerization, solution polymerization, and high pressure ion polymerization, and in one or more stages.

An ethylene polymer or an ethylene/α-olefin copolymer may be used alone as the biomass-derived polyethylene, or two or more of them may be used in combination.

(Resin Composition Containing Biomass-Derived Polyethylene)

In the sixth embodiment, the resin composition contains the above-described polyethylene as a main component. The resin composition contains biomass-derived ethylene in an amount of 5% by mass or more, preferably 5 to 95% by mass, more preferably 25 to 75% by mass, relative to the total amount of the resin composition. When the concentration of biomass-derived ethylene in the resin composition is 5% by mass or more, it is possible to reduce the amount of fossil fuel used compared to conventional methods, and a carbon-neutral decorative sheet can be achieved.

The above resin composition may contain two or more polyethylenes having different biomass degrees. In this case, the concentration of biomass-derived ethylene in the resin composition as a whole needs to be within the above range.

The above resin composition may further contain a fossil fuel-derived polyethylene obtained by polymerizing a monomer containing a fossil fuel-derived ethylene and at least one of a fossil fuel-derived ethylene and α-olefin. That is, in the sixth embodiment, the resin composition may be a mixture of biomass-derived polyethylene and fossil fuel-derived polyethylene. The mixing method is not particularly limited, and a known mixing method can be used. For example, dry blending or melt blending may be used.

According to the sixth embodiment, the resin composition preferably contains 5 to 90% by mass, more preferably 25 to 75% by mass of biomass-derived polyethylene and preferably 10 to 95% by mass, more preferably 25 to 75% by mass of fossil fuel-derived polyethylene. Even when such a mixed resin composition is used, the concentration of biomass-derived ethylene in the resin composition as a whole needs to be within the above range.

Various additives other than polyethylene, which is the main component, may be added to the resin composition produced in the production process of the resin composition as long as the characteristics thereof are not impaired. Examples of additives include plasticizers, ultraviolet stabilizers, anti-coloring agents, matting agents, deodorants, flame retardants, anti-weathering agents, antistatic agents, yarn friction reducing agents, slip agents, release agents, antioxidants, ion exchange agents, and color pigments. These additives are added in an amount of preferably 1 to 20% by mass, preferably 1 to 10% by mass, relative to the total amount of the resin composition.

As described above, the colored substrate layer 2 contains biomass-derived ethylene in an amount of 5% by mass or more, preferably 5 to 90% by mass, more preferably 25 to 75% by mass, most preferably 40 to 75% by mass relative to the total amount of the colored substrate layer 2. When the concentration of biomass-derived ethylene in the colored substrate layer 2 is 5% by mass or more, it is possible to reduce the amount of fossil fuel used compared to conventional methods, and a carbon-neutral decorative sheet can be achieved.

The density of the colored substrate layer 2 is within the range of 0.92 [g/cm$^3$] or more and 1.12 [g/cm$^3$] or less, preferably 0.98 [g/cm$^3$] or more and 1.10 [g/cm$^3$] or less. The density of the colored substrate layer 2 is a value measured according to the method specified in the method A of JIS K 7112-1980 after annealing it according to JIS K 6760-1995. When the density of the colored substrate layer 2 is 0.92 [g/cm$^3$] or more, the rigidity of the colored substrate layer 2 can be increased. When the density of the colored substrate layer 2 is 1.12 [g/cm$^3$] or less, the transparency and mechanical strength of the colored substrate layer 2 can be increased.

The biomass-derived polyethylene contained in the colored substrate layer 2 may contain biomass-derived high-density polyethylene and biomass-derived low-density polyethylene, biomass-derived high-density polyethylene and fossil fuel-derived low-density polyethylene, or fossil fuel-derived high-density polyethylene and biomass-derived low-density polyethylene. The biomass degree of the colored substrate layer 2 as a whole may be in the range of 10% or higher and 90% or lower.

Biomass-derived high-density polyethylene is polyethylene having a density greater than 0.94. Biomass-derived low-density polyethylene is polyethylene having a density of 0.94 or less.

The colored substrate layer 2 preferably contains, as the biomass-derived polyethylene, one that is obtained by blending biomass-derived high-density polyethylene and low-density polyethylene (either biomass-derived or fossil fuel-derived) at a ratio within the range of 95:5 to 70:30, respectively. When the content of the low-density polyethylene is low, the film formation becomes unstable, and when the content of the low-density polyethylene is high, the product becomes too soft.

The production method of the colored substrate layer 2 is not particularly limited, and a known production method can be used. In the sixth embodiment, preferably calendaring is used.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The thickness of the colored substrate layer 2 is preferably in the range of 40 [μm] or more and 200 [μm] or less, more preferably in the range of 51 [μm] or more and 120 [μm] or less, and even more preferably in the range of 55 [μm] or more and 100 [μm] or less. This is because, when the thickness of the colored substrate layer 2 made of biomass-derived polyethylene is 40 [μm] or more, it can absorb irregularities or bumps on the underlying floor material or the like, which improves the finish of the decorative sheet 1. When the thickness of the colored substrate layer 2 is 200 [μm] or less, the manufacturing cost of the decorative sheet 1 can be reduced without forming the colored substrate layer 2 thicker than necessary.

Although the biomass-derived resin forming the colored substrate layer 2 was a biomass-derived polyethylene in the sixth embodiment, the present invention is not limited to this. For example, biomass-derived polypropylene, biomass-derived polybutylene, or the like may be used instead of the biomass-derived polyethylene described above. That is, in the sixth embodiment, a wide range of biomass-derived polyolefins can be used as the biomass-derived resin forming the colored substrate layer 2.

<Pattern Layer>

The pattern layer 3 is laminated on one side (the upper side in the FIGURE) of the colored substrate layer 2, and is a layer for adding a pattern for imparting design. The design layer 3 may be replaced with the coloring of the colored substrate layer 2, in which case the design layer 3 may be omitted.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

Examples of binder resins that can be used include, but are not limited to, urethane-based resins, acrylic resins, vinyl chloride-acetate resins, polyimide-based resins, nitrocellulose, or a mixture of these.

Any pattern may be used as the pattern, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The thickness of the pattern layer 3 is preferably within the range of 1 [μm] or more and 10 [μm] or less. This is because when the pattern layer 3 has a thickness of 1 [μm] or more, clear printing is possible. When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

The pattern layer 3 may include, for example, a solid colored substrate layer for hiding the color and pattern of a base to which the decorative sheet 1 is attached, and a pattern layer for adding a pattern for imparting the designability.

<Adhesive Layer>

The adhesive layer 4 is laminated on one side (upper side in the FIGURE) of the pattern layer 3 to bond the pattern layer 3 and the transparent resin layer 5 together.

For example, urethane, acrylic, ethylene-vinyl acetate copolymer, vinyl chloride-vinyl acetate copolymer, polyester, polyolefin, or the like can be used as the material of the adhesive layer 4. Polyolefin resin is particularly preferred because it provides good adhesion with the transparent resin layer 5.

<Transparent Resin Layer>

The transparent resin layer 5 is laminated on one side (the top side in the FIGURE) of the adhesive layer 4, and is formed of a resin composition containing the above-described biomass-derived (plant-derived) polyethylene. More specifically, the transparent resin layer 5 is a resin layer formed of a resin composition containing biomass-derived polyethylene obtained by polymerizing the above-described biomass-derived ethylene-containing monomer. That is, the transparent resin layer 5 may be formed using a resin composition containing the biomass-derived polyethylene used in the colored substrate layer 2. It may also contain a fossil fuel-derived polyethylene obtained by polymerizing a monomer containing a fossil fuel-derived ethylene and at least one of a fossil fuel-derived ethylene and α-olefin.

The transparent resin layer 5 may contain the above-described biomass-derived ethylene in an amount of 5% by mass or more, preferably 5 to 90% by mass, more preferably 25 to 75% by mass, most preferably 40 to 75% by mass relative to the total amount of the transparent resin layer 5. When the concentration of biomass-derived ethylene in the transparent resin layer 5 is 5% by mass or more, it is possible to reduce the amount of fossil fuel used compared to conventional methods, and a carbon-neutral decorative sheet can be achieved.

The density of the transparent resin layer 5 is within the range of 0.92 [g/cm$^3$] or more and 0.99 [g/cm$^3$] or less, preferably 0.94 [g/cm$^3$] or more and 0.98 [g/cm$^3$] or less, more preferably 0.95 [g/cm$^3$] or more and 0.97 [g/cm$^3$] or less. The density of the transparent resin layer 5 is a value measured according to the method specified in the method A of JIS K 7112-1980 after annealing it according to JIS K 6760-1995. When the density of the transparent resin layer 5 is 0.92 [g/cm$^3$] or more, the rigidity of the transparent resin layer 5 can be increased. When the density of the transparent resin layer 5 is 0.99 [g/cm$^3$] or less, the transparency and mechanical strength of the transparent resin layer 5 can be increased.

The transparent resin layer 5 has a thickness of 55 to 150 [μm], preferably 55 to 100 [μm], more preferably 60 to 80 [μm].

The transparent resin layer 5 may contain biomass-derived high-density polyethylene as the biomass-derived polyethylene.

The transparent resin layer 5 may also contain, as the biomass-derived polyethylene, one that is obtained by blending biomass-derived high-density polyethylene and biomass-derived low-density polyethylene at a ratio within the range of 100:0 to 20:80, respectively.

The biomass degree of the transparent resin layer 5 as a whole may be in the range of 10% or higher and 90% or lower.

The production method of the transparent resin layer 5 is not particularly limited, and a known production method can be used. In the sixth embodiment, preferably extrusion molding is used, and more preferably extrusion molding is performed by T-die extrusion or inflation molding.

In the sixth embodiment, the transparent resin layer 5 and the colored substrate layer 2 preferably satisfy the following specific relationship with respect to density, thickness, and biomass degree (concentration of biomass-derived ethylene).

In the sixth embodiment, a density d1 of the transparent resin layer 5 and a density d2 of the colored substrate layer 2 preferably satisfy d2>d1. This is because formability is required to function as the transparent resin layer 5, whereas productivity is required to function as the colored substrate layer 2.

The ratio (d2/d1) of the density d1 of the transparent resin layer 5 and the density d2 of the colored substrate layer 2 is preferably in the range of 1.1 or higher and 1.5 or lower, more preferably 1.1 or higher and 1.3 or lower, and even more preferably 1.1 or higher and 1.2 or lower. When the density ratio of the transparent resin layer and the colored substrate layer is within this range, even when biomass-derived polyethylene is used, the decorative sheet can have the required suitability for extrusion and suitability for bending.

In the sixth embodiment, a thickness t1 of the transparent resin layer 5 and a thickness t2 of the colored substrate layer 2 preferably satisfy t1≥t2. This is because some thickness is required to function as the transparent resin layer 5, whereas the colored substrate layer 2 does not require a thickness as large as that of the transparent resin layer 5 to provide its function.

The ratio (t1/t2) of the thickness t1 of the transparent resin layer 5 and the thickness t2 of the colored substrate layer 2 is preferably in the range of 1.1 or higher and 3 or lower, more preferably 1.1 or higher and 2 or lower, and even more preferably 1.1 or higher and 1.5 or lower.

In the sixth embodiment, the concentration C1 of biomass-derived ethylene in the transparent resin layer 5 and the concentration C2 of biomass-derived ethylene in the colored substrate layer 2 preferably satisfy C1>C2. This is because since a large thickness is required to function as the transparent resin layer 5 and thus a large amount of ethylene is used, the amount of fossil fuel used can be reduced by increasing the biomass degree of the transparent resin layer 5.

A nucleating agent (for example, "Rikemaster CN-002" manufactured by Riken Vitamin Co., Ltd.) may be added to the biomass-derived polyethylene forming the transparent resin layer 5.

The nucleating agent is preferably added to polyethylene within the range of 500 [ppm] or more and 2000 [ppm] or less relative to the mass of polyethylene, more preferably within the range of 1500 [ppm] or more and 2000 [ppm] or less.

The transparent resin layer 5 may have added thereto, for example, one or more selected from various additives such as a coloring agent, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The transparent resin layer 5 preferably has sufficient transparency (transparent with no color, transparent with color, translucent) to allow one to see the pattern of the pattern layer 3 through the surface (upper side) of the decorative sheet 1.

Although the biomass-derived resin forming the transparent resin layer 5 was a biomass-derived polyethylene in the sixth embodiment, the present invention is not limited to this. For example, biomass-derived polypropylene, biomass-derived polybutylene, or the like may be used instead of the biomass-derived polyethylene described above. That is, in the sixth embodiment, a wide range of biomass-derived polyolefins can be used as the biomass-derived resin forming the transparent resin layer 5.

<Surface Protection Layer>

The surface protection layer 6 is laminated on one side (the upper side in the FIGURE) of the transparent resin layer 5 in order to provide the decorative sheet 1 with weather resistance, scratch resistance, stain resistance, design, or the like.

The surface protection layer 6 is made of urethane (meth) acrylate, which is a resin composition containing at least polyol, an isocyanate compound, and hydroxy (meth)acrylate. In the surface protection layer 6, at least one of the polyol, isocyanate compound, and hydroxy(meth)acrylate constituting the urethane (meth)acrylate described above contains a biomass-derived component. In other words, the surface protection layer 6 contains a biomass-derived component. At least one of the polyol, isocyanate compound, and hydroxy(meth)acrylate may or may not contain a biomass-derived component. In the following, urethane (meth)acrylate containing a biomass-derived component is also referred to as biourethane (meth)acrylate.

Urethane (meth)acrylate is obtained, for example, by reacting polyol and isocyanate with hydroxy (meth)acrylate. In the case of a biourethane (meth)acrylate, a plant-derived polyol can be used as the polyol, a plant-derived isocyanate can be used as the isocyanate, or both the polyol and isocyanate can be plant-derived.

Examples of the polyol include polyester polyols, which are reaction products of a polyfunctional alcohol and a polyfunctional carboxylic acid, polyether polyols, which are reaction products of a polyfunctional alcohol and a polyfunctional isocyanate, or polycarbonate polyols, which are reaction products of a polyfunctional alcohol and a carbonate. Each polyol will be described below in detail.

<Polyester Polyol>

When the polyester polyol contains a biomass-derived component, at least one of the polyfunctional alcohol and polyfunctional carboxylic acid contains the biomass-derived component. Examples of polyester polyols containing biomass-derived components are as follows.

Reaction product of biomass-derived polyfunctional alcohol and biomass-derived polyfunctional carboxylic acid Reaction product of fossil fuel-derived polyfunctional alcohol and biomass-derived polyfunctional carboxylic acid Reaction product of biomass-derived polyfunctional alcohol and fossil fuel-derived polyfunctional carboxylic acid Examples of biomass-derived polyfunctional alcohol are aliphatic polyfunctional alcohols obtained from plant materials such as corn, sugar cane, cassava, and sago palm. Examples of biomass-derived aliphatic polyfunctional alcohols that may be used include polypropylene glycol (PPG), neopentyl glycol (NPG), ethylene glycol (EG), diethylene glycol (DEG), butylene glycol (BG), and hexamethylene glycol obtained from plant materials by the following methods. These may be used alone or in combination.

Biomass-derived polypropylene glycol is produced from glycerol via 3-hydroxypropylaldehyde (HPA) by a fermentation process in which the plant material is degraded to produce glucose. Compared with polypropylene glycol produced by the EO production method, polypropylene glycols produced by a bio-method like this fermentation process yield useful by-products such as lactic acid in terms of safety, and also the production cost can be kept low.

Biomass-derived butylene glycol can be produced by obtaining succinic acid by producing glycol from a plant raw material and fermenting it, and then hydrogenating the succinic acid.

Biomass-derived ethylene glycol can be produced, for example, from bioethanol via ethylene. The bioethanol may be obtained by a conventional method.

Examples of fossil fuel-derived polyfunctional alcohol include compounds having 2 or more, preferably 2 to 8 hydroxyl groups per molecule. Specifically, the fossil fuel-derived polyfunctional alcohol is not particularly limited and conventionally known substances can be used. Examples thereof include polypropylene glycol (PPG), neopentyl glycol (NPG), ethylene glycol (EG), diethylene glycol (DEG), butylene glycol (BG), and hexamethylene glycol. Further examples are triethylene glycol, dipropylene glycol, 1,4-cyclohexanedimethanol, trimethylolpropane, glycerin, 1,9-nonanediol, 3-methyl-1,5-pentanediol, polyether polyols, polycarbonate polyols, polyolefin polyols, and acrylic polyols. These may be used alone or in combination of two or more.

Examples of biomass-derived polyfunctional carboxylic acids include aliphatic polyfunctional carboxylic acids obtained from plant materials such as recyclable plant-derived oils such as soybean oil, linseed oil, tung oil, coconut oil, palm oil, and castor oil, and reclaimed oils obtained by recycling waste edible oils or the like composed mainly of those reproducible plant-derived oils. Examples of biomass-derived aliphatic polyfunctional carboxylic acids include sebacic acid, succinic acid, phthalic acid, adipic acid, glutaric acid, and dimer acids. For example, sebacic acid is produced with heptyl alcohol as a by-product by alkaline thermal decomposition of ricinoleic acid obtained from castor oil. In the present invention, it is particularly preferable to use biomass-derived succinic acid or biomass-derived sebacic acid. These may be used alone or in combination of two or more.

Aliphatic polyfunctional carboxylic acid or aromatic polyfunctional carboxylic acid may be used as the fossil fuel-derived polyfunctional carboxylic acid. The fossil fuel-derived aliphatic polyfunctional carboxylic acid is not particularly limited and a conventionally known substance can be used. Examples thereof include adipic acid, dodecanedioic acid, tetrahydrophthalic anhydride, hexahydrophthalic anhydride, maleic anhydride, itaconic anhydride, sebacic acid, succinic acid, glutaric acid, dimer acids, and ester compounds thereof. The fossil fuel-derived aromatic polyfunctional carboxylic acid is not particularly limited and a conventionally known substance can be used. Examples thereof include isophthalic acid, terephthalic acid, naphthalene dicarboxylic acid, phthalic anhydride, trimellitic acid, pyromellitic acid, and ester compounds thereof. These may be used alone or in combination of two or more.

<Polyether Polyol>

When the polyether polyol contains a biomass-derived component, at least one of the polyfunctional alcohol and polyfunctional isocyanate contains the biomass-derived component. Examples of polyether polyols containing biomass-derived components are as follows.

Reaction product of biomass-derived polyfunctional alcohol and biomass-derived polyfunctional isocyanate Reaction product of fossil fuel-derived polyfunctional alcohol and biomass-derived polyfunctional isocyanate Reaction product of biomass-derived polyfunctional alcohol and fossil fuel-derived polyfunctional isocyanate The biomass-derived polyfunctional alcohol and fossil fuel-derived polyfunctional alcohol may be those described with respect to the polyester polyol.

The biomass-derived polyfunctional isocyanate may be one obtained by converting a plant-derived divalent carboxylic acid to a terminal amino group by amidation and reduction thereof, and then reacting it with phosgene to convert the amino group to an isocyanate group. The biomass-derived polyfunctional isocyanate may be, for example, a biomass-derived diisocyanate. Examples of biomass-derived diisocyanates include dimer acid diisocyanate (DDI), octamethylene diisocyanate, and decamethylene diisocyanate. A plant-derived diisocyanate can also be obtained by using a plant-derived amino acid as the raw material and converting the amino group into an isocyanate group. For example, lysine diisocyanate (LDI) is obtained by methyl-esterifying the carboxyl group of the lysine and then converting the amino group into an isocyanate group. For example, 1,5-pentamethylene diisocyanate is obtained by decarboxylating the carboxyl group of the lysine and then converting the amino group to an isocyanate group.

Other examples of methods for synthesizing 1,5-pentamethylene diisocyanate include phosgenation and carbamation. More specifically, phosgenation is a method for synthesizing 1,5-pentamethylene diisocyanate by reacting 1,5-pentamethylenediamine or a salt thereof directly with phosgene, or by suspending a hydrochloride of pentamethylenediamine in an inert solvent and reacting it with phosgene. Carbamation is a method for synthesizing 1,5-pentamethylenediisocyanate by first carbamating 1,5-pentamethylenediamine or a salt thereof to form pentamethylenedicarbamate (PDC), and then thermally decomposing it. An example of a suitable polyisocyanate for use in the present invention is a 1,5-pentamethylene diisocyanate-based polyisocyanate (STABiO (registered trademark)) manufactured by Mitsui Chemicals, Inc.

The fossil fuel-derived polyfunctional isocyanate is not particularly limited and a conventionally known substance can be used. Examples thereof are aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis(phenylene isocyanate) (MDI), dulylene diisocyanate, tolidine diisocyanate, xylylene diisocyanate (XDI), 1,5-naphthalene diisocyanate, benzidine diisocyanate, o-nitro benzidine diisocyanate, and 4,4'-diisocyanate dibenzyl. Further examples are aliphatic diisocyanates such as methylene diisocyanate, 1,4-tetramethylene diisocyanate, 1,6-hexamethylene diisocyanate, and 1,10-decamethylene diisocyanate; and alicyclic diisocyanates such as 1,4-cyclohexylene diisocyanate, 4,4-methylenebis(cyclohexyl isocyanate), 1,5-tetrahydronaphthalene diisocyanate, isophorone diisocyanate, hydrogenated MDI, and hydrogenated XDI. These may be used alone or in combination of two or more.

<Polycarbonate Polyol>

When the polycarbonate polyol contains a biomass-derived component, a reaction product of a polyfunctional alcohol containing a biomass-derived component and a fossil fuel-derived carbonate can be used as the polycarbonate polyol. Alternatively, a reaction product of a polyfunctional alcohol containing a fossil fuel-derived component and a carbonate containing a biomass-derived component can be used. The carbonate may be, for example, dimethyl carbonate, dipropyl carbonate, diethyl carbonate, diethylene carbonate, dibutyl carbonate, ethylene carbonate, or diphenyl carbonate. These can be used singly or in a combination of two or more.

The biomass-derived polyfunctional alcohol may be a biomass-derived polyfunctional alcohol described with respect to the polyester polyol.

<Isocyanate Compound>

Next, the isocyanate compound will be described. The isocyanate compound containing a biomass-derived component may be a biomass-derived polyfunctional isocyanate described with respect to the polyether polyol.

<Hydroxy (meth)acrylate>

Next, the hydroxy (meth)acrylate will be described. Examples of hydroxy (meth)acrylates include hydroxy (meth)acrylates having one (meth)acryloyl group such as hydroxyethyl (meth)acrylate, hydroxypropyl (meth)acrylate, hydroxybutyl (meth)acrylate, and 2-hydroxy-3-phenoxypropyl (meth)acrylate; and hydroxy (meth)acrylates having two or more (meth)acryloyl groups such as glycerin di(meth)acrylate, pentaerythritol tri(meth)acrylate, ditrimethylolpropane tri(meth)acrylate, dipentaerythritol penta(meth)acrylate, and sorbitol penta(meth)acrylate. These may be used alone or in combination of two or more thereof.

The surface protection layer 6 may contain nitrocellulose in addition to the biourethane (meth)acrylate described above. That is, the surface protection layer 6 may be formed of the biourethane (meth)acrylate described above, or may be formed by adding nitrocellulose to the biourethane (meth) acrylate.

<Nitrocellulose>

Nitrocellulose is a cellulose-based resin of a nitro group-substituted product obtained by nitration of a part of the hydroxyl groups of the cellulose skeleton. The cellulose skeleton of nitrocellulose resin is a biomass material. A common nitrocellulose can be used as the nitrocellulose without any trouble, but in particular, it is preferable to use one in which 1.3 to 2.7 nitro groups are substituted on average per glucose unit of the cellulose skeleton.

Nitrocelluloses are classified into L type and H type according to their molecular weight. For a better solubility in organic solvents, it is preferable to use the L type.

The surface protection layer 6 preferably has a biomass degree of 5% or higher, more preferably 5% or higher and 50% or lower, still more preferably 10% or higher and 50% or lower. When the biomass degree is within these ranges, it is possible to reduce the amount of fossil fuel used and the environmental impact. The weight of the surface protection layer 6 after being dried is preferably 0.1 [g/m$^2$] or higher and 15 [g/m$^2$] or lower, more preferably 3 [g/m$^2$] or higher and 10 [g/m$^2$] or lower, and even more preferably 6 [g/m$^2$] or higher and 9 [g/m$^2$] or lower. The thickness of the surface protection layer 6 is preferably 0.1 [μm] or more and 10 [μm] or less, more preferably 3 [μm] or more and 10 [μm] or less, even more preferably 6 [μm] or more and 9 [μm] or less.

Regarding the "biomass degree", for example, in the case of biourethane (meth)acrylate, as described above, it is obtained as a value obtained by measuring the content of biomass-derived carbon by radioactive carbon (C14) measurement.

Further, regarding the "biomass degree", for example, in the case of nitrocellulose, since the number of hydroxyl groups contained per glucose unit (formula weight=172) of the glucose units constituting the cellulose skeleton, which is the starting material, is three, one to three of these hydroxyl groups can be nitrated (hydrogen can be replaced by a nitro group (a non-biomass material with a formula weight of 46). Assuming that the original cellulose skeleton is formed of 100% by weight of biomass material, and the average number of substituted nitro groups per glucose unit is n, the ratio (% by weight) of biomass material to the entire nitrocellulose molecule can be calculated by $(172-n)\times100/(172-n+46n)$.

The ratio of the biomass material to the entire nitrocellulose molecule is about 78.8% by weight when one nitro group is substituted on average per glucose unit of the cellulose skeleton, about 64.9% by weight when two nitro groups are substituted, and about 55.0% by weight when three nitro groups are substituted (calculated using the above formula).

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antimicrobial agent and an antifungal agent, for example, may be added to the surface protection layer 6 as needed.

<Uneven Part>

The uneven part 7 is formed by recesses provided in the transparent resin layer 5 and the surface protection layer 6 at a plurality of locations.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

An anticorrosion pigment may be added to the primer layer 8 to improve corrosion resistance.

The thickness of the primer layer 8 may be, for example, in the range of 1 [μm] or more and 10 [μm] or less.

The embodiment described above is an example of the present invention, and the present invention is not limited to the embodiment described above. Various modifications can be made according to a design and the like without departing from the technical idea of the present invention.

Effects of Sixth Embodiment

The decorative sheet 1 of the sixth embodiment achieves the effects described below.

(1) The colored substrate layer 2 and the transparent resin layer 5 are both resin layers formed of a resin composition containing biomass-derived polyolefin, and the surface protection layer 6 contains a biomass-derived component.

This makes it possible to reduce the consumption of fossil fuels by using plant-derived materials, and at the same time provide a decorative sheet capable of maintaining physical properties suitable for use as a decorative sheet.

(2) The surface protection layer 6 is a resin layer formed of urethane (meth)acrylate, which is a resin composition containing at least polyol, an isocyanate compound, and hydroxy (meth)acrylate. At least one of the polyol, the isocyanate compound, and the hydroxy(meth)acrylate contained in the resin composition includes a biomass-derived component.

This makes it possible to reliably reduce the consumption of fossil fuels by using plant-derived materials, and at the same time provide a decorative sheet capable of reliably maintaining physical properties suitable for use as a decorative sheet.

(3) The polyol, which is a constituent element of the biourethane (meth)acrylate forming the surface protection layer 6, is a polyester polyol containing a biomass-derived component, a polyether polyol containing a biomass-derived component, or a polycarbonate polyol containing a biomass-derived component.

This makes it possible to more reliably reduce the consumption of fossil fuels by using plant-derived materials, and at the same time provide a decorative sheet capable of more reliably maintaining physical properties suitable for use as a decorative sheet.

(4) Among the possible polyols as a constituent element of the biourethane (meth)acrylate, the polyester polyol is a reaction product of a polyfunctional alcohol containing a biomass-derived component and a polyfunctional carboxylic acid containing a fossil fuel-derived component, or a reaction product of a polyfunctional alcohol containing a fossil fuel-derived component and a polyfunctional carboxylic acid containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(5) Among the possible polyols as a constituent element of the biourethane (meth)acrylate, the polyether polyol is a reaction product of a polyfunctional alcohol containing a biomass-derived component and a polyfunctional isocyanate containing a fossil fuel-derived component, or a reaction product of a polyfunctional alcohol containing a fossil fuel-derived component and a polyfunctional isocyanate containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(6) Among the possible polyols as a constituent element of the biourethane (meth)acrylate, the polycarbonate polyol is a reaction product of a polyfunctional alcohol containing a biomass-derived component and a carbonate containing a fossil fuel-derived component, or a reaction product of a polyfunctional alcohol containing a fossil fuel-derived component and a carbonate containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(7) The isocyanate compound as a constituent element of the biourethane (meth)acrylate forming the surface protection layer 6 is an isocyanate compound containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(8) The decorative material 10 includes the substrate 9 and the decorative sheet 1 laminated on at least one side thereof.

This makes it possible to reduce the consumption of fossil fuels by using plant-derived materials, and at the same time provide a decorative material capable of maintaining physical properties suitable for use as a decorative sheet.

Fourth Example

The decorative materials of Examples 1 to 9 and Reference Examples 1 to 3 will be described below with reference to the sixth embodiment.

Example 1

After applying corona discharge to one side of the substrate, a pattern layer printed with urethane-based printing ink, a urethane-based adhesive layer, a maleic anhydride-modified polyethylene resin layer (a transparent adhesive layer), a transparent resin layer, and a surface protection layer were laminated on that side of the substrate in this order. After applying corona discharge to the other side of the substrate, a primer layer (thickness: 1 to 2 [μm]) made of polyester urethane resin was formed. A decorative sheet (total thickness: 135 [μm]) of Example 1 was thus obtained.

In Example 1, a colored substrate layer (thickness: 55 [μm]) formed of a resin composition containing biomass-derived high-density polyethylene and fossil fuel-derived low-density polyethylene was used as the substrate. The colored substrate layer was obtained by subjecting this resin composition to calendaring. The biomass degree of the colored substrate layer thus formed is 80%, and the density of the colored substrate layer is 1.08 [g/cm$^3$].

A transparent resin layer (thickness: 80 [μm]) formed of a resin composition containing biomass-derived polyethylene ("biomass polyethylene" manufactured by Braskem) was used as the transparent resin layer. This biomass-derived polyethylene was obtained by blending biomass-derived high-density polyethylene (SHC7260) and biomass-derived low-density polyethylene (SPB681) at a ratio (high-density polyethylene/low-density polyethylene) of 80/20. The transparent resin layer was obtained by extrusion-laminating this resin. The biomass degree of the transparent resin layer thus formed is 94%, and the density of the transparent resin layer is 0.95 [g/cm$^3$].

A biourethane (meth)acrylate that is a reaction product of a polyester polyol containing a biomass-derived component, a fossil fuel-derived isocyanate compound, and a fossil fuel-derived hydroxy (meth)acrylate was used for the surface protection layer. A polyester polyol that is a reaction product of a polyfunctional alcohol containing a biomass-derived component and a fossil fuel-derived polyfunctional carboxylic acid was used as the polyester polyol containing a biomass-derived component.

Example 2

The decorative sheet of Example 2 was obtained in the same manner as in Example 1, except that a reaction product of a fossil fuel-derived polyfunctional alcohol and a polyfunctional carboxylic acid containing a biomass-derived component was used as the polyester polyol in the biourethane (meth)acrylate forming the surface protection layer.

Example 3

The decorative sheet of Example 3 was obtained in the same manner as in Example 1, except that a biourethane (meth)acrylate that is a reaction product of a fossil fuel-derived polyester polyol, an isocyanate compound containing a biomass-derived component, and a fossil fuel-derived hydroxy (meth)acrylate was used as the biourethane (meth) acrylate forming the surface protection layer.

Example 4

The decorative sheet of Example 4 was obtained in the same manner as in Example 1, except that polyether polyol was used as the polyol in the biourethane (meth)acrylate forming the surface protection layer. Specifically, a reaction product of a polyfunctional alcohol containing a biomass-derived component and a fossil fuel-derived polyfunctional isocyanate was used as the polyether polyol.

Example 5

The decorative sheet of Example 5 was obtained in the same manner as in Example 4, except that a reaction product of a fossil fuel-derived polyfunctional alcohol and a polyfunctional isocyanate containing a biomass-derived component was used as the polyether polyol in the biourethane (meth)acrylate forming the surface protection layer.

Example 6

The decorative sheet of Example 6 was obtained in the same manner as in Example 3, except that fossil fuel-derived polyether polyol was used as the polyol in the biourethane (meth)acrylate forming the surface protection layer.

Example 7

The decorative sheet of Example 7 was obtained in the same manner as in Example 1, except that polycarbonate polyol was used as the polyol in the biourethane (meth) acrylate forming the surface protection layer. Specifically, a reaction product of a polyfunctional alcohol containing a biomass-derived component and a fossil fuel-derived carbonate was used as the polycarbonate polyol.

Example 8

The decorative sheet of Example 8 was obtained in the same manner as in Example 3, except that fossil fuel-derived polycarbonate polyol was used as the polyol in the biourethane (meth)acrylate forming the surface protection layer.

Example 9

The decorative sheet of Example 9 was obtained in the same manner as in Example 1, except that the biomass-derived polyethylene for the transparent resin layer was formed using a resin obtained by mixing biomass-derived high-density polyethylene (SHC7260) and biomass-derived low-density polyethylene (SPB681) at a ratio (high-density polyethylene/low-density polyethylene) of 100/0.

Reference Example 1

The decorative sheet of Reference Example 1 was obtained in the same manner as in Example 1, except that the surface protection layer was formed of an acrylic resin-based UV-curable resin.

Reference Example 2

The decorative sheet of Reference Example 2 was obtained in the same manner as in Example 1, except that the transparent resin layer was obtained by extrusion-laminating only a fossil fuel-derived homopolypropylene resin manufactured by Prime Polymer Co., Ltd.

Reference Example 3

The decorative sheet of Reference Example 3 was obtained in the same manner as in Example 1, except that the colored substrate layer was obtained using only a fossil fuel-derived colored polyethylene resin.

(Performance Evaluation and Evaluation Results)

The decorative sheets of Examples 1 to 9 and Reference Examples 1 to 3 were evaluated on "haze (%) of the transparent resin layer", "pencil hardness", "Hoffman scratch test", "suitability for extrusion", and "bend whitening". The evaluation was carried out as follows.

<Haze (%) of Transparent Resin Layer>

The haze % of the transparent resin layer was measured using an ultraviolet-visible-near-infrared spectrophotometer (UV-3600 manufactured by Shimadzu Corporation).

For each of the Examples and Reference Examples, a resin having the same composition as the transparent resin layer of the corresponding Example was extruded so that the obtained resin film had a thickness of 70 [μm] or more and 80 [μm] or less. The haze at a wavelength of 555 nm was measured with a spectrophotometer (integrating sphere) to evaluate the haze. The sample was rated as "A" when the haze was lower than 15%, rated as "B" when the haze was in the range of 15% or higher and lower than 25%, and rated as "C" when the haze was 25% or higher.

In this example, it was assumed that samples rated "A" and "B" are suitable.

<Pencil Hardness>

The pencil hardness was measured with a (automatic) pencil hardness tester (C221A manufactured by Yoshimitsu Seiki).

For each of the Examples and Reference Examples, after carrying out a pencil hardness test using pencils with different hardnesses on the decorative material including the decorative sheet, damage (scratching) on the surface (surface protection layer) was checked to evaluate the surface hardness. When damage on the surface was confirmed after conducting the pencil hardness test using a pencil having a hardness of 2 B or greater, the sample was rated as "A", and when damage on the surface was confirmed after conducting the pencil hardness test using a pencil having a hardness of 4 B or greater, the sample was rated as "B". When damage on the surface was confirmed after conducting the pencil hardness test using a pencil having a hardness of 5 B or lower, the sample was rated as "C".

In this example, it was assumed that samples rated "A" and "B" are suitable.

<Hoffman Scratch Test>

The Hoffman scratch test was conducted by setting a scratch blade (φ7 cylindrical blade) so that it came into contact with the surface of the decorative sheet at an angle of 45°, and moving the tester over the decorative sheet.

The scratching load (weight) was gradually increased from 200 to 2000 g (in increments of 200 g), and the samples were evaluated based on the load (g) at which a scratch was formed in the sample surface. When a scratch was formed at a load of 800 g, it was specified as "600 g" in the table as the withstand load.

In this example, samples with a withstand load of "200 g" were considered defective.

<Suitability for Extrusion>

A transparent resin layer was extruded to check the suitability for production (suitability for extrusion).

When it was able to be produced (molded) without any problems, it was rated as "Good" (suitable). On the other hand, samples that had the possibility of being defective were rated as "Poor" (unsuitable).

<Bend Whitening>

Using a decorative sheet laminated with a MDF (that is, a decorative material), the suitability for V-cutting (whether there is whitening at the bent part or not) was checked.

Those that did not have whitening were rated as "Good" (suitable), those that had slight whitening were rated as "Fair" (suitable), and those that had whitening were rated as "Poor" (unsuitable).

TABLE 6

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Haze | B | B | B | B | B | B | B | B | B |
| Pencil hardness | B | B | B | B | B | B | B | B | A |
| Hoffman scratch test | 600 | 600 | 600 | 600 | 600 | 600 | 600 | 600 | 600 |
| Suitability for extrusion | Good | Good | Good | Good | Good | Good | Good | Good | Good |
| Suitability for bending | Good | Good | Good | Good | Good | Good | Good | Good | Good |

TABLE 7

| | Ref. Ex. 1 | Ref. Ex. 2 | Ref. Ex. 3 |
|---|---|---|---|
| Haze | B | A | B |
| Pencil hardness | B | B | B |
| Hoffman scratch test | 600 | 600 | 600 |
| Suitability for extrusion | Good | Good | Good |
| Suitability for bending | Good | Good | Good |

The various kinds of performance evaluation results obtained as described above showed that the performances of the decorative sheets of Examples 1 to 9 were higher than or equal to those of Reference Examples 1 to 3 in all evaluation tests. This shows that the decorative sheets of Examples 1 to 9 can reduce the consumption of fossil fuels by using plant-derived materials, and at the same time maintain physical properties suitable for use as a decorative sheet.

Seventh Embodiment

The structure of a decorative material 10 will be described with reference to the FIGURE.

As shown in the FIGURE, the decorative material 10 includes a decorative sheet 1 and a substrate 9. The specific structure of the decorative sheet 1 will be described later.

Since the structure of the decorative material 10 of the seventh embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer (colored thermoplastic resin layer) 2, a pattern layer 3, an adhesive layer 4, a transparent resin layer (transparent thermoplastic resin layer) 5, a surface protection layer 6, an uneven part 7, and a primer layer 8.

<Colored Substrate Layer>

The colored substrate layer 2 is a resin layer formed using a thermoplastic resin, and is a colored resin layer formed using a resin composition containing biomass-derived (plant-derived) polyethylene.

The composition of the colored substrate layer 2 will be described in detail below.

(Biomass-Derived Polyethylene)

In the seventh embodiment, the biomass-derived polyethylene is obtained by polymerizing monomers containing biomass-derived ethylene. The biomass-derived ethylene is not particularly limited, and an ethylene produced by a conventionally known method can be used. Since biomass-derived ethylene is used as the raw material monomer, the polyethylene obtained by the polymerization thereof will be biomass-derived.

The raw material monomer for polyethylene does not have to contain 100% by mass of biomass-derived ethylene.

The monomer, which is a raw material for biomass-derived polyethylene, may further contain at least one of fossil fuel-derived ethylene and fossil fuel-derived α-olefin, and/or may further contain a biomass-derived α-olefin.

Although the number of carbon atoms of the α-olefin is not particularly limited, those having 3 to 20 carbon atoms can usually be used, and preferably butylene, hexene, or octene may be used. This is because butylene, hexene, and octene can be produced by polymerization of ethylene as a biomass-derived raw material. In addition, when such an α-olefin is contained, the polyethylene obtained by the polymerization has an alkyl group as a branched structure. This allows it to have more flexibility than a simple linear polyethylene.

By using an ethylene as a biomass-derived raw material, it is theoretically possible to produce a polyethylene from 100% biomass-derived components.

The biomass-derived ethylene concentration in the polyethylene (hereinafter may also referred to as "biomass degree") is a value obtained by measuring the biomass-derived carbon content by radioactive carbon (C14) measurement. It is known that, since carbon dioxide in the atmosphere contains some C14 (105.5 pMC), the C14 content in plants that grow by taking in carbon dioxide in the atmosphere, such as corn, is also about 105.5 pMC. It is also known that fossil fuels contain almost no C14. Therefore, the proportion of biomass-derived carbon can be calculated by measuring the proportion of C14 in all the carbon atoms in polyethylene. In the seventh embodiment, the content P bio of biomass-derived carbon can be determined as follows, where P C14 is the content of C14 in polyethylene.

$$P\ bio\ (\%) = P\ C14/105.5 \times 100$$

In the seventh embodiment, theoretically, if the raw material of polyethylene is completely biomass-derived ethylene, the biomass-derived ethylene concentration is 100%, and the biomass degree of the biomass-derived polyethylene is 100. The concentration of biomass-derived ethylene in a fossil fuel-derived polyethylene produced only from a fossil fuel-derived raw material is 0%, and the biomass degree of the fossil fuel-derived polyethylene is 0.

In the seventh embodiment, the biomass-derived polyethylene and the decorative sheet containing the polyethylene need not have a biomass degree of 100.

In the seventh embodiment, the polymerization method of the biomass-derived ethylene-containing monomers is not particularly limited, and a conventionally known method can be used. The polymerization temperature and polymerization pressure should be adjusted as appropriate according to the polymerization method and polymerization device. The polymerization device is also not particularly limited, and a conventionally known device can be used. An example of a method for polymerizing ethylene-containing monomers will now be described.

The polymerization method for an ethylene polymer or a copolymer of ethylene and α-olefin can be selected as appropriate depending on the type of polyethylene desired, for example, the difference in density and branching, such as high-density polyethylene (HDPE), medium-density polyethylene (MDPE), low-density polyethylene (LDPE), and linear low-density polyethylene (LLDPE). For example, the polymerization is preferably performed using a multi-site catalyst, such as a Ziegler-Natta catalyst, or a single-site catalyst, such as a metallocene catalyst, as the polymerization catalyst by one of gas phase polymerization, slurry polymerization, solution polymerization, and high pressure ion polymerization, and in one or more stages.

An ethylene polymer or an ethylene/α-olefin copolymer may be used alone as the biomass-derived polyethylene, or two or more of them may be used in combination.

(Resin Composition Containing Biomass-Derived Polyethylene)

In the seventh embodiment, the resin composition contains the above-described polyethylene as a main component. The resin composition contains biomass-derived ethylene in an amount of 5% by mass or more, preferably 5 to 95% by mass, more preferably 25 to 75% by mass, relative to the total amount of the resin composition. When the concentration of biomass-derived ethylene in the resin composition is 5% by mass or more, it is possible to reduce the amount of fossil fuel used compared to conventional methods, and a carbon-neutral decorative sheet can be achieved.

The above resin composition may contain two or more polyethylenes having different biomass degrees. In this case, the concentration of biomass-derived ethylene in the resin composition as a whole needs to be within the above range.

The above resin composition may further contain a fossil fuel-derived polyethylene obtained by polymerizing a monomer containing a fossil fuel-derived ethylene and at least one of a fossil fuel-derived ethylene and α-olefin. That is, in the seventh embodiment, the resin composition may be a mixture of biomass-derived polyethylene and fossil fuel-derived polyethylene. The mixing method is not particularly limited, and a known mixing method can be used. For example, dry blending or melt blending may be used.

According to the seventh embodiment, the resin composition preferably contains 5 to 90% by mass, more preferably 25 to 75% by mass of biomass-derived polyethylene and preferably 10 to 95% by mass, more preferably 25 to 75% by mass of fossil fuel-derived polyethylene. Even when such a mixed resin composition is used, the concentration of biomass-derived ethylene in the resin composition as a whole needs to be within the above range.

Various additives other than polyethylene, which is the main component, may be added to the resin composition produced in the production process of the resin composition as long as the characteristics thereof are not impaired. Examples of additives include plasticizers, ultraviolet stabilizers, anti-coloring agents, matting agents, deodorants, flame retardants, anti-weathering agents, antistatic agents, yarn friction reducing agents, slip agents, release agents, antioxidants, ion exchange agents, and color pigments. These additives are added in an amount of preferably 1 to 20% by mass, preferably 1 to 10% by mass, relative to the total amount of the resin composition.

As described above, the colored substrate layer 2 contains biomass-derived ethylene in an amount of 5% by mass or more, preferably 5 to 90% by mass, more preferably 25 to 75% by mass, most preferably 40 to 75% by mass relative to the total amount of the colored substrate layer 2. When the concentration of biomass-derived ethylene in the colored substrate layer 2 is 5% by mass or more, it is possible to reduce the amount of fossil fuel used compared to conventional methods, and a carbon-neutral decorative sheet can be achieved.

The density of the colored substrate layer 2 is within the range of 0.92 [g/cm$^3$] or more and 1.12 [g/cm$^3$] or less, preferably 0.98 [g/cm$^3$] or more and 1.10 [g/cm$^3$] or less. The density of the colored substrate layer 2 is a value measured according to the method specified in the method A of JIS K 7112-1980 after annealing it according to JIS K 6760-1995. When the density of the colored substrate layer 2 is 0.92 [g/cm$^3$] or more, the rigidity of the colored substrate layer 2 can be increased. When the density of the colored substrate layer 2 is 1.12 [g/cm$^3$] or less, the transparency and mechanical strength of the colored substrate layer 2 can be increased.

The biomass-derived polyethylene contained in the colored substrate layer 2 may contain biomass-derived high-density polyethylene and biomass-derived low-density polyethylene, biomass-derived high-density polyethylene and fossil fuel-derived low-density polyethylene, or fossil fuel-derived high-density polyethylene and biomass-derived low-density polyethylene. The biomass degree of the colored substrate layer 2 as a whole may be in the range of 10% or higher and 90% or lower.

Biomass-derived high-density polyethylene is polyethylene having a density greater than 0.94. Biomass-derived low-density polyethylene is polyethylene having a density of 0.94 or less.

The colored substrate layer 2 preferably contains, as the biomass-derived polyethylene, one that is obtained by blending biomass-derived high-density polyethylene and low-density polyethylene (either biomass-derived or fossil fuel-derived) at a ratio within the range of 95:5 to 70:30, respectively. When the content of the low-density polyethylene is low, the film formation becomes unstable, and when the content of the low-density polyethylene is high, the product becomes too soft.

The production method of the colored substrate layer 2 is not particularly limited, and a known production method can be used. In the seventh embodiment, preferably calendaring is used.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The thickness of the colored substrate layer 2 is preferably in the range of 40 [μm] or more and 200 [μm] or less, more preferably in the range of 51 [μm] or more and 120 [μm] or less, and even more preferably in the range of 55 [μm] or more and 100 [μm] or less. This is because, when the thickness of the colored substrate layer 2 made of biomass-derived polyethylene is 40 [μm] or more, it can absorb irregularities or bumps on the underlying floor material or the like, which improves the finish of the decorative sheet 1. When the thickness of the colored substrate layer 2 is 200 [μm] or less, the manufacturing cost of the decorative sheet 1 can be reduced without forming the colored substrate layer 2 thicker than necessary.

Although the biomass-derived resin forming the colored substrate layer 2 was a biomass-derived polyethylene in the seventh embodiment, the present invention is not limited to this. For example, biomass-derived polypropylene, biomass-derived polybutylene, or the like may be used instead of the biomass-derived polyethylene described above. That is, in the seventh embodiment, a wide range of biomass-derived polyolefins can be used as the biomass-derived resin forming the colored substrate layer 2.

<Pattern Layer>

The pattern layer 3 is laminated on one side (the upper side in the FIGURE) of the colored substrate layer 2, and is a layer for adding a pattern for imparting design.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

The pattern layer 3 contains the above-described colorant and binder resin. The binder resin used for the pattern layer 3 in the seventh embodiment will be described.

[Binder Resin]

The binder resin in the pattern layer 3 contains urethane (meth)acrylate, which is a resin composition containing at least polyol, an isocyanate compound, and hydroxy (meth) acrylate. In the pattern layer 3, at least one of the polyol, isocyanate compound, and hydroxy(meth)acrylate constituting the urethane (meth)acrylate described above contains a biomass-derived component. At least one of the polyol, isocyanate compound, and hydroxy(meth)acrylate may or may not contain a biomass-derived component. In the following, urethane (meth)acrylate containing a biomass-derived component is also referred to as biourethane (meth) acrylate.

That is, the pattern layer 3 is a resin layer containing the above-described colorant and biourethane (meth)acrylate. This means that the pattern layer 3 contains a colorant and a biomass-derived component.

Urethane (meth)acrylate is obtained, for example, by reacting polyol and isocyanate with hydroxy (meth)acrylate. In the case of a biourethane (meth)acrylate, a plant-derived polyol can be used as the polyol, a plant-derived isocyanate can be used as the isocyanate, or both the polyol and isocyanate can be plant-derived.

Examples of the polyol include polyester polyols, which are reaction products of a polyfunctional alcohol and a polyfunctional carboxylic acid, polyether polyols, which are reaction products of a polyfunctional alcohol and a polyfunctional isocyanate, or polycarbonate polyols, which are reaction products of a polyfunctional alcohol and a carbonate. Each polyol will be described below in detail.

<Polyester Polyol>

When the polyester polyol contains a biomass-derived component, at least one of the polyfunctional alcohol and polyfunctional carboxylic acid contains the biomass-derived component. Examples of polyester polyols containing biomass-derived components are as follows.

- Reaction product of biomass-derived polyfunctional alcohol and biomass-derived polyfunctional carboxylic acid
- Reaction product of fossil fuel-derived polyfunctional alcohol and biomass-derived polyfunctional carboxylic acid
- Reaction product of biomass-derived polyfunctional alcohol and fossil fuel-derived polyfunctional carboxylic acid Examples of biomass-derived polyfunctional alcohol are aliphatic polyfunctional alcohols obtained from plant materials such as corn, sugar cane, cassava, and sago palm. Examples of biomass-derived aliphatic polyfunctional alcohols that may be used include polypropylene glycol (PPG), neopentyl glycol (NPG), ethylene glycol (EG), diethylene glycol (DEG), butylene glycol (BG), and hexamethylene glycol obtained from plant materials by the following methods. These may be used alone or in combination.

Biomass-derived polypropylene glycol is produced from glycerol via 3-hydroxypropylaldehyde (HPA) by a fermentation process in which the plant material is degraded to produce glucose. Compared with polypropylene glycol produced by the EO production method, polypropylene glycols produced by a bio-method like this fermentation process yield useful by-products such as lactic acid in terms of safety, and also the production cost can be kept low.

Biomass-derived butylene glycol can be produced by obtaining succinic acid by producing glycol from a plant raw material and fermenting it, and then hydrogenating the succinic acid.

Biomass-derived ethylene glycol can be produced, for example, from bioethanol via ethylene. The bioethanol may be obtained by a conventional method.

Examples of fossil fuel-derived polyfunctional alcohol include compounds having 2 or more, preferably 2 to 8 hydroxyl groups per molecule. Specifically, the fossil fuel-derived polyfunctional alcohol is not particularly limited and conventionally known substances can be used. Examples thereof include polypropylene glycol (PPG), neopentyl glycol (NPG), ethylene glycol (EG), diethylene glycol (DEG), butylene glycol (BG), and hexamethylene glycol. Further examples are triethylene glycol, dipropylene glycol, 1,4-cyclohexanedimethanol, trimethylolpropane, glycerin, 1,9-nonanediol, 3-methyl-1,5-pentanediol, polyether polyols, polycarbonate polyols, polyolefin polyols, and acrylic polyols. These may be used alone or in combination of two or more.

Examples of biomass-derived polyfunctional carboxylic acids include aliphatic polyfunctional carboxylic acids obtained from plant materials such as recyclable plant-derived oils such as soybean oil, linseed oil, tung oil, coconut oil, palm oil, and castor oil, and reclaimed oils obtained by recycling waste edible oils or the like composed mainly of those reproducible plant-derived oils. Examples of biomass-derived aliphatic polyfunctional carboxylic acids include sebacic acid, succinic acid, phthalic acid, adipic acid, glutaric acid, and dimer acids. For example, sebacic acid is produced with heptyl alcohol as a by-product by alkaline thermal decomposition of ricinoleic acid obtained from castor oil. In the present invention, it is particularly preferable to use biomass-derived succinic acid or biomass-derived sebacic acid. These may be used alone or in combination of two or more.

Aliphatic polyfunctional carboxylic acid or aromatic polyfunctional carboxylic acid may be used as the fossil fuel-derived polyfunctional carboxylic acid. The fossil fuel-derived aliphatic polyfunctional carboxylic acid is not particularly limited and a conventionally known substance can be used. Examples thereof include adipic acid, dodecanedioic acid, tetrahydrophthalic anhydride, hexahydrophthalic anhydride, maleic anhydride, itaconic anhydride, sebacic acid, succinic acid, glutaric acid, dimer acids, and ester compounds thereof. The fossil fuel-derived aromatic polyfunctional carboxylic acid is not particularly limited and a conventionally known substance can be used. Examples thereof include isophthalic acid, terephthalic acid, naphthalene dicarboxylic acid, phthalic anhydride, trimellitic acid, pyromellitic acid, and ester compounds thereof. These may be used alone or in combination of two or more.

<Polyether Polyol>

When the polyether polyol contains a biomass-derived component, at least one of the polyfunctional alcohol and polyfunctional isocyanate contains the biomass-derived component. Examples of polyether polyols containing biomass-derived components are as follows.

Reaction product of biomass-derived polyfunctional alcohol and biomass-derived polyfunctional isocyanate Reaction product of fossil fuel-derived polyfunctional alcohol and biomass-derived polyfunctional isocyanate Reaction product of biomass-derived polyfunctional alcohol and fossil fuel-derived polyfunctional isocyanate The biomass-derived polyfunctional alcohol and fossil fuel-derived polyfunctional alcohol may be those described with respect to the polyester polyol.

The biomass-derived polyfunctional isocyanate may be one obtained by converting a plant-derived divalent carboxylic acid to a terminal amino group by amidation and reduction thereof, and then reacting it with phosgene to convert the amino group to an isocyanate group. The biomass-derived polyfunctional isocyanate may be, for example, a biomass-derived diisocyanate. Examples of biomass-derived diisocyanates include dimer acid diisocyanate (DDI), octamethylene diisocyanate, and decamethylene diisocyanate. A plant-derived diisocyanate can also be obtained by using a plant-derived amino acid as the raw material and converting the amino group into an isocyanate group. For example, lysine diisocyanate (LDI) is obtained by methyl-esterifying the carboxyl group of the lysine and then converting the amino group into an isocyanate group. For example, 1,5-pentamethylene diisocyanate is obtained by decarboxylating the carboxyl group of the lysine and then converting the amino group to an isocyanate group.

Other examples of methods for synthesizing 1,5-pentamethylene diisocyanate include phosgenation and carbamation. More specifically, phosgenation is a method for synthesizing 1,5-pentamethylene diisocyanate by reacting 1,5-pentamethylenediamine or a salt thereof directly with phosgene, or by suspending a hydrochloride of pentamethylenediamine in an inert solvent and reacting it with phosgene. Carbamation is a method for synthesizing 1,5-pentamethylenediisocyanate by first carbamating 1,5-pentamethylenediamine or a salt thereof to form pentamethylenedicarbamate (PDC), and then thermally decomposing it. An example of a suitable polyisocyanate for use in the present invention is a 1,5-pentamethylene diisocyanate-based polyisocyanate (STABiO (registered trademark)) manufactured by Mitsui Chemicals, Inc.

The fossil fuel-derived polyfunctional isocyanate is not particularly limited and a conventionally known substance can be used. Examples thereof are aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis(phenylene isocyanate) (MDI), dulylene diisocyanate, tolidine diisocyanate, xylylene diisocyanate (XDI), 1,5-naphthalene diisocyanate, benzidine diisocyanate, o-nitro benzidine diisocyanate, and 4,4'-diisocyanate dibenzyl. Further examples are aliphatic diisocyanates such as methylene diisocyanate, 1,4-tetramethylene diisocyanate, 1,6-hexamethylene diisocyanate, and 1,10-decamethylene diisocyanate; and alicyclic diisocyanates such as 1,4-cyclohexylene diisocyanate, 4,4-methylenebis(cyclohexyl isocyanate), 1,5-tetrahydronaphthalene diisocyanate, isophorone diisocyanate, hydrogenated MDL, and hydrogenated XDI. These may be used alone or in combination of two or more.

<Polycarbonate Polyol>

When the polycarbonate polyol contains a biomass-derived component, a reaction product of a polyfunctional alcohol containing a biomass-derived component and a fossil fuel-derived carbonate can be used as the polycarbonate polyol. Alternatively, a reaction product of a polyfunctional alcohol containing a fossil fuel-derived component and a carbonate containing a biomass-derived component can be used. The carbonate may be, for example, dimethyl carbonate, dipropyl carbonate, diethyl carbonate, diethylene carbonate, dibutyl carbonate, ethylene carbonate, or diphenyl carbonate. These can be used singly or in a combination of two or more.

The biomass-derived polyfunctional alcohol may be a biomass-derived polyfunctional alcohol described with respect to the polyester polyol.

<Isocyanate Compound>

Next, the isocyanate compound will be described. The isocyanate compound containing a biomass-derived component may be a biomass-derived polyfunctional isocyanate described with respect to the polyether polyol.

<Hydroxy (meth)acrylate>

Next, the hydroxy (meth)acrylate will be described. Examples of hydroxy (meth)acrylates include hydroxy (meth)acrylates having one (meth)acryloyl group such as hydroxyethyl (meth)acrylate, hydroxypropyl (meth)acrylate, hydroxybutyl (meth)acrylate, and 2-hydroxy-3-phenoxypropyl (meth)acrylate; and hydroxy (meth)acrylates having two or more (meth)acryloyl groups such as glycerin di(meth)acrylate, pentaerythritol tri(meth)acrylate, ditrimethylolpropane tri(meth)acrylate, dipentaerythritol penta(meth)acrylate, and sorbitol penta(meth)acrylate. These may be used alone or in combination of two or more thereof.

The binder resin of the pattern layer 3 may contain nitrocellulose in addition to the biourethane (meth)acrylate described above. That is, the pattern layer 3 may contain the biourethane (meth)acrylate described above, or may contain nitrocellulose in addition to the biourethane (meth)acrylate.

<Nitrocellulose>

Nitrocellulose is a cellulose-based resin of a nitro group-substituted product obtained by nitration of a part of the hydroxyl groups of the cellulose skeleton. The cellulose skeleton of nitrocellulose resin is a biomass material. A common nitrocellulose can be used as the nitrocellulose without any trouble, but in particular, it is preferable to use one in which 1.3 to 2.7 nitro groups are substituted on average per glucose unit of the cellulose skeleton.

Nitrocelluloses are classified into L type and H type according to their molecular weight. For a better solubility in organic solvents, it is preferable to use the L type.

The pattern layer 3 preferably has a biomass degree of 5% or higher, more preferably 5% or higher and 50% or lower, still more preferably 10% or higher and 50% or lower. When the biomass degree is within these ranges, it is possible to reduce the amount of fossil fuel used and the environmental impact. The weight of the pattern layer 3 after being dried is preferably 0.1 [g/m$^2$] or higher and 15 [g/m$^2$] or lower, more preferably 3 [g/m$^2$] or higher and 10 [g/m$^2$] lower, and even more preferably 6 [g/m$^2$] or higher and 9 [g/m$^2$] or lower. The thickness of the pattern layer 3 is preferably 0.1 [μm] or more and 10 [μm] or less, more preferably 0.5 [μm] or more and 5 [μm] or less, even more preferably 0.7 [μm] or more and 3 [μm] or less. A plurality of pattern layers 3 having such weights and thicknesses may be provided.

Regarding the "biomass degree", for example, in the case of biourethane (meth)acrylate, as described above, it is obtained as a value obtained by measuring the content of biomass-derived carbon by radioactive carbon (C14) measurement.

Further, regarding the "biomass degree", for example, in the case of nitrocellulose, since the number of hydroxyl groups contained per glucose unit (formula weight=172) of the glucose units constituting the cellulose skeleton, which is the starting material, is three, one to three of these hydroxyl groups can be nitrated (hydrogen can be replaced by a nitro group (a non-biomass material with a formula weight of 46). Assuming that the original cellulose skeleton is formed of 100% by weight of biomass material, and the average number of substituted nitro groups per glucose unit is n, the ratio (% by weight) of biomass material to the entire nitrocellulose molecule can be calculated by $(172-n)\times100/(172-n+46n)$.

The ratio of the biomass material to the entire nitrocellulose molecule is about 78.8% by weight when one nitro group is substituted on average per glucose unit of the cellulose skeleton, about 64.9% by weight when two nitro groups are substituted, and about 55.0% by weight when three nitro groups are substituted (calculated using the above formula).

When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

Any pattern may be used as the pattern of the pattern layer 3, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The pattern layer 3 may include, for example, a solid colored substrate layer for hiding the color and pattern of a base to which the decorative sheet 1 is attached, and a pattern layer for adding a pattern for imparting the designability.

<Adhesive Layer>

The adhesive layer 4 is laminated on one side (upper side in the FIGURE) of the pattern layer 3 to bond the pattern layer 3 and the transparent resin layer 5 together.

For example, urethane, acrylic, ethylene-vinyl acetate copolymer, vinyl chloride-vinyl acetate copolymer, polyester, polyolefin, or the like can be used as the material of the adhesive layer 4. Polyolefin resin is particularly preferred because it provides good adhesion with the transparent resin layer 5.

<Transparent Resin Layer>

The transparent resin layer 5 is laminated on one side (the top side in the FIGURE) of the adhesive layer 4, and is formed of a resin composition containing the above-described biomass-derived (plant-derived) polyethylene. More specifically, the transparent resin layer 5 is a resin layer formed of a resin composition containing biomass-derived polyethylene obtained by polymerizing the above-described biomass-derived ethylene-containing monomer. That is, the transparent resin layer 5 may be formed using a resin composition containing the biomass-derived polyethylene used in the colored substrate layer 2. It may also contain a fossil fuel-derived polyethylene obtained by polymerizing a monomer containing a fossil fuel-derived ethylene and at least one of a fossil fuel-derived ethylene and α-olefin.

The transparent resin layer 5 may contain the above-described biomass-derived ethylene in an amount of 5% by mass or more, preferably 5 to 90% by mass, more preferably 25 to 75% by mass, most preferably 40 to 75% by mass relative to the total amount of the transparent resin layer 5. When the concentration of biomass-derived ethylene in the transparent resin layer 5 is 5% by mass or more, it is possible to reduce the amount of fossil fuel used compared to conventional methods, and a carbon-neutral decorative sheet can be achieved.

The density of the transparent resin layer 5 is within the range of 0.92 [g/cm$^3$] or more and 0.99 [g/cm$^3$] or less, preferably 0.94 [g/cm$^3$] or more and 0.98 [g/cm$^3$] or less, more preferably 0.95 [g/cm$^3$] or more and 0.97 [g/cm$^3$] or less. The density of the transparent resin layer 5 is a value measured according to the method specified in the method A of JIS K 7112-1980 after annealing it according to JIS K 6760-1995. When the density of the transparent resin layer 5 is 0.92 [g/cm$^3$] or more, the rigidity of the transparent resin layer 5 can be increased. When the density of the transparent resin layer 5 is 0.99 [g/cm$^3$] or less, the transparency and mechanical strength of the transparent resin layer 5 can be increased.

The transparent resin layer 5 has a thickness of 55 to 150 [μm], preferably 55 to 100 [μm], more preferably 60 to 80 [μm].

The transparent resin layer 5 may contain biomass-derived high-density polyethylene as the biomass-derived polyethylene.

The transparent resin layer 5 may also contain, as the biomass-derived polyethylene, one that is obtained by blending biomass-derived high-density polyethylene and biomass-derived low-density polyethylene at a ratio within the range of 100:0 to 20:80, respectively.

The biomass degree of the transparent resin layer 5 as a whole may be in the range of 10% or higher and 90% or lower.

The production method of the transparent resin layer 5 is not particularly limited, and a known production method can be used. In the seventh embodiment, preferably extrusion molding is used, and more preferably extrusion molding is performed by T-die extrusion or inflation molding.

In the seventh embodiment, the transparent resin layer 5 and the colored substrate layer 2 preferably satisfy the following specific relationship with respect to density, thickness, and biomass degree (concentration of biomass-derived ethylene).

In the seventh embodiment, a density d1 of the transparent resin layer 5 and a density d2 of the colored substrate layer 2 preferably satisfy d2>d1. This is because formability is required to function as the transparent resin layer 5, whereas productivity is required to function as the colored substrate layer 2.

The ratio (d2/d1) of the density d1 of the transparent resin layer 5 and the density d2 of the colored substrate layer 2 is preferably in the range of 1.1 or higher and 1.5 or lower, more preferably 1.1 or higher and 1.3 or lower, and even more preferably 1.1 or higher and 1.2 or lower. When the density ratio of the transparent resin layer and the colored substrate layer is within this range, even when biomass-derived polyethylene is used, the decorative sheet can have the required suitability for extrusion and suitability for bending.

In the seventh embodiment, a thickness t1 of the transparent resin layer 5 and a thickness t2 of the colored substrate layer 2 preferably satisfy t1≥t2. This is because some thickness is required to function as the transparent resin layer 5, whereas the colored substrate layer 2 does not require a thickness as large as that of the transparent resin layer 5 to provide its function.

The ratio (t1/t2) of the thickness t1 of the transparent resin layer 5 and the thickness t2 of the colored substrate layer 2 is preferably in the range of 1.1 or higher and 3 or lower, more preferably 1.1 or higher and 2 or lower, and even more preferably 1.1 or higher and 1.5 or lower.

In the seventh embodiment, the concentration C1 of biomass-derived ethylene in the transparent resin layer 5 and the concentration C2 of biomass-derived ethylene in the colored substrate layer 2 preferably satisfy C1>C2. This is because since a large thickness is required to function as the transparent resin layer 5 and thus a large amount of ethylene is used, the amount of fossil fuel used can be reduced by increasing the biomass degree of the transparent resin layer 5.

A nucleating agent (for example, "Rikemaster CN-002" manufactured by Riken Vitamin Co., Ltd.) may be added to the biomass-derived polyethylene forming the transparent resin layer 5.

The nucleating agent is preferably added to polyethylene within the range of 500 [ppm] or more and 2000 [ppm] or less relative to the mass of polyethylene, more preferably within the range of 1500 [ppm] or more and 2000 [ppm] or less.

The transparent resin layer 5 may have added thereto, for example, one or more selected from various additives such as a coloring agent, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The transparent resin layer 5 preferably has sufficient transparency (transparent with no color, transparent with color, translucent) to allow one to see the pattern of the pattern layer 3 through the surface (upper side) of the decorative sheet 1.

Although the biomass-derived resin forming the transparent resin layer 5 was a biomass-derived polyethylene in the seventh embodiment, the present invention is not limited to this. For example, biomass-derived polypropylene, biomass-derived polybutylene, or the like may be used instead of the biomass-derived polyethylene described above. That is, in the seventh embodiment, a wide range of biomass-derived polyolefins can be used as the biomass-derived resin forming the transparent resin layer 5.

<Surface Protection Layer>

The surface protection layer 6 is laminated on one side (the upper side in the FIGURE) of the transparent resin layer 5 in order to provide the decorative sheet 1 with weather resistance, scratch resistance, stain resistance, design, or the like.

Thermosetting resin or ionizing radiation curing resin can be used for the surface protection layer 6, and, for example, can be formed using an acrylic resin composition.

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antimicrobial agent and an antifungal agent, for example, may be added to the surface protection layer 6 as needed.

<Uneven Part>

The uneven part 7 is formed by recesses provided in the transparent resin layer 5 and the surface protection layer 6 at a plurality of locations.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

An anticorrosion pigment may be added to the primer layer 8 to improve corrosion resistance.

The thickness of the primer layer 8 may be, for example, in the range of 1 [μm] or more and 10 [μm] or less.

The embodiment described above is an example of the present invention, and the present invention is not limited to the embodiment described above. Various modifications can be made according to a design and the like without departing from the technical idea of the present invention.

Effects of Seventh Embodiment

The decorative sheet 1 of the seventh embodiment achieves the effects described below.

(1) The colored substrate layer 2 and the transparent resin layer 5 are both resin layers formed of a resin composition containing biomass-derived olefin obtained by polymerizing a monomer containing biomass-derived olefin. The transparent resin layer 5 contains 5% by mass or more of the biomass-derived olefin and has a density within the range of 0.92 [g/cm$^3$] or higher and 0.99 [g/cm$^3$] or lower. The colored substrate layer 2 contains 5% by mass or more of the biomass-derived olefin and has a density within the range of 0.92 [g/cm$^3$] or higher and 1.12 [g/cm$^3$] or lower. The pattern layer 3 contains a colorant and a biomass-derived component.

This makes it possible to reduce the consumption of fossil fuels by using plant-derived materials, and at the same time provide a decorative sheet capable of maintaining physical properties suitable for use as a decorative sheet.

(2) The pattern layer 3 is a resin layer containing urethane (meth)acrylate, which is a resin composition containing at least polyol, an isocyanate compound, and hydroxy (meth) acrylate. At least one of the polyol, the isocyanate compound, and the hydroxy(meth)acrylate contained in the resin composition includes a biomass-derived component.

This makes it possible to reliably reduce the consumption of fossil fuels by using plant-derived materials, and at the same time provide a decorative sheet capable of reliably maintaining physical properties suitable for use as a decorative sheet.

(3) The polyol, which is a constituent element of the biourethane (meth)acrylate contained in the pattern layer 3, is a polyester polyol containing a biomass-derived component, a polyether polyol containing a biomass-derived component, or a polycarbonate polyol containing a biomass-derived component.

This makes it possible to more reliably reduce the consumption of fossil fuels by using plant-derived materials, and at the same time provide a decorative sheet capable of more reliably maintaining physical properties suitable for use as a decorative sheet.

(4) Among the possible polyols as a constituent element of the biourethane (meth)acrylate, the polyester polyol is a reaction product of a polyfunctional alcohol containing a biomass-derived component and a polyfunctional carboxylic acid containing a fossil fuel-derived component, or a reaction product of a polyfunctional alcohol containing a fossil fuel-derived component and a polyfunctional carboxylic acid containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(5) Among the possible polyols as a constituent element of the biourethane (meth)acrylate, the polyether polyol is a reaction product of a polyfunctional alcohol containing a biomass-derived component and a polyfunctional isocyanate containing a fossil fuel-derived component, or a reaction product of a polyfunctional alcohol containing a fossil fuel-derived component and a polyfunctional isocyanate containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(6) Among the possible polyols as a constituent element of the biourethane (meth)acrylate, the polycarbonate polyol is a reaction product of a polyfunctional alcohol containing a biomass-derived component and a carbonate containing a fossil fuel-derived component, or a reaction product of a polyfunctional alcohol containing a fossil fuel-derived component and a carbonate containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(7) The isocyanate compound, which is a component of the biourethane (meth)acrylate contained in the pattern layer 3, is an isocyanate compound containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(8) The decorative material 10 includes the substrate 9 and the decorative sheet 1 laminated on at least one side thereof.

This makes it possible to reduce the consumption of fossil fuels by using plant-derived materials, and at the same time provide a decorative material capable of maintaining physical properties suitable for use as a decorative sheet.

Fifth Example

The decorative materials of Examples 1 to 9 and Reference Examples 1 to 3 will be described below with reference to the seventh embodiment.

Example 1

After applying corona discharge to one side of the substrate, a pattern layer, a urethane-based adhesive layer, a maleic anhydride-modified polyethylene resin layer (a transparent adhesive layer), a transparent resin layer, and a surface protection layer containing an acrylic resin composition as a main component were laminated on that side of the substrate in this order. After applying corona discharge to the other side of the substrate, a primer layer (thickness: 1 to 2 [μm]) made of polyester urethane resin was formed. A decorative sheet (total thickness: 135 [μm]) of Example 1 was thus obtained.

In Example 1, a colored substrate layer (thickness: 55 [μm]) formed of a resin composition containing biomass-derived high-density polyethylene and fossil fuel-derived low-density polyethylene was used as the substrate. The colored substrate layer was obtained by subjecting this resin composition to calendaring. The biomass degree of the colored substrate layer thus formed is 80%, and the density of the colored substrate layer is 1.08 [g/cm$^3$].

A transparent resin layer (thickness: 80 [μm]) formed of a resin composition containing biomass-derived polyethylene ("biomass polyethylene" manufactured by Braskem) was used as the transparent resin layer. This biomass-derived polyethylene was obtained by blending biomass-derived high-density polyethylene (SHC7260) and biomass-derived low-density polyethylene (SPB681) at a ratio (high-density polyethylene/low-density polyethylene) of 80/20. The transparent resin layer was obtained by extrusion-laminating this resin. The biomass degree of the transparent resin layer thus formed is 94%, and the density of the transparent resin layer is 0.95 [g/cm$^3$].

A biourethane (meth)acrylate that is a reaction product of a polyester polyol containing a biomass-derived component, a fossil fuel-derived isocyanate compound, and a fossil fuel-derived hydroxy (meth)acrylate was used for the binder resin of the pattern layer. A polyester polyol that is a reaction product of a polyfunctional alcohol containing a biomass-derived component and a fossil fuel-derived polyfunctional carboxylic acid was used as the polyester polyol containing a biomass-derived component.

Example 2

The decorative sheet of Example 2 was obtained in the same manner as in Example 1, except that a reaction product of a fossil fuel-derived polyfunctional alcohol and a polyfunctional carboxylic acid containing a biomass-derived component was used as the polyester polyol in the biourethane (meth)acrylate, which is the binder resin of the pattern layer.

Example 3

The decorative sheet of Example 3 was obtained in the same manner as in Example 1, except that a biourethane (meth)acrylate that is a reaction product of a fossil fuel-derived polyester polyol, an isocyanate compound containing a biomass-derived component, and a fossil fuel-derived hydroxy (meth)acrylate was used as the biourethane (meth) acrylate, which is the binder resin of the pattern layer.

Example 4

The decorative sheet of Example 4 was obtained in the same manner as in Example 1, except that polyether polyol was used as the polyol in the biourethane (meth)acrylate, which is the binder resin of the pattern layer. Specifically, a reaction product of a polyfunctional alcohol containing a biomass-derived component and a fossil fuel-derived polyfunctional isocyanate was used as the polyether polyol.

Example 5

The decorative sheet of Example 5 was obtained in the same manner as in Example 4, except that a reaction product of a fossil fuel-derived polyfunctional alcohol and a polyfunctional isocyanate containing a biomass-derived component was used as the polyether polyol in the biourethane (meth)acrylate, which is the binder resin of the pattern layer.

Example 6

The decorative sheet of Example 6 was obtained in the same manner as in Example 3, except that fossil fuel-derived polyether polyol was used as the polyol in the biourethane (meth)acrylate, which is the binder resin of the pattern layer.

Example 7

The decorative sheet of Example 7 was obtained in the same manner as in Example 1, except that polycarbonate polyol was used as the polyol in the biourethane (meth) acrylate, which is the binder resin of the pattern layer. Specifically, a reaction product of a polyfunctional alcohol containing a biomass-derived component and a fossil fuel-derived carbonate was used as the polycarbonate polyol.

Example 8

The decorative sheet of Example 8 was obtained in the same manner as in Example 3, except that fossil fuel-derived polycarbonate polyol was used as the polyol in the biourethane (meth)acrylate, which is the binder resin of the pattern layer.

Example 9

The decorative sheet of Example 9 was obtained in the same manner as in Example 1, except that it was formed by mixing biomass-derived high-density polyethylene (SHC7260) and biomass-derived low-density polyethylene (SPB681) at a ratio (high-density polyethylene/low-density polyethylene) of 100/0, and extrusion-laminating that resin.

Reference Example 1

The decorative sheet of Reference Example 1 was obtained in the same manner as in Example 1, except that the pattern layer was formed with a urethane-based printing ink.

Reference Example 2

The decorative sheet of Reference Example 2 was obtained in the same manner as in Example 1, except that the transparent resin layer was obtained by extrusion-laminating only a fossil fuel-derived homopolypropylene resin manufactured by Prime Polymer Co., Ltd.

Reference Example 3

The decorative sheet of Reference Example 3 was obtained in the same manner as in Example 1, except that the colored substrate layer was obtained using only a fossil fuel-derived colored polyethylene resin.

(Performance Evaluation and Evaluation Results)

The decorative sheets of Examples 1 to 9 and Reference Examples 1 to 3 were evaluated on "haze (%) of the transparent resin layer", "pencil hardness", "Hoffman scratch test", "suitability for extrusion", and "bend whitening". The evaluation was carried out as follows.

<Haze (%) of Transparent Resin Layer>

The haze % of the transparent resin layer was measured using an ultraviolet-visible-near-infrared spectrophotometer (UV-3600 manufactured by Shimadzu Corporation).

For each of the Examples and Reference Examples, a resin having the same composition as the transparent resin layer of the corresponding Example was extruded so that the obtained resin film had a thickness of 70 [μm] or more and 80 [μm] or less. The haze at a wavelength of 555 nm was measured with a spectrophotometer (integrating sphere) to evaluate the haze. The sample was rated as "A" when the haze was lower than 15%, rated as "B" when the haze was in the range of 15% or higher and lower than 25%, and rated as "C" when the haze was 25% or higher.

In this example, it was assumed that samples rated "A" and "B" are suitable.

<Pencil Hardness>

The pencil hardness was measured with a (automatic) pencil hardness tester (C221A manufactured by Yoshimitsu Seiki).

For each of the Examples and Reference Examples, after carrying out a pencil hardness test using pencils with different hardnesses on the decorative material including the decorative sheet, damage (scratching) on the surface (surface protection layer) was checked to evaluate the surface hardness. When damage on the surface was confirmed after conducting the pencil hardness test using a pencil having a hardness of 2 B or greater, the sample was rated as "A", and when damage on the surface was confirmed after conducting the pencil hardness test using a pencil having a hardness of 4 B or greater, the sample was rated as "B". When damage on the surface was confirmed after conducting the pencil hardness test using a pencil having a hardness of 5 B or lower, the sample was rated as "C".

In this example, it was assumed that samples rated "A" and "B" are suitable.

<Hoffman Scratch Test>

The Hoffman scratch test was conducted by setting a scratch blade (φ7 cylindrical blade) so that it came into contact with the surface of the decorative sheet at an angle of 45°, and moving the tester over the decorative sheet.

The scratching load (weight) was gradually increased from 200 to 2000 g (in increments of 200 g), and the samples were evaluated based on the load (g) at which a scratch was formed in the sample surface. When a scratch was formed at a load of 800 g, it was specified as "600 g" in the table as the withstand load.

In this example, samples with a withstand load of "200 g" were considered defective.

<Suitability for Extrusion>

A transparent resin layer was extruded to check the suitability for production (suitability for extrusion).

When it was able to be produced (molded) without any problems, it was rated as "Good" (suitable). On the other hand, samples that had the possibility of being defective were rated as "Poor" (unsuitable).

<Bend Whitening>

Using a decorative sheet laminated with a MDF (that is, a decorative material), the suitability for V-cutting (whether there is whitening at the bent part or not) was checked.

Those that did not have whitening were rated as "Good" (suitable), those that had slight whitening were rated as "Fair" (suitable), and those that had whitening were rated as "Poor" (unsuitable).

TABLE 8

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Haze | B | B | B | B | B | B | B | B | B |
| Pencil hardness | B | B | B | B | B | B | B | B | A |
| Hoffman scratch test | 600 | 600 | 600 | 600 | 600 | 600 | 600 | 600 | 600 |
| Suitability for extrusion | Good | Good | Good | Good | Good | Good | Good | Good | Good |
| Suitability for bending | Good | Good | Good | Good | Good | Good | Good | Good | Good |

TABLE 9

| | Ref. Ex. 1 | Ref. Ex. 2 | Ref. Ex. 3 |
|---|---|---|---|
| Haze | B | A | B |
| Pencil hardness | B | B | B |
| Hoffman scratch test | 600 | 600 | 600 |
| Suitability for extrusion | Good | Good | Good |
| Suitability for bending | Good | Good | Good |

The various kinds of performance evaluation results obtained as described above showed that the performances of the decorative sheets of Examples 1 to 9 were higher than or equal to those of Reference Examples 1 to 3 in all evaluation tests. This shows that the decorative sheets of Examples 1 to 9 can reduce the consumption of fossil fuels by using plant-derived materials, and at the same time maintain physical properties suitable for use as a decorative sheet.

Eighth Embodiment

The structure of a decorative material 10 will be described with reference to the FIGURE.

As shown in the FIGURE, the decorative material 10 includes a decorative sheet 1 and a substrate 9. The specific structure of the decorative sheet 1 will be described later.

Since the structure of the decorative material 10 of the eighth embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer (colored thermoplastic resin layer) 2, a pattern layer 3, an adhesive layer 4, a transparent resin layer (transparent thermoplastic resin layer) 5, a surface protection layer 6, an uneven part 7, and a primer layer 8.

<Colored Substrate Layer>

The colored substrate layer 2 is a resin layer formed using a thermoplastic resin, and is a colored resin layer formed using a resin composition containing biomass-derived (plant-derived) polyethylene.

The composition of the colored substrate layer 2 will be described in detail below.

(Biomass-Derived Polyethylene)

In the eighth embodiment, the biomass-derived polyethylene is obtained by polymerizing monomers containing biomass-derived ethylene. The biomass-derived ethylene is not particularly limited, and an ethylene produced by a conventionally known method can be used. Since biomass-derived ethylene is used as the raw material monomer, the polyethylene obtained by the polymerization thereof will be biomass-derived.

The raw material monomer for polyethylene does not have to contain 100% by mass of biomass-derived ethylene.

The monomer, which is a raw material for biomass-derived polyethylene, may further contain at least one of fossil fuel-derived ethylene and fossil fuel-derived α-olefin, and/or may further contain a biomass-derived α-olefin.

Although the number of carbon atoms of the α-olefin is not particularly limited, those having 3 to 20 carbon atoms can usually be used, and preferably butylene, hexene, or octene may be used. This is because butylene, hexene, and octene can be produced by polymerization of ethylene as a biomass-derived raw material. In addition, when such an α-olefin is contained, the polyethylene obtained by the polymerization has an alkyl group as a branched structure. This allows it to have more flexibility than a simple linear polyethylene.

By using an ethylene as a biomass-derived raw material, it is theoretically possible to produce a polyethylene from 100% biomass-derived components.

The biomass-derived ethylene concentration in the polyethylene (hereinafter may also referred to as "biomass degree") is a value obtained by measuring the biomass-derived carbon content by radioactive carbon (C14) measurement. It is known that, since carbon dioxide in the atmosphere contains some C14 (105.5 pMC), the C14 content in plants that grow by taking in carbon dioxide in the atmosphere, such as corn, is also about 105.5 pMC. It is also known that fossil fuels contain almost no C14. Therefore, the proportion of biomass-derived carbon can be calculated by measuring the proportion of C14 in all the carbon atoms in polyethylene. In the eighth embodiment, the content P bio of biomass-derived carbon can be determined as follows, where P C14 is the content of C14 in polyethylene.

$$P\ bio\ (\%) = P\ C14/105.5 \times 100$$

In the eighth embodiment, theoretically, if the raw material of polyethylene is completely biomass-derived ethylene, the biomass-derived ethylene concentration is 100%, and the biomass degree of the biomass-derived polyethylene is 100. The concentration of biomass-derived ethylene in a fossil fuel-derived polyethylene produced only from a fossil fuel-derived raw material is 0%, and the biomass degree of the fossil fuel-derived polyethylene is 0.

In the eighth embodiment, the biomass-derived polyethylene and the decorative sheet containing the polyethylene need not have a biomass degree of 100.

In the eighth embodiment, the polymerization method of the biomass-derived ethylene-containing monomers is not particularly limited, and a conventionally known method can be used. The polymerization temperature and polymerization pressure should be adjusted as appropriate according to the polymerization method and polymerization device. The polymerization device is also not particularly limited, and a conventionally known device can be used. An example of a method for polymerizing ethylene-containing monomers will now be described.

The polymerization method for an ethylene polymer or a copolymer of ethylene and α-olefin can be selected as appropriate depending on the type of polyethylene desired, for example, the difference in density and branching, such as high-density polyethylene (HDPE), medium-density polyethylene (MDPE), low-density polyethylene (LDPE), and linear low-density polyethylene (LLDPE). For example, the polymerization is preferably performed using a multi-site catalyst, such as a Ziegler-Natta catalyst, or a single-site catalyst, such as a metallocene catalyst, as the polymerization catalyst by one of gas phase polymerization, slurry polymerization, solution polymerization, and high pressure ion polymerization, and in one or more stages.

An ethylene polymer or an ethylene/α-olefin copolymer may be used alone as the biomass-derived polyethylene, or two or more of them may be used in combination.

(Resin Composition Containing Biomass-Derived Polyethylene)

In the eighth embodiment, the resin composition contains the above-described polyethylene as a main component. The resin composition contains biomass-derived ethylene in an amount of 5% by mass or more, preferably 5 to 95% by mass, more preferably 25 to 75% by mass, relative to the total amount of the resin composition. When the concentration of biomass-derived ethylene in the resin composition is 5% by mass or more, it is possible to reduce the amount of fossil fuel used compared to conventional methods, and a carbon-neutral decorative sheet can be achieved.

The above resin composition may contain two or more polyethylenes having different biomass degrees. In this case, the concentration of biomass-derived ethylene in the resin composition as a whole needs to be within the above range.

The above resin composition may further contain a fossil fuel-derived polyethylene obtained by polymerizing a monomer containing a fossil fuel-derived ethylene and at least one of a fossil fuel-derived ethylene and α-olefin. That is, in the eighth embodiment, the resin composition may be a mixture of biomass-derived polyethylene and fossil fuel-derived polyethylene. The mixing method is not particularly limited, and a known mixing method can be used. For example, dry blending or melt blending may be used.

According to the eighth embodiment, the resin composition preferably contains 5 to 90% by mass, more preferably 25 to 75% by mass of biomass-derived polyethylene and preferably 10 to 95% by mass, more preferably 25 to 75% by mass of fossil fuel-derived polyethylene. Even when such a mixed resin composition is used, the concentration of biomass-derived ethylene in the resin composition as a whole needs to be within the above range.

Various additives other than polyethylene, which is the main component, may be added to the resin composition produced in the production process of the resin composition as long as the characteristics thereof are not impaired. Examples of additives include plasticizers, ultraviolet stabilizers, anti-coloring agents, matting agents, deodorants, flame retardants, anti-weathering agents, antistatic agents, yarn friction reducing agents, slip agents, release agents, antioxidants, ion exchange agents, and color pigments. These additives are added in an amount of preferably 1 to 20% by mass, preferably 1 to 10% by mass, relative to the total amount of the resin composition.

As described above, the colored substrate layer 2 contains biomass-derived ethylene in an amount of 5% by mass or more, preferably 5 to 90% by mass, more preferably 25 to 75% by mass, most preferably 40 to 75% by mass relative to the total amount of the colored substrate layer 2. When the concentration of biomass-derived ethylene in the colored substrate layer 2 is 5% by mass or more, it is possible to reduce the amount of fossil fuel used compared to conventional methods, and a carbon-neutral decorative sheet can be achieved.

The density of the colored substrate layer 2 is within the range of 0.92 [g/cm$^3$] or more and 1.12 [g/cm$^3$] or less, preferably 0.98 [g/cm$^3$] or more and 1.10 [g/cm$^3$] or less. The density of the colored substrate layer 2 is a value measured according to the method specified in the method A of JIS K 7112-1980 after annealing it according to JIS K 6760-1995. When the density of the colored substrate layer 2 is 0.92 [g/cm$^3$] or more, the rigidity of the colored substrate layer 2 can be increased. When the density of the colored substrate layer 2 is 1.12 [g/cm$^3$] or less, the transparency and mechanical strength of the colored substrate layer 2 can be increased.

The biomass-derived polyethylene contained in the colored substrate layer 2 may contain biomass-derived high-density polyethylene and biomass-derived low-density polyethylene, biomass-derived high-density polyethylene and fossil fuel-derived low-density polyethylene, or fossil fuel-derived high-density polyethylene and biomass-derived low-density polyethylene. The biomass degree of the colored substrate layer 2 as a whole may be in the range of 10% or higher and 90% or lower.

Biomass-derived high-density polyethylene is polyethylene having a density greater than 0.94. Biomass-derived low-density polyethylene is polyethylene having a density of 0.94 or less.

The colored substrate layer 2 preferably contains, as the biomass-derived polyethylene, one that is obtained by blending biomass-derived high-density polyethylene and low-density polyethylene (either biomass-derived or fossil fuel-derived) at a ratio within the range of 95:5 to 70:30, respectively. When the content of the low-density polyethylene is low, the film formation becomes unstable, and when the content of the low-density polyethylene is high, the product becomes too soft.

The production method of the colored substrate layer 2 is not particularly limited, and a known production method can be used. In the eighth embodiment, preferably calendaring is used.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The thickness of the colored substrate layer 2 is preferably in the range of 40 [μm] or more and 200 [μm] or less, more preferably in the range of 51 [μm] or more and 120 [μm] or less, and even more preferably in the range of 55 [μm] or more and 100 [μm] or less. This is because, when the thickness of the colored substrate layer 2 made of biomass-derived polyethylene is 40 [μm] or more, it can absorb irregularities or bumps on the underlying floor material or the like, which improves the finish of the decorative sheet 1. When the thickness of the colored substrate layer 2 is 200 [μm] or less, the manufacturing cost of the decorative sheet 1 can be reduced without forming the colored substrate layer 2 thicker than necessary.

Although the biomass-derived resin forming the colored substrate layer 2 was a biomass-derived polyethylene in the eighth embodiment, the present invention is not limited to this. For example, biomass-derived polypropylene, biomass-derived polybutylene, or the like may be used instead of the biomass-derived polyethylene described above. That is, in the eighth embodiment, a wide range of biomass-derived polyolefins can be used as the biomass-derived resin forming the colored substrate layer 2.

<Pattern Layer>

The pattern layer 3 is laminated on one side (the upper side in the FIGURE) of the colored substrate layer 2, and is a layer for adding a pattern for imparting design.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

The pattern layer 3 contains the above-described colorant and binder resin. The binder resin used for the pattern layer 3 in the eighth embodiment will be described.

[Binder Resin]

The binder resin in the pattern layer 3 contains urethane (meth)acrylate, which is a resin composition containing at least polyol, an isocyanate compound, and hydroxy (meth) acrylate. In the pattern layer 3, at least one of the polyol, isocyanate compound, and hydroxy(meth)acrylate constituting the urethane (meth)acrylate described above contains a biomass-derived component. At least one of the polyol, isocyanate compound, and hydroxy(meth)acrylate may or may not contain a biomass-derived component. In the following, urethane (meth)acrylate containing a biomass-derived component is also referred to as biourethane (meth) acrylate.

That is, the pattern layer 3 is a resin layer containing the above-described colorant and biourethane (meth)acrylate. This means that the pattern layer 3 contains a colorant and a biomass-derived component.

Urethane (meth)acrylate is obtained, for example, by reacting polyol and isocyanate with hydroxy (meth)acrylate. In the case of a biourethane (meth)acrylate, a plant-derived polyol can be used as the polyol, a plant-derived isocyanate can be used as the isocyanate, or both the polyol and isocyanate can be plant-derived.

Examples of the polyol include polyester polyols, which are reaction products of a polyfunctional alcohol and a polyfunctional carboxylic acid, polyether polyols, which are reaction products of a polyfunctional alcohol and a polyfunctional isocyanate, or polycarbonate polyols, which are reaction products of a polyfunctional alcohol and a carbonate. Each polyol will be described below in detail.

<Polyester Polyol>

When the polyester polyol contains a biomass-derived component, at least one of the polyfunctional alcohol and polyfunctional carboxylic acid contains the biomass-derived component. Examples of polyester polyols containing biomass-derived components are as follows.

- Reaction product of biomass-derived polyfunctional alcohol and biomass-derived polyfunctional carboxylic acid
- Reaction product of fossil fuel-derived polyfunctional alcohol and biomass-derived polyfunctional carboxylic acid
- Reaction product of biomass-derived polyfunctional alcohol and fossil fuel-derived polyfunctional carboxylic acid Examples of biomass-derived polyfunctional alcohol are aliphatic polyfunctional alcohols obtained from plant materials such as corn, sugar cane, cassava, and sago palm. Examples of biomass-derived aliphatic polyfunctional alcohols that may be used include polypropylene glycol (PPG), neopentyl glycol (NPG), ethylene glycol (EG), diethylene glycol (DEG), butylene glycol (BG), and hexamethylene glycol obtained from plant materials by the following methods. These may be used alone or in combination.

Biomass-derived polypropylene glycol is produced from glycerol via 3-hydroxypropylaldehyde (HPA) by a fermentation process in which the plant material is degraded to produce glucose. Compared with polypropylene glycol produced by the EO production method, polypropylene glycols produced by a bio-method like this fermentation process yield useful by-products such as lactic acid in terms of safety, and also the production cost can be kept low.

Biomass-derived butylene glycol can be produced by obtaining succinic acid by producing glycol from a plant raw material and fermenting it, and then hydrogenating the succinic acid.

Biomass-derived ethylene glycol can be produced, for example, from bioethanol via ethylene. The bioethanol may be obtained by a conventional method.

Examples of fossil fuel-derived polyfunctional alcohol include compounds having 2 or more, preferably 2 to 8 hydroxyl groups per molecule. Specifically, the fossil fuel-derived polyfunctional alcohol is not particularly limited and conventionally known substances can be used. Examples thereof include polypropylene glycol (PPG), neopentyl glycol (NPG), ethylene glycol (EG), diethylene glycol (DEG), butylene glycol (BG), and hexamethylene glycol. Further examples are triethylene glycol, dipropylene glycol, 1,4-cyclohexanedimethanol, trimethylolpropane, glycerin, 1,9-nonanediol, 3-methyl-1,5-pentanediol, polyether polyols, polycarbonate polyols, polyolefin polyols, and acrylic polyols. These may be used alone or in combination of two or more.

Examples of biomass-derived polyfunctional carboxylic acids include aliphatic polyfunctional carboxylic acids obtained from plant materials such as recyclable plant-derived oils such as soybean oil, linseed oil, tung oil, coconut oil, palm oil, and castor oil, and reclaimed oils obtained by recycling waste edible oils or the like composed mainly of those reproducible plant-derived oils. Examples of biomass-derived aliphatic polyfunctional carboxylic acids include sebacic acid, succinic acid, phthalic acid, adipic acid, glutaric acid, and dimer acids. For example, sebacic acid is produced with heptyl alcohol as a by-product by alkaline thermal decomposition of ricinoleic acid obtained from castor oil. In the present invention, it is particularly preferable to use biomass-derived succinic acid or biomass-derived sebacic acid. These may be used alone or in combination of two or more.

Aliphatic polyfunctional carboxylic acid or aromatic polyfunctional carboxylic acid may be used as the fossil fuel-derived polyfunctional carboxylic acid. The fossil fuel-derived aliphatic polyfunctional carboxylic acid is not particularly limited and a conventionally known substance can be used. Examples thereof include adipic acid, dodecanedioic acid, tetrahydrophthalic anhydride, hexahydrophthalic anhydride, maleic anhydride, itaconic anhydride, sebacic acid, succinic acid, glutaric acid, dimer acids, and ester compounds thereof. The fossil fuel-derived aromatic polyfunctional carboxylic acid is not particularly limited and a conventionally known substance can be used. Examples thereof include isophthalic acid, terephthalic acid, naphthalene dicarboxylic acid, phthalic anhydride, trimellitic acid, pyromellitic acid, and ester compounds thereof. These may be used alone or in combination of two or more.

<Polyether Polyol>

When the polyether polyol contains a biomass-derived component, at least one of the polyfunctional alcohol and polyfunctional isocyanate contains the biomass-derived component. Examples of polyether polyols containing biomass-derived components are as follows.

Reaction product of biomass-derived polyfunctional alcohol and biomass-derived polyfunctional isocyanate Reaction product of fossil fuel-derived polyfunctional alcohol and biomass-derived polyfunctional isocyanate Reaction product of biomass-derived polyfunctional alcohol and fossil fuel-derived polyfunctional isocyanate The biomass-derived polyfunctional alcohol and fossil fuel-derived polyfunctional alcohol may be those described with respect to the polyester polyol.

The biomass-derived polyfunctional isocyanate may be one obtained by converting a plant-derived divalent carboxylic acid to a terminal amino group by amidation and reduction thereof, and then reacting it with phosgene to convert the amino group to an isocyanate group. The biomass-derived polyfunctional isocyanate may be, for example, a biomass-derived diisocyanate. Examples of biomass-derived diisocyanates include dimer acid diisocyanate (DDI), octamethylene diisocyanate, and decamethylene diisocyanate. A plant-derived diisocyanate can also be obtained by using a plant-derived amino acid as the raw material and converting the amino group into an isocyanate group. For example, lysine diisocyanate (LDI) is obtained by methyl-esterifying the carboxyl group of the lysine and then converting the amino group into an isocyanate group. For example, 1,5-pentamethylene diisocyanate is obtained by decarboxylating the carboxyl group of the lysine and then converting the amino group to an isocyanate group.

Other examples of methods for synthesizing 1,5-pentamethylene diisocyanate include phosgenation and carbamation. More specifically, phosgenation is a method for synthesizing 1,5-pentamethylene diisocyanate by reacting 1,5-pentamethylenediamine or a salt thereof directly with phosgene, or by suspending a hydrochloride of pentamethylenediamine in an inert solvent and reacting it with phosgene. Carbamation is a method for synthesizing 1,5-pentamethylenediisocyanate by first carbamating 1,5-pentamethylenediamine or a salt thereof to form pentamethylenedicarbamate (PDC), and then thermally decomposing it. An example of a suitable polyisocyanate for use in the present invention is a 1,5-pentamethylene diisocyanate-based polyisocyanate (STABiO (registered trademark)) manufactured by Mitsui Chemicals, Inc.

The fossil fuel-derived polyfunctional isocyanate is not particularly limited and a conventionally known substance can be used. Examples thereof are aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis(phenylene isocyanate) (MDI), dulylene diisocyanate, tolidine diisocyanate, xylylene diisocyanate (XDI), 1,5-naphthalene diisocyanate, benzidine diisocyanate, o-nitro benzidine diisocyanate, and 4,4'-diisocyanate dibenzyl. Further examples are aliphatic diisocyanates such as methylene diisocyanate, 1,4-tetramethylene diisocyanate, 1,6-hexamethylene diisocyanate, and 1,10-decamethylene diisocyanate; and alicyclic diisocyanates such as 1,4-cyclohexylene diisocyanate, 4,4-methylenebis(cyclohexyl isocyanate), 1,5-tetrahydronaphthalene diisocyanate, isophorone diisocyanate, hydrogenated MDI, and hydrogenated XDI. These may be used alone or in combination of two or more.

<Polycarbonate Polyol>

When the polycarbonate polyol contains a biomass-derived component, a reaction product of a polyfunctional alcohol containing a biomass-derived component and a fossil fuel-derived carbonate can be used as the polycarbonate polyol. Alternatively, a reaction product of a polyfunctional alcohol containing a fossil fuel-derived component and a carbonate containing a biomass-derived component can be used. The carbonate may be, for example, dimethyl carbonate, dipropyl carbonate, diethyl carbonate, diethylene carbonate, dibutyl carbonate, ethylene carbonate, or diphenyl carbonate. These can be used singly or in a combination of two or more.

The biomass-derived polyfunctional alcohol may be a biomass-derived polyfunctional alcohol described with respect to the polyester polyol.

<Isocyanate Compound>

Next, the isocyanate compound will be described. The isocyanate compound containing a biomass-derived component may be a biomass-derived polyfunctional isocyanate described with respect to the polyether polyol.

<Hydroxy (meth)acrylate>

Next, the hydroxy (meth)acrylate will be described. Examples of hydroxy (meth)acrylates include hydroxy (meth)acrylates having one (meth)acryloyl group such as hydroxyethyl (meth)acrylate, hydroxypropyl (meth)acrylate, hydroxybutyl (meth)acrylate, and 2-hydroxy-3-phenoxypropyl (meth)acrylate; and hydroxy (meth)acrylates having two or more (meth)acryloyl groups such as glycerin di(meth)acrylate, pentaerythritol tri(meth)acrylate, ditrimethylolpropane tri(meth)acrylate, dipentaerythritol penta(meth)acrylate, and sorbitol penta(meth)acrylate. These may be used alone or in combination of two or more thereof.

The binder resin of the pattern layer 3 may contain nitrocellulose in addition to the biourethane (meth)acrylate described above. That is, the pattern layer 3 may contain the biourethane (meth)acrylate described above, or may contain nitrocellulose in addition to the biourethane (meth)acrylate.

<Nitrocellulose>

Nitrocellulose is a cellulose-based resin of a nitro group-substituted product obtained by nitration of a part of the hydroxyl groups of the cellulose skeleton. The cellulose skeleton of nitrocellulose resin is a biomass material. A common nitrocellulose can be used as the nitrocellulose without any trouble, but in particular, it is preferable to use one in which 1.3 to 2.7 nitro groups are substituted on average per glucose unit of the cellulose skeleton.

Nitrocelluloses are classified into L type and H type according to their molecular weight. For a better solubility in organic solvents, it is preferable to use the L type.

The pattern layer 3 preferably has a biomass degree of 5% or higher, more preferably 5% or higher and 50% or lower, still more preferably 10% or higher and 50% or lower. When the biomass degree is within these ranges, it is possible to reduce the amount of fossil fuel used and the environmental impact. The weight of the pattern layer 3 after being dried is preferably 0.1 [g/m$^2$] or higher and 15 [g/m$^2$] or lower, more preferably 3 [g/m$^2$] or higher and 10 [g/m$^2$] lower, and even more preferably 6 [g/m$^2$] or higher and 9 [g/m$^2$] or lower. The thickness of the pattern layer 3 is preferably 0.1 [μm] or more and 10 [μm] or less, more preferably 0.5 [μm] or more and 5 [μm] or less, even more preferably 0.7 [μm] or more and 3 [μm] or less. A plurality of pattern layers 3 having such weights and thicknesses may be provided.

Regarding the "biomass degree", for example, in the case of biourethane (meth)acrylate, as described above, it is obtained as a value obtained by measuring the content of biomass-derived carbon by radioactive carbon (C14) measurement.

Further, regarding the "biomass degree", for example, in the case of nitrocellulose, since the number of hydroxyl groups contained per glucose unit (formula weight=172) of the glucose units constituting the cellulose skeleton, which is the starting material, is three, one to three of these hydroxyl groups can be nitrated (hydrogen can be replaced by a nitro group (a non-biomass material with a formula weight of 46). Assuming that the original cellulose skeleton is formed of 100% by weight of biomass material, and the average number of substituted nitro groups per glucose unit is n, the ratio (% by weight) of biomass material to the entire nitrocellulose molecule can be calculated by $(172-n)\times100/(172-n+46n)$.

The ratio of the biomass material to the entire nitrocellulose molecule is about 78.8% by weight when one nitro group is substituted on average per glucose unit of the cellulose skeleton, about 64.9% by weight when two nitro groups are substituted, and about 55.0% by weight when three nitro groups are substituted (calculated using the above formula).

When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

Any pattern may be used as the pattern of the pattern layer 3, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The pattern layer 3 may include, for example, a solid colored substrate layer for hiding the color and pattern of a base to which the decorative sheet 1 is attached, and a pattern layer for adding a pattern for imparting the designability.

<Adhesive Layer>

The adhesive layer 4 is laminated on one side (upper side in the FIGURE) of the pattern layer 3 to bond the pattern layer 3 and the transparent resin layer 5 together.

For example, urethane, acrylic, ethylene-vinyl acetate copolymer, vinyl chloride-vinyl acetate copolymer, polyester, polyolefin, or the like can be used as the material of the adhesive layer 4. Polyolefin resin is particularly preferred because it provides good adhesion with the transparent resin layer 5.

<Transparent Resin Layer>

The transparent resin layer 5 is laminated on one side (the top side in the FIGURE) of the adhesive layer 4, and is formed of a resin composition containing the above-described biomass-derived (plant-derived) polyethylene. More specifically, the transparent resin layer 5 is a resin layer formed of a resin composition containing biomass-derived polyethylene obtained by polymerizing the above-described biomass-derived ethylene-containing monomer. That is, the transparent resin layer 5 may be formed using a resin composition containing the biomass-derived polyethylene used in the colored substrate layer 2. It may also contain a fossil fuel-derived polyethylene obtained by polymerizing a monomer containing a fossil fuel-derived ethylene and at least one of a fossil fuel-derived ethylene and α-olefin.

The transparent resin layer 5 may contain the above-described biomass-derived ethylene in an amount of 5% by mass or more, preferably 5 to 90% by mass, more preferably 25 to 75% by mass, most preferably 40 to 75% by mass relative to the total amount of the transparent resin layer 5. When the concentration of biomass-derived ethylene in the transparent resin layer 5 is 5% by mass or more, it is possible to reduce the amount of fossil fuel used compared to conventional methods, and a carbon-neutral decorative sheet can be achieved.

The density of the transparent resin layer 5 is within the range of 0.92 [g/cm$^3$] or more and 0.99 [g/cm$^3$] or less, preferably 0.94 [g/cm$^3$] or more and 0.98 [g/cm$^3$] or less, more preferably 0.95 [g/cm$^3$] or more and 0.97 [g/cm$^3$] or less. The density of the transparent resin layer 5 is a value measured according to the method specified in the method A of JIS K 7112-1980 after annealing it according to JIS K 6760-1995. When the density of the transparent resin layer 5 is 0.92 [g/cm$^3$] or more, the rigidity of the transparent resin layer 5 can be increased. When the density of the transparent resin layer 5 is 0.99 [g/cm$^3$] or less, the transparency and mechanical strength of the transparent resin layer 5 can be increased.

The transparent resin layer 5 has a thickness of 55 to 150 [μm], preferably 55 to 100 [μm], more preferably 60 to 80 [μm].

The transparent resin layer 5 may contain biomass-derived high-density polyethylene as the biomass-derived polyethylene.

The transparent resin layer 5 may also contain, as the biomass-derived polyethylene, one that is obtained by blending biomass-derived high-density polyethylene and biomass-derived low-density polyethylene at a ratio within the range of 100:0 to 20:80, respectively.

The biomass degree of the transparent resin layer 5 as a whole may be in the range of 10% or higher and 90% or lower.

The production method of the transparent resin layer 5 is not particularly limited, and a known production method can be used. In the eighth embodiment, preferably extrusion molding is used, and more preferably extrusion molding is performed by T-die extrusion or inflation molding.

In the eighth embodiment, the transparent resin layer 5 and the colored substrate layer 2 preferably satisfy the following specific relationship with respect to density, thickness, and biomass degree (concentration of biomass-derived ethylene).

In the eighth embodiment, a density d1 of the transparent resin layer 5 and a density d2 of the colored substrate layer 2 preferably satisfy d2>d1. This is because formability is required to function as the transparent resin layer 5, whereas productivity is required to function as the colored substrate layer 2.

The ratio (d2/d1) of the density d1 of the transparent resin layer 5 and the density d2 of the colored substrate layer 2 is preferably in the range of 1.1 or higher and 1.5 or lower, more preferably 1.1 or higher and 1.3 or lower, and even more preferably 1.1 or higher and 1.2 or lower. When the density ratio of the transparent resin layer and the colored substrate layer is within this range, even when biomass-derived polyethylene is used, the decorative sheet can have the required suitability for extrusion and suitability for bending.

In the eighth embodiment, a thickness t1 of the transparent resin layer 5 and a thickness t2 of the colored substrate layer 2 preferably satisfy t1≥t2. This is because some thickness is required to function as the transparent resin layer 5, whereas the colored substrate layer 2 does not require a thickness as large as that of the transparent resin layer 5 to provide its function.

The ratio (t1/t2) of the thickness t1 of the transparent resin layer 5 and the thickness t2 of the colored substrate layer 2 is preferably in the range of 1.1 or higher and 3 or lower, more preferably 1.1 or higher and 2 or lower, and even more preferably 1.1 or higher and 1.5 or lower.

In the eighth embodiment, the concentration C1 of biomass-derived ethylene in the transparent resin layer 5 and the concentration C2 of biomass-derived ethylene in the colored substrate layer 2 preferably satisfy C1>C2. This is because since a large thickness is required to function as the transparent resin layer 5 and thus a large amount of ethylene is used, the amount of fossil fuel used can be reduced by increasing the biomass degree of the transparent resin layer 5.

A nucleating agent (for example, "Rikemaster CN-002" manufactured by Riken Vitamin Co., Ltd.) may be added to the biomass-derived polyethylene forming the transparent resin layer 5.

The nucleating agent is preferably added to polyethylene within the range of 500 [ppm] or more and 2000 [ppm] or less relative to the mass of polyethylene, more preferably within the range of 1500 [ppm] or more and 2000 [ppm] or less.

The transparent resin layer 5 may have added thereto, for example, one or more selected from various additives such as a coloring agent, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The transparent resin layer 5 preferably has sufficient transparency (transparent with no color, transparent with color, translucent) to allow one to see the pattern of the pattern layer 3 through the surface (upper side) of the decorative sheet 1.

Although the biomass-derived resin forming the transparent resin layer 5 was a biomass-derived polyethylene in the eighth embodiment, the present invention is not limited to this. For example, biomass-derived polypropylene, biomass-derived polybutylene, or the like may be used instead of the biomass-derived polyethylene described above. That is, in the eighth embodiment, a wide range of biomass-derived polyolefins can be used as the biomass-derived resin forming the transparent resin layer 5.

<Surface Protection Layer>

The surface protection layer 6 is laminated on one side (the upper side in the FIGURE) of the transparent resin layer 5 in order to provide the decorative sheet 1 with weather resistance, scratch resistance, stain resistance, design, or the like.

The surface protection layer 6 can be formed using the same material as the binder resin of the pattern layer 3.

Therefore, the structure of the surface protection layer 6 is the same as that of the pattern layer 3 except that it does not contain a colorant.

The surface protection layer 6 is made of urethane (meth) acrylate (in other words, biourethane (meth)acrylate), which is a resin composition containing at least polyol, an isocyanate compound, and hydroxy (meth)acrylate. In the surface protection layer 6, at least one of the polyol, isocyanate compound, and hydroxy(meth)acrylate constituting the urethane (meth)acrylate described above contains a biomass-derived component. In other words, the surface protection layer 6 contains a biomass-derived component.

As with the binder resin of the pattern layer 3, the surface protection layer 6 may contain nitrocellulose in addition to the biourethane (meth)acrylate described above. That is, the surface protection layer 6 may be formed of the biourethane (meth)acrylate described above, or may be formed by adding nitrocellulose to the biourethane (meth)acrylate.

The surface protection layer 6 preferably has a biomass degree of 5% or higher, more preferably 5% or higher and 50% or lower, still more preferably 10% or higher and 50% or lower. When the biomass degree is within these ranges, it is possible to reduce the amount of fossil fuel used and the environmental impact. The weight of the surface protection layer 6 after being dried is preferably 0.1 [g/m$^2$] or higher and 15 [g/m$^2$] or lower, more preferably 3 [g/m$^2$] or higher and 10 [g/m$^2$] or lower, and even more preferably 6 [g/m$^2$] or higher and 9 [g/m$^2$] or lower. The thickness of the surface protection layer 6 is preferably 0.1 [μm] or more and 10 [μm] or less, more preferably 3 [μm] or more and 10 [μm] or less, even more preferably 6 [μm] or more and 9 [μm] or less.

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antimicrobial agent and an antifungal agent, for example, may be added to the surface protection layer 6 as needed.

<Uneven Part>

The uneven part 7 is formed by recesses provided in the transparent resin layer 5 and the surface protection layer 6 at a plurality of locations.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

An anticorrosion pigment may be added to the primer layer 8 to improve corrosion resistance.

The thickness of the primer layer 8 may be, for example, in the range of 1 [μm] or more and 10 [μm] or less.

The embodiment described above is an example of the present invention, and the present invention is not limited to the embodiment described above. Various modifications can be made according to a design and the like without departing from the technical idea of the present invention.

Effects of Eighth Embodiment

The decorative sheet 1 of the eighth embodiment achieves the effects described below.

(1) The colored substrate layer 2 and the transparent resin layer 5 are both resin layers formed of a resin composition containing biomass-derived olefin obtained by polymerizing a monomer containing biomass-derived olefin. The transparent resin layer 5 contains 5% by mass or more of the biomass-derived olefin and has a density within the range of 0.92 [g/cm$^3$] or higher and 0.99 [g/cm$^3$] or lower. The colored substrate layer 2 contains 5% by mass or more of the biomass-derived olefin and has a density within the range of 0.92 [g/cm$^3$] or higher and 1.12 [g/cm$^3$] or lower. The pattern layer 3 contains a colorant and a biomass-derived component. The surface protection layer 6 contains a biomass-derived component.

This makes it possible to reduce the consumption of fossil fuels by using plant-derived materials, and at the same time provide a decorative sheet capable of maintaining physical properties suitable for use as a decorative sheet.

(2) The pattern layer 3 is a resin layer containing urethane (meth)acrylate, which is a resin composition containing at least polyol, an isocyanate compound, and hydroxy (meth) acrylate. The surface protection layer 6 is a resin layer formed of the urethane (meth)acrylate. At least one of the polyol, the isocyanate compound, and the hydroxy(meth) acrylate contained in the urethane (meth)acrylate includes a biomass-derived component.

This makes it possible to reliably reduce the consumption of fossil fuels by using plant-derived materials, and at the same time provide a decorative sheet capable of reliably maintaining physical properties suitable for use as a decorative sheet.

(3) The polyol, which is a constituent element of the biourethane (meth)acrylate contained in the pattern layer 3 and surface protection layer 6, is a polyester polyol containing a biomass-derived component, a polyether polyol containing a biomass-derived component, or a polycarbonate polyol containing a biomass-derived component.

This makes it possible to more reliably reduce the consumption of fossil fuels by using plant-derived materials, and at the same time provide a decorative sheet capable of more reliably maintaining physical properties suitable for use as a decorative sheet.

(4) Among the possible polyols as a constituent element of the biourethane (meth)acrylate, the polyester polyol is a reaction product of a polyfunctional alcohol containing a biomass-derived component and a polyfunctional carboxylic acid containing a fossil fuel-derived component, or a reaction product of a polyfunctional alcohol containing a fossil fuel-derived component and a polyfunctional carboxylic acid containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(5) Among the possible polyols as a constituent element of the biourethane (meth)acrylate, the polyether polyol is a reaction product of a polyfunctional alcohol containing a biomass-derived component and a polyfunctional isocyanate containing a fossil fuel-derived component, or a reaction product of a polyfunctional alcohol containing a fossil fuel-derived component and a polyfunctional isocyanate containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(6) Among the possible polyols as a constituent element of the biourethane (meth)acrylate, the polycarbonate polyol is a reaction product of a polyfunctional alcohol containing a biomass-derived component and a carbonate containing a fossil fuel-derived component, or a reaction product of a polyfunctional alcohol containing a fossil fuel-derived component and a carbonate containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(7) The isocyanate compound, which is a component of the biourethane (meth)acrylate contained in the pattern layer 3 and surface protection layer 6, is an isocyanate compound containing a biomass-derived component.

This makes it possible to further reliably reduce the consumption of fossil fuels by using plant-derived materials, and at the same time provide a decorative sheet capable of further reliably maintaining physical properties suitable for use as a decorative sheet.

(8) The decorative material 10 includes the substrate 9 and the decorative sheet 1 laminated on at least one side thereof.

This makes it possible to reduce the consumption of fossil fuels by using plant-derived materials, and at the same time provide a decorative material capable of maintaining physical properties suitable for use as a decorative sheet.

Sixth Example

The decorative materials of Examples 1 to 16 and Reference Examples 1 to 3 will be described below with reference to the eighth embodiment.

Example 1

After applying corona discharge to one side of the substrate, a pattern layer, a urethane-based adhesive layer, a maleic anhydride-modified polyethylene resin layer (a transparent adhesive layer), a transparent resin layer, and a surface protection layer containing an acrylic resin composition as a main component were laminated on that side of the substrate in this order. After applying corona discharge to the other side of the substrate, a primer layer (thickness: 1 to 2 [μm]) made of polyester urethane resin was formed. A decorative sheet (total thickness: 135 [μm]) of Example 1 was thus obtained.

In Example 1, a colored substrate layer (thickness: 55 [μm]) formed of a resin composition containing biomass-derived high-density polyethylene and fossil fuel-derived low-density polyethylene was used as the substrate. The colored substrate layer was obtained by subjecting this resin composition to calendaring. The biomass degree of the colored substrate layer thus formed is 80%, and the density of the colored substrate layer is 1.08 [g/cm$^3$].

A transparent resin layer (thickness: 80 [μm]) formed of a resin composition containing biomass-derived polyethylene ("biomass polyethylene" manufactured by Braskem) was used as the transparent resin layer. This biomass-derived polyethylene was obtained by blending biomass-derived high-density polyethylene (SHC7260) and biomass-derived low-density polyethylene (SPB681) at a ratio (high-density polyethylene/low-density polyethylene) of 80/20. The transparent resin layer was obtained by extrusion-laminating this resin. The biomass degree of the transparent resin layer thus formed is 94%, and the density of the transparent resin layer is 0.95 [g/cm$^3$].

A biourethane (meth)acrylate that is a reaction product of a polyester polyol containing a biomass-derived component, a fossil fuel-derived isocyanate compound, and a fossil fuel-derived hydroxy (meth)acrylate was used for the binder resin of the pattern layer. A polyester polyol that is a reaction product of a polyfunctional alcohol containing a biomass-derived component and a fossil fuel-derived polyfunctional carboxylic acid was used as the polyester polyol containing a biomass-derived component.

The surface protection layer was formed using the same biourethane (meth)acrylate as that used for the binder resin of the pattern layer.

Example 2

The decorative sheet of Example 2 was obtained in the same manner as in Example 1, except that a reaction product of a fossil fuel-derived polyfunctional alcohol and a polyfunctional carboxylic acid containing a biomass-derived component was used as the polyester polyol in the biourethane (meth)acrylate forming the surface protection layer.

Example 3

The decorative sheet of Example 3 was obtained in the same manner as in Example 1, except that a biourethane (meth)acrylate that is a reaction product of a fossil fuel-derived polyester polyol, an isocyanate compound containing a biomass-derived component, and a fossil fuel-derived hydroxy (meth)acrylate was used as the biourethane (meth) acrylate forming the surface protection layer.

Example 4

The decorative sheet of Example 4 was obtained in the same manner as in Example 1, except that polyether polyol was used as the polyol in the biourethane (meth)acrylate forming the surface protection layer. Specifically, a reaction product of a polyfunctional alcohol containing a biomass-derived component and a fossil fuel-derived polyfunctional isocyanate was used as the polyether polyol.

Example 5

The decorative sheet of Example 5 was obtained in the same manner as in Example 4, except that a reaction product of a fossil fuel-derived polyfunctional alcohol and a polyfunctional isocyanate containing a biomass-derived component was used as the polyether polyol in the biourethane (meth)acrylate forming the surface protection layer.

Example 6

The decorative sheet of Example 6 was obtained in the same manner as in Example 3, except that fossil fuel-derived polyether polyol was used as the polyol in the biourethane (meth)acrylate forming the surface protection layer.

Example 7

The decorative sheet of Example 7 was obtained in the same manner as in Example 1, except that polycarbonate polyol was used as the polyol in the biourethane (meth) acrylate forming the surface protection layer. Specifically, a reaction product of a polyfunctional alcohol containing a biomass-derived component and a fossil fuel-derived carbonate was used as the polycarbonate polyol.

Example 8

The decorative sheet of Example 8 was obtained in the same manner as in Example 3, except that fossil fuel-derived polycarbonate polyol was used as the polyol in the biourethane (meth)acrylate forming the surface protection layer.

Example 9

The decorative sheet of Example 9 was obtained in the same manner as in Example 1, except that a reaction product of a fossil fuel-derived polyfunctional alcohol and a polyfunctional carboxylic acid containing a biomass-derived component was used as the polyester polyol in the biourethane (meth)acrylate, which is the binder resin of the pattern layer.

Example 10

The decorative sheet of Example 10 was obtained in the same manner as in Example 1, except that a biourethane (meth)acrylate that is a reaction product of a fossil fuel-derived polyester polyol, an isocyanate compound containing a biomass-derived component, and a fossil fuel-derived hydroxy (meth)acrylate was used as the biourethane (meth) acrylate, which is the binder resin of the pattern layer.

Example 11

The decorative sheet of Example 11 was obtained in the same manner as in Example 1, except that polyether polyol was used as the polyol in the biourethane (meth)acrylate, which is the binder resin of the pattern layer. Specifically, a reaction product of a polyfunctional alcohol containing a biomass-derived component and a fossil fuel-derived polyfunctional isocyanate was used as the polyether polyol.

Example 12

The decorative sheet of Example 12 was obtained in the same manner as in Example 11, except that a reaction product of a fossil fuel-derived polyfunctional alcohol and a polyfunctional isocyanate containing a biomass-derived component was used as the polyether polyol in the biourethane (meth)acrylate, which is the binder resin of the pattern layer.

Example 13

The decorative sheet of Example 13 was obtained in the same manner as in Example 10, except that fossil fuel-derived polyether polyol was used as the polyol in the biourethane (meth)acrylate, which is the binder resin of the pattern layer.

Example 14

The decorative sheet of Example 14 was obtained in the same manner as in Example 1, except that a polycarbonate polyol was used as the polyol in the biourethane (meth) acrylate, which is the binder resin of the pattern layer. Specifically, a reaction product of a polyfunctional alcohol containing a biomass-derived component and a fossil fuel-derived carbonate was used as the polycarbonate polyol.

Example 15

The decorative sheet of Example 15 was obtained in the same manner as in Example 10, except that fossil fuel-derived polycarbonate polyol was used as the polyol in the biourethane (meth)acrylate, which is the binder resin of the pattern layer.

Example 16

The decorative sheet of Example 16 was obtained in the same manner as in Example 1, except that it was formed by mixing biomass-derived high-density polyethylene (SHC7260) and biomass-derived low-density polyethylene (SPB681) at a ratio (high-density polyethylene/low-density polyethylene) of 100/0, and extrusion-laminating that resin.

Reference Example 1

The decorative sheet of Reference Example 1 was obtained in the same manner as in Example 1, except that the pattern layer was formed with a urethane-based printing ink, and the surface protection layer was formed of an acrylic resin-based UV-curable resin.

Reference Example 2

The decorative sheet of Reference Example 2 was obtained in the same manner as in Example 1, except that the transparent resin layer was obtained by extrusion-laminating only a fossil fuel-derived homopolypropylene resin manufactured by Prime Polymer Co., Ltd.

Reference Example 3

The decorative sheet of Reference Example 3 was obtained in the same manner as in Example 1, except that the colored substrate layer was obtained using only a fossil fuel-derived colored polyethylene resin.

(Performance Evaluation and Evaluation Results)

The decorative sheets of Examples 1 to 16 and Reference Examples 1 to 3 were evaluated on "haze (%) of the transparent resin layer", "pencil hardness", "Hoffman scratch test", "suitability for extrusion", and "bend whitening". The evaluation was carried out as follows.

<Haze (%) of Transparent Resin Layer>

The haze % of the transparent resin layer was measured using an ultraviolet-visible-near-infrared spectrophotometer (UV-3600 manufactured by Shimadzu Corporation).

For each of the Examples and Reference Examples, a resin having the same composition as the transparent resin layer of the corresponding Example was extruded so that the obtained resin film had a thickness of 70 [μm] or more and 80 [μm] or less. The haze at a wavelength of 555 nm was measured with a spectrophotometer (integrating sphere) to evaluate the haze. The sample was rated as "A" when the haze was lower than 15%, rated as "B" when the haze was in the range of 15% or higher and lower than 25%, and rated as "C" when the haze was 25% or higher.

In this example, it was assumed that samples rated "A" and "B" are suitable.

<Pencil Hardness>

The pencil hardness was measured with a (automatic) pencil hardness tester (C221A manufactured by Yoshimitsu Seiki).

For each of the Examples and Reference Examples, after carrying out a pencil hardness test using pencils with different hardnesses on the decorative material including the decorative sheet, damage (scratching) on the surface (surface protection layer) was checked to evaluate the surface hardness. When damage on the surface was confirmed after conducting the pencil hardness test using a pencil having a hardness of 2 B or greater, the sample was rated as "A", and when damage on the surface was confirmed after conducting the pencil hardness test using a pencil having a hardness of 4 B or greater, the sample was rated as "B". When damage on the surface was confirmed after conducting the pencil hardness test using a pencil having a hardness of 5 B or lower, the sample was rated as "C".

In this example, it was assumed that samples rated "A" and "B" are suitable.

<Hoffman Scratch Test>

The Hoffman scratch test was conducted by setting a scratch blade (φ7 cylindrical blade) so that it came into contact with the surface of the decorative sheet at an angle of 45°, and moving the tester over the decorative sheet.

The scratching load (weight) was gradually increased from 200 to 2000 g (in increments of 200 g), and the samples were evaluated based on the load (g) at which a scratch was formed in the sample surface. When a scratch was formed at a load of 800 g, it was specified as "600 g" in the table as the withstand load.

In this example, samples with a withstand load of "200 g" were considered defective.

<Suitability for Extrusion>

A transparent resin layer was extruded to check the suitability for production (suitability for extrusion).

When it was able to be produced (molded) without any problems, it was rated as "Good" (suitable). On the other hand, samples that had the possibility of being defective were rated as "Poor" (unsuitable).

<Bend Whitening>

Using a decorative sheet laminated with a MDF (that is, a decorative material), the suitability for V-cutting (whether there is whitening at the bent part or not) was checked.

Those that did not have whitening were rated as "Good" (suitable), those that had slight whitening were rated as "Fair" (suitable), and those that had whitening were rated as "Poor" (unsuitable).

TABLE 10

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Haze | B | B | B | B | B | B | B | B |
| Pencil hardness | B | B | B | B | B | B | B | B |
| Hoffman scratch test | 600 | 600 | 600 | 600 | 600 | 600 | 600 | 600 |
| Suitability for extrusion | Good | Good | Good | Good | Good | Good | Good | Good |
| Suitability for bending | Good | Good | Good | Good | Good | Good | Good | Good |

TABLE 11

| | Ex. 9 | Ex. 10 | Ex. 11 | Ex. 12 | Ex. 13 | Ex. 14 | Ex. 15 | Ex. 16 |
|---|---|---|---|---|---|---|---|---|
| Haze | B | B | B | B | B | B | B | B |
| Pencil hardness | B | B | B | B | B | B | B | A |
| Hoffman scratch test | 600 | 600 | 600 | 600 | 600 | 600 | 600 | 600 |
| Suitability for extrusion | Good | Good | Good | Good | Good | Good | Good | Good |
| Suitability for bending | Good | Good | Good | Good | Good | Good | Good | Good |

TABLE 12

| | Ref. Ex. 1 | Ref. Ex. 2 | Ref. Ex. 3 |
|---|---|---|---|
| Haze | B | A | B |
| Pencil hardness | B | B | B |
| Hoffman scratch test | 600 | 600 | 600 |
| Suitability for extrusion | Good | Good | Good |
| Suitability for bending | Good | Good | Good |

The various kinds of performance evaluation results obtained as described above showed that the performances of the decorative sheets of Examples 1 to 16 were similar to or better than those of Reference Examples 1 to 3 in all evaluation tests. This shows that the decorative sheets of Examples 1 to 16 can reduce the consumption of fossil fuel by using plant-derived materials, and at the same time maintain physical properties suitable for use as a decorative sheet.

Ninth Embodiment

The structure of a decorative material 10 will be described with reference to the FIGURE.

As shown in the FIGURE, the decorative material 10 includes a decorative sheet 1 and a substrate 9. The specific structure of the decorative sheet 1 will be described later.

Since the structure of the decorative material 10 of the ninth embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes a colored substrate layer (colored thermoplastic resin layer) 2, a pattern layer 3, an adhesive layer 4, a transparent resin layer (transparent thermoplastic resin layer) 5, a surface protection layer 6, an uneven part 7, and a primer layer 8.

<Colored Substrate Layer>

The colored substrate layer 2 is a resin layer formed using a thermoplastic resin, and is a colored resin layer formed using a resin composition containing biomass-derived (plant-derived) polyethylene. Further, the colored resin layer contains an inorganic substance.

The composition of the colored substrate layer 2 will be described in detail below.

(Biomass-Derived Polyethylene)

In the ninth embodiment, the biomass-derived polyethylene is obtained by polymerizing monomers containing biomass-derived ethylene. The biomass-derived ethylene is not particularly limited, and an ethylene produced by a conventionally known method can be used. Since biomass-derived ethylene is used as the raw material monomer, the polyethylene obtained by the polymerization thereof will be biomass-derived.

The raw material monomer for polyethylene does not have to contain 100% by mass of biomass-derived ethylene.

The monomer, which is a raw material for biomass-derived polyethylene, may further contain at least one of fossil fuel-derived ethylene and fossil fuel-derived α-olefin, and/or may further contain a biomass-derived α-olefin.

Although the number of carbon atoms of the α-olefin is not particularly limited, those having 3 to 20 carbon atoms can usually be used, and preferably butylene, hexene, or octene may be used. This is because butylene, hexene, and octene can be produced by polymerization of ethylene as a biomass-derived raw material. In addition, when such an α-olefin is contained, the polyethylene obtained by the polymerization has an alkyl group as a branched structure. This allows it to have more flexibility than a simple linear polyethylene.

By using an ethylene as a biomass-derived raw material, it is theoretically possible to produce a polyethylene from 100% biomass-derived components.

The biomass-derived ethylene concentration in the polyethylene (hereinafter may also referred to as "biomass degree") is a value obtained by measuring the biomass-derived carbon content by radioactive carbon (C14) measurement. It is known that, since carbon dioxide in the atmosphere contains some C14 (105.5 pMC), the C14 content in plants that grow by taking in carbon dioxide in the atmosphere, such as corn, is also about 105.5 pMC. It is also known that fossil fuels contain almost no C14. Therefore, the proportion of biomass-derived carbon can be calculated by measuring the proportion of C14 in all the carbon atoms in polyethylene. In the ninth embodiment, the content P bio of biomass-derived carbon can be determined as follows, where P C14 is the content of C14 in polyethylene.

$$P\ bio\ (\%)=P\ C14/105.5\times100$$

In the ninth embodiment, theoretically, if the raw material of polyethylene is completely biomass-derived ethylene, the biomass-derived ethylene concentration is 100%, and the biomass degree of the biomass-derived polyethylene is 100. The concentration of biomass-derived ethylene in a fossil fuel-derived polyethylene produced only from a fossil fuel-derived raw material is 0%, and the biomass degree of the fossil fuel-derived polyethylene is 0.

In the ninth embodiment, the biomass-derived polyethylene and the decorative sheet containing the polyethylene need not have a biomass degree of 100.

In the ninth embodiment, the polymerization method of the biomass-derived ethylene-containing monomers is not particularly limited, and a conventionally known method can be used. The polymerization temperature and polymerization pressure should be adjusted as appropriate according to the polymerization method and polymerization device. The polymerization device is also not particularly limited, and a conventionally known device can be used. An example of a method for polymerizing ethylene-containing monomers will now be described.

The polymerization method for an ethylene polymer or a copolymer of ethylene and α-olefin can be selected as appropriate depending on the type of polyethylene desired, for example, the difference in density and branching, such as high-density polyethylene (HDPE), medium-density polyethylene (MDPE), low-density polyethylene (LDPE), and linear low-density polyethylene (LLDPE). For example, the polymerization is preferably performed using a multi-site catalyst, such as a Ziegler-Natta catalyst, or a single-site catalyst, such as a metallocene catalyst, as the polymerization catalyst by one of gas phase polymerization, slurry polymerization, solution polymerization, and high pressure ion polymerization, and in one or more stages.

An ethylene polymer or an ethylene/α-olefin copolymer may be used alone as the biomass-derived polyethylene, or two or more of them may be used in combination.

(Resin Composition Containing Biomass-Derived Polyethylene)

In the ninth embodiment, the resin composition contains the above-described polyethylene as a main component. The resin composition contains biomass-derived ethylene in an amount of 5% by mass or more, preferably 5 to 95% by mass, more preferably 25 to 75% by mass, relative to the total amount of the resin composition. When the concentration of biomass-derived ethylene in the resin composition is 5% by mass or more, it is possible to reduce the consumption of fossil fuel compared to the conventional methods that use fossil fuel, and a carbon-neutral decorative sheet can be achieved.

The above resin composition may contain two or more polyethylenes having different biomass degrees. In this case, the concentration of biomass-derived ethylene in the resin composition as a whole needs to be within the above range.

The above resin composition may further contain a fossil fuel-derived polyethylene obtained by polymerizing a monomer containing a fossil fuel-derived ethylene and at least one of a fossil fuel-derived ethylene and α-olefin. That is, in the ninth embodiment, the resin composition may be a mixture of biomass-derived polyethylene and fossil fuel-derived polyethylene. The mixing method is not particularly limited, and a known mixing method can be used. For example, dry blending or melt blending may be used.

According to the ninth embodiment, the resin composition contains biomass-derived polyethylene in an amount of 5% by mass or more, preferably 5 to 90% by mass, more preferably 25 to 75% by mass. The resin composition may contain a mixture of biomass-derived polyethylene and, for example, fossil fuel-derived polyethylene. The concentration of biomass-derived ethylene should again be 5% by mass or more, preferably 5 to 90% by mass, more preferably 25 to 75% by mass when such a mixture is used.

Various additives other than polyethylene, which is the main component, may be added to the resin composition produced in the production process of the resin composition as long as the characteristics thereof are not impaired. Examples of additives include plasticizers, ultraviolet stabilizers, anti-coloring agents, matting agents, deodorants, flame retardants, anti-weathering agents, antistatic agents, yarn friction reducing agents, slip agents, release agents, antioxidants, ion exchange agents, and color pigments. These additives are added in an amount of preferably 1 to 20% by mass, preferably 1 to 10% by mass, relative to the total amount of the resin composition.

(Inorganic Substance)

The colored substrate layer 2 contains an inorganic substance, and the specific gravity of the colored substrate layer 2 is 0.97 or higher and 1.5 or lower.

The inorganic substance may be, for example, one or more of calcium carbonate, titanium oxide, carbon black, silica, chromium, antimony, a titanium composite, and other oxides.

As described above, the colored substrate layer 2 contains biomass-derived ethylene in an amount of 5% by mass or more relative to the total amount of the colored substrate layer 2. When the concentration of biomass-derived ethylene in the colored substrate layer 2 is 5% by mass or more, it is possible to reduce the amount of fossil fuel used compared to conventional methods, and a carbon-neutral decorative sheet can be achieved.

Further, the inorganic substance is added to the colored substrate layer 2 so that it has a specific gravity of 0.97 or higher and 1.5 or lower. By adding the inorganic substance to the colored substrate layer 2 so that it has a specific gravity of 0.97 or higher and 1.5 or lower, the concealing properties of the colored substrate layer 2 can be improved.

The biomass-derived polyethylene contained in the colored substrate layer 2 may contain biomass-derived high-density polyethylene and biomass-derived low-density polyethylene, biomass-derived high-density polyethylene and fossil fuel-derived polyethylene, or fossil fuel-derived high-density polyethylene and biomass-derived low-density polyethylene. The biomass degree of the colored substrate layer 2 as a whole may be in the range of 10% or higher and 90% or lower.

Biomass-derived high-density polyethylene is polyethylene having a density greater than 0.94. Biomass-derived low-density polyethylene is polyethylene having a density of 0.94 or less.

The colored substrate layer 2 preferably contains, as the biomass-derived polyethylene, one that is obtained by blending biomass-derived high-density polyethylene and low-density polyethylene (either biomass-derived or fossil fuel-derived) at a ratio within the range of 95:5 to 70:30, respectively. When the content of the low-density polyethylene is low, the film formation becomes unstable, and when the content of the low-density polyethylene is high, the product becomes too soft.

The production method of the colored substrate layer 2 is not particularly limited, and a known production method can be used. In the ninth embodiment, preferably calendaring is used.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The thickness of the colored substrate layer 2 is preferably in the range of 40 [μm] or more and 200 [μm] or less, more preferably in the range of 51 [μm] or more and 200 [μm] or less, and even more preferably in the range of 55 [μm] or more and 100 [μm] or less. This is because, when the thickness of the colored substrate layer 2 is 40 [μm] or more, it can absorb irregularities or bumps on the underlying floor material or the like, which improves the finish of the decorative sheet 1. When the thickness of the colored substrate layer 2 is 200 [μm] or less, the manufacturing cost of the decorative sheet 1 can be reduced without forming the colored substrate layer 2 thicker than necessary.

Although the biomass-derived resin forming the colored substrate layer 2 was a biomass-derived polyethylene in the ninth embodiment, the present invention is not limited to this. For example, biomass-derived polypropylene, biomass-derived polybutylene, or the like may be used instead of the biomass-derived polyethylene described above. That is, in the ninth embodiment, a wide range of biomass-derived polyolefins can be used as the biomass-derived resin forming the colored substrate layer 2.

<Pattern Layer>

The pattern layer 3 is laminated on one side (the upper side in the FIGURE) of the colored substrate layer 2, and is a layer for adding a pattern for imparting design. The design layer 3 may be replaced with the coloring of the colored substrate layer 2, in which case the design layer 3 may be omitted.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

Examples of binder resins that can be used include, but are not limited to, urethane-based resins, acrylic resins, vinyl chloride-acetate resins, polyimide-based resins, nitrocellulose, or a mixture of these.

Any pattern may be used as the pattern, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The thickness of the pattern layer 3 is preferably within the range of 1 [μm] or more and 10 [μm] or less. This is because when the pattern layer 3 has a thickness of 1 [μm] or more, clear printing is possible. When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

The pattern layer 3 may include, for example, a solid colored substrate layer for hiding the color and pattern of a base to which the decorative sheet 1 is attached, and a pattern layer for adding a pattern for imparting the designability.

<Adhesive Layer>

The adhesive layer 4 is laminated on one side (upper side in the FIGURE) of the pattern layer 3 to bond the pattern layer 3 and the transparent resin layer 5 together.

For example, urethane, acrylic, ethylene-vinyl acetate copolymer, vinyl chloride-vinyl acetate copolymer, polyester, polyolefin, or the like can be used as the material of the adhesive layer 4. Polyolefin resin is particularly preferred because it provides good adhesion with the transparent resin layer 5.

<Transparent Resin Layer>

The transparent resin layer 5 is laminated on one side (the top side in the FIGURE) of the adhesive layer 4, and is formed of a resin composition containing the above-described biomass-derived (plant-derived) polyethylene, or a resin composition containing fossil fuel-derived polyethylene. More specifically, the transparent resin layer 5 is a resin layer formed of a resin composition containing biomass-derived polyethylene obtained by polymerizing the above-described biomass-derived ethylene-containing monomer. That is, the transparent resin layer 5 may be formed using a resin composition containing the biomass-derived polyethylene used in the colored substrate layer 2 without any inorganic substance added. In other words, both the colored substrate layer 2 and the transparent resin layer 5 are formed of a resin composition containing biomass-derived (plant-derived) polyethylene. An inorganic substance is added to the colored substrate layer 2 but not to the transparent resin layer 5. Since no inorganic substance is added to the transparent resin layer 5 located on top of the pattern layer 3, and the inorganic substance is added only to the colored substrate layer 2 below the pattern layer 3, the transparency of the transparent resin layer 5 is maintained so that it does not conceal the pattern layer 3. At the same time, the concealing properties of the colored substrate layer 2 are improved so that the color and pattern of the underlying material to which the decorative sheet 1 is attached can be concealed.

The transparent resin layer 5 may contain the above-described biomass-derived ethylene in an amount of 5% by mass or more, preferably 5 to 90% by mass, more preferably 25 to 75% by mass, most preferably 40 to 75% by mass relative to the total amount of the transparent resin layer 5. When the concentration of biomass-derived ethylene in the transparent resin layer 5 is 5% by mass or more, it is possible to reduce the amount of fossil fuel used compared to conventional methods, and a carbon-neutral decorative sheet can be achieved.

The transparent resin layer 5 may contain biomass-derived high-density polyethylene as the biomass-derived polyethylene.

The transparent resin layer 5 may also contain, as the biomass-derived polyethylene, one that is obtained by blending biomass-derived high-density polyethylene and biomass-derived low-density polyethylene at a ratio within the range of 100:0 to 20:80, respectively.

The biomass degree of the transparent resin layer 5 as a whole may be in the range of 10% or higher and 90% or lower.

The production method of the transparent resin layer 5 is not particularly limited, and a known production method can be used. In the ninth embodiment, preferably extrusion molding is used, and more preferably extrusion molding is performed by T-die extrusion or inflation molding.

A nucleating agent (for example, "Rikemaster CN-002" manufactured by Riken Vitamin Co., Ltd.) may be added to the biomass-derived polyethylene forming the transparent resin layer 5.

The nucleating agent is preferably added to polyethylene within the range of 500 [ppm] or more and 2000 [ppm] or less relative to the mass of polyethylene, more preferably within the range of 1500 [ppm] or more and 2000 [ppm] or less.

The transparent resin layer 5 may have added thereto, for example, one or more selected from various additives such as a coloring agent, a filler, an ultraviolet absorber, a light stabilizer, a heat stabilizer, an antioxidant, an antistatic agent, a lubricant, a flame retardant, an antibacterial agent, an antifungal agent, an antifriction agent, a light scattering agent and a gloss adjusting agent, according to need.

The transparent resin layer 5 preferably has sufficient transparency (transparent with no color, transparent with color, translucent) to allow one to see the pattern of the pattern layer 3 through the surface (upper side) of the decorative sheet 1.

<Surface Protection Layer>

The surface protection layer 6 is laminated on one side (the upper side in the FIGURE) of the transparent resin layer 5 in order to provide the decorative sheet 1 with weather resistance, scratch resistance, stain resistance, design, or the like.

The surface protection layer 6 may be formed using, for example, an acrylic resin composition.

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antimicrobial agent and an antifungal agent, for example, may be added to the surface protection layer 6 as needed.

<Uneven Part>

The uneven part 7 is formed by recesses provided in the transparent resin layer 5 and the surface protection layer 6 at a plurality of locations.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

An anticorrosion pigment may be added to the primer layer 8 to improve corrosion resistance.

The thickness of the primer layer 8 may be, for example, in the range of 1 [μm] or more and 10 [μm] or less.

<Concentration of Biomass-Derived Ethylene in Decorative Sheet>

As described above, the colored substrate layer 2 and the transparent resin layer 5 each contain 5% by mass or more of biomass-derived ethylene, and the decorative sheet 1 as a whole preferably contains 5% by mass or more of the biomass-derived material.

<Specific Gravity of Decorative Sheet as a Whole>

The specific gravity of the decorative sheet 1 as a whole is preferably controlled to 0.97 or higher and 1.5 or lower by adding an inorganic substance to a colored thermoplastic resin layer. By doing so, for example, it is possible to form a decorative sheet 1 having concealing properties equivalent to that of a structure formed using a fossil fuel-derived polyethylene.

The embodiment described above is an example of the present invention, and the present invention is not limited to the embodiment described above. Various modifications can be made according to a design and the like without departing from the technical idea of the present invention.

Effects of Ninth Embodiment

The decorative sheet 1 of the ninth embodiment achieves the effects described below.

(1) The colored substrate layer 2 is a resin layer formed of a resin composition containing 5% by mass or more of biomass-derived ethylene. Further, an inorganic substance is added to the colored substrate layer 2. The specific gravity of the colored substrate layer 2 is 0.97 or higher and 1.5 or lower.

Therefore, even when a biomass-derived polyethylene, which is a plant-derived material, is used, a colored substrate layer 2 can be formed that has concealing properties equivalent to that of a structure formed using, for example, fossil fuel-derived polyethylene.

As a result, a decorative sheet 1 capable of suppressing a decrease in concealing performance can be provided even when it is formed using a biomass-derived polyethylene, which is a plant-derived material.

(2) At least one of the transparent resin layer 5 and colored substrate layer 2 may contain, as the biomass-derived polyethylene, biomass-derived high-density polyethylene and biomass-derived low-density polyethylene.

This makes it possible to form a transparent resin layer 5 and a colored substrate layer 2 having more flexibility.

(3) The transparent resin layer 5 may contain, as the biomass-derived polyethylene, one that is obtained by blending biomass-derived high-density polyethylene and biomass-derived low-density polyethylene at a ratio within the range of 100:0 to 20:80, respectively.

This makes it possible to form a harder transparent resin layer 5.

(4) The colored substrate layer 2 may contain, as the biomass-derived polyethylene, biomass-derived high-density polyethylene and biomass-derived low-density polyethylene, and the biomass degree may be in the range of 10% or higher and 90% or lower.

This makes it possible to form a colored substrate layer 2 having good film-forming stability and sufficient softness as a decorative sheet.

The decorative material 10 of the ninth embodiment achieves the effect described below.

(5) The decorative material 10 includes the substrate 9 and the decorative sheet 1 laminated on at least one side thereof.

As a result, a decorative material 10 capable of suppressing a decrease in concealing performance can be provided even when it is formed using a biomass-derived polyethylene, which is a plant-derived material.

Seventh Example

The decorative sheets of Examples 1 to 6 and Comparative Examples 1 to 3 will be described below with reference to the ninth embodiment.

Example 1

After applying corona discharge to one side of the substrate, a pattern layer printed with urethane-based printing ink, a urethane-based adhesive layer, a maleic anhydride-modified polyethylene resin layer (an adhesive layer), a transparent resin layer, and a surface protection layer containing an acrylic resin composition as a main component were laminated on that side of the substrate in this order. After applying corona discharge to the other side of the substrate, a primer layer (thickness: 1 to 2 [μm]) made of polyester urethane resin was formed on that other side of the substrate. A decorative sheet (total thickness: 135 [μm]) of Example 1 was thus obtained. The biomass degree of the decorative sheet was 80%.

The decorative material can be obtained by bonding an MDF (medium density fiberboard) to the primer layer side of the decorative sheet using, for example, the adhesive BA-10L manufactured by Japan Coating Resin Corporation and the curing agent BA-11B manufactured by Japan Coating Resin Corporation.

In Example 1, a colored substrate layer (thickness: 55 [μm]) formed of a resin composition containing biomass-derived polyethylene ("green polyethylene" manufactured by Braskem) and to which an inorganic substance was added was used as the substrate. This biomass-derived polyethylene is a resin obtained by blending biomass-derived high-density polyethylene and biomass-derived low-density polyethylene. Calcium carbonate and titanium oxide were mixed as inorganic substances so that the colored substrate layer had a specific gravity of 1.2. The colored substrate layer was obtained by extrusion-laminating this resin. The biomass degree of the colored substrate layer thus formed is 80%.

A transparent resin layer (thickness: 60 [μm]) formed of a resin composition containing biomass-derived polyethylene ("green polyethylene" manufactured by Braskem) like the colored substrate layer but without any inorganic substance added thereto was used as the transparent resin layer. This biomass-derived polyethylene was obtained by blending biomass-derived high-density polyethylene (SHC7260) and biomass-derived low-density polyethylene (SPB681) at a ratio (high-density polyethylene/low-density polyethylene) of 80/20. The transparent resin layer was obtained by extrusion-laminating this resin.

Example 2

The decorative sheet of Example 2 was obtained in the same manner as in Example 1, except that calcium carbonate was added as the inorganic substance so that the colored substrate layer had a specific gravity of 0.97.

Example 3

The decorative sheet of Example 3 was obtained in the same manner as in Example 1, except that calcium carbonate and titanium oxide were added as the inorganic substances so that the colored substrate layer had a specific gravity of 1.5.

Example 4

The decorative sheet of Example 4 was obtained in the same manner as in Example 1, except that calcium carbonate and titanium oxide were added as the inorganic substances so that the colored substrate layer had a specific gravity of 1.0.

Example 5

The decorative sheet of Example 5 was obtained in the same manner as in Example 1, except that the transparent resin layer was obtained using a fossil fuel-derived polypropylene resin instead.

Example 6

The decorative sheet of Example 6 was obtained in the same manner as in Example 1, except that it was formed by mixing biomass-derived high-density polyethylene (SHC7260) and biomass-derived low-density polyethylene (SPB681) at a ratio (high-density polyethylene/low-density polyethylene) of 100/0, and extrusion-laminating that resin.

Comparative Example 1

The decorative sheet of Comparative Example 1 was obtained in the same manner as in Example 1, except that calcium carbonate and titanium oxide were added as the inorganic substances so that the specific gravity became 0.96.

Comparative Example 2

The decorative sheet of Comparative Example 2 was obtained in the same manner as in Example 1, except that titanium oxide was added as an inorganic substance so that the specific gravity became 0.95.

Comparative Example 3

The decorative sheet of Comparative Example 3 was obtained in the same manner as in Example 1, except that calcium carbonate and titanium oxide were added as the inorganic substances so that the specific gravity became 1.6.

(Performance Evaluation and Evaluation Results)

The decorative sheets of Examples 1 to 5 and Comparative Examples 1 to 3 were evaluated on "concealing performance", "productivity of colored thermoplastic resin layer (colored substrate layer)", and "suitability for printing". The evaluation was carried out as follows.

<Concealing Performance>

The decorative sheet was subjected to the concealing performance test described in JIS 6921, Wallpaper and wallcoverings for decorative finish.

The samples were rated according to the criteria for concealing performance of JIS 6921. In the table, "A" represents grade 4 samples, "B" represents grade 3 samples, and "C" represents grade 2 samples.

<Productivity of Colored Thermoplastic Resin Layer>

The defectiveness of decorative sheets was evaluated by visually observing them to check their suitability for film formation including surface condition, the presence or absence of fish eyes, the presence or absence of variation in thickness, and the like. Samples with almost no defect were rated as "A", samples that were defective but not to an extent that there would be an effect in the production were rated as "B", and samples that were so defective that there would be an effect in the production was rated as "C". Samples were rated "B" when the number of defective spots was about 1 to 2 per square meter.

<Suitability for Printing>

The decorative sheets were visually observed to determine whether there was poor ink adhesion, whether thermal wrinkling was formed during drying, and the like. Samples were rated "A" when their suitability for printing was not inferior to that of the current decorative sheets, rated "B" when they were less suitable for printing but not to an extent that there would be an effect in the production, and rated "C" when there would be an effect in the production depending on conditions.

Table 1 shows the evaluation results for various items obtained using the above methods. The decorative sheets of Examples 1 to 6 mostly exhibited good performance in all evaluation tests. On the other hand, the decorative sheets of Comparative Examples 1 to 3 exhibited insufficient performance in at least part of the evaluation tests.

Tenth Embodiment

The structure of a decorative material 10 will be described with reference to the FIGURE.

As shown in the FIGURE, the decorative material 10 includes a decorative sheet 1 and a substrate 9. The specific structure of the decorative sheet 1 will be described later.

Since the structure of the decorative material 10 of the tenth embodiment is the same as that of the first embodiment described above except for the structure of the decorative sheet 1, only the structure of the decorative sheet 1 will be described.

(Structure of Decorative Sheet)

As shown in the FIGURE, the decorative sheet 1 includes the colored substrate layer (colored thermoplastic resin layer) 2, the pattern layer 3, the surface protection layer 6, and the primer layer 8.

<Colored Substrate Layer>

The colored substrate layer 2 is a resin layer formed using a thermoplastic resin, and is a colored resin layer formed using a resin composition containing biomass-derived (plant-derived) polyethylene.

The composition of the colored substrate layer 2 will be described in detail below.

(Biomass-Derived Polyethylene)

In the tenth embodiment, the biomass-derived polyethylene is obtained by polymerizing monomers containing biomass-derived ethylene. The biomass-derived ethylene is not particularly limited, and an ethylene produced by a conventionally known method can be used. Since biomass-derived ethylene is used as the raw material monomer, the polyethylene obtained by the polymerization thereof will be biomass-derived.

The raw material monomer for polyethylene does not have to contain 100% by mass of biomass-derived ethylene.

The monomer, which is a raw material for biomass-derived polyethylene, may further contain at least one of fossil fuel-derived ethylene and fossil fuel-derived α-olefin, and/or may further contain a biomass-derived α-olefin.

Although the number of carbon atoms of the α-olefin is not particularly limited, those having 3 to 20 carbon atoms can usually be used, and preferably butylene, hexene, or

TABLE 13

| | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Concealing performance | A | B | A | B | A | A | C | C | A |
| Specific gravity of colored thermoplastic resin layer | 1.2 | 0.97 | 1.5 | 1.0 | 1.2 | 1.2 | 0.96 | 0.95 | 1.6 |
| Inorganic substance | Calcium carbonate Titanium oxide | Calcium carbonate | Titanium oxide | Silica | Calcium carbonate Titanium oxide | Calcium carbonate Titanium oxide | Calcium carbonate | Titanium oxide | Calcium carbonate Titanium oxide |
| Productivity of colored thermoplastic resin layer | B | A | B | A | B | B | A | A | D |
| Suitability for printing | A | A | B | A | A | A | A | A | C |
| Biomass degree of decorative sheet | 80 | 80 | 80 | 80 | 80 | 80 | 80 | 80 | 80 |

octene may be used. This is because butylene, hexene, and octene can be produced by polymerization of ethylene as a biomass-derived raw material. In addition, when such an α-olefin is contained, the polyethylene obtained by the polymerization has an alkyl group as a branched structure. This allows it to have more flexibility than a simple linear polyethylene.

By using an ethylene as a biomass-derived raw material, it is theoretically possible to produce a polyethylene from 100% biomass-derived components.

The biomass-derived ethylene concentration in the polyethylene (hereinafter may also referred to as "biomass degree") is a value obtained by measuring the biomass-derived carbon content by radioactive carbon (C14) measurement. It is known that, since carbon dioxide in the atmosphere contains some C14 (105.5 pMC), the C14 content in plants that grow by taking in carbon dioxide in the atmosphere, such as corn, is also about 105.5 pMC. It is also known that fossil fuels contain almost no C14. Therefore, the proportion of biomass-derived carbon can be calculated by measuring the proportion of C14 in all the carbon atoms in polyethylene. In the tenth embodiment, the content P bio of biomass-derived carbon can be determined as follows, where P C14 is the content of C14 in polyethylene.

$$P\ bio\ (\%) = P\ C14/105.5 \times 100$$

In the tenth embodiment, theoretically, if the raw material of polyethylene is completely biomass-derived ethylene, the biomass-derived ethylene concentration is 100%, and the biomass degree of the biomass-derived polyethylene is 100. The concentration of biomass-derived ethylene in a fossil fuel-derived polyethylene produced only from a fossil fuel-derived raw material is 0%, and the biomass degree of the fossil fuel-derived polyethylene is 0.

In the tenth embodiment, the biomass-derived polyethylene and the decorative sheet containing the polyethylene need not have a biomass degree of 100.

In the tenth embodiment, the polymerization method of the biomass-derived ethylene-containing monomers is not particularly limited, and a conventionally known method can be used. The polymerization temperature and polymerization pressure should be adjusted as appropriate according to the polymerization method and polymerization device. The polymerization device is also not particularly limited, and a conventionally known device can be used. An example of a method for polymerizing ethylene-containing monomers will now be described.

The polymerization method for an ethylene polymer or a copolymer of ethylene and α-olefin can be selected as appropriate depending on the type of polyethylene desired, for example, the difference in density and branching, such as high-density polyethylene (HDPE), medium-density polyethylene (MDPE), low-density polyethylene (LDPE), and linear low-density polyethylene (LLDPE). For example, the polymerization is preferably performed using a multi-site catalyst, such as a Ziegler-Natta catalyst, or a single-site catalyst, such as a metallocene catalyst, as the polymerization catalyst by one of gas phase polymerization, slurry polymerization, solution polymerization, and high pressure ion polymerization, and in one or more stages.

An ethylene polymer or an ethylene/α-olefin copolymer may be used alone as the biomass-derived polyethylene, or two or more of them may be used in combination.

(Resin Composition Containing Biomass-Derived Polyethylene)

In the tenth embodiment, the resin composition contains the above-described polyethylene as a main component. The resin composition contains biomass-derived ethylene in an amount of 5% by mass or more, preferably 5 to 95% by mass, more preferably 25 to 75% by mass, relative to the total amount of the resin composition. When the concentration of biomass-derived ethylene in the resin composition is 5% by mass or more, it is possible to reduce the amount of fossil fuel used compared to conventional methods, and a carbon-neutral decorative sheet can be achieved.

The above resin composition may contain two or more polyethylenes having different biomass degrees. In this case, the concentration of biomass-derived ethylene in the resin composition as a whole needs to be within the above range.

The above resin composition may further contain a fossil fuel-derived polyethylene obtained by polymerizing a monomer containing a fossil fuel-derived ethylene and at least one of a fossil fuel-derived ethylene and α-olefin. That is, in the tenth embodiment, the resin composition may be a mixture of biomass-derived polyethylene and fossil fuel-derived polyethylene. The mixing method is not particularly limited, and a known mixing method can be used. For example, dry blending or melt blending may be used.

According to the tenth embodiment, the resin composition contains biomass-derived polyethylene in an amount of 5% by mass or more, preferably 5 to 95% by mass, more preferably 25 to 75% by mass. The resin composition may contain a mixture of biomass-derived polyethylene and, for example, fossil fuel-derived polyethylene. The concentration of biomass-derived ethylene should again be 5% by mass or more, preferably 5 to 95% by mass, more preferably 25 to 75% by mass when such a mixture is used.

Various additives other than polyethylene, which is the main component, may be added to the resin composition produced in the production process of the resin composition as long as the characteristics thereof are not impaired. Examples of additives include plasticizers, ultraviolet stabilizers, anti-coloring agents, matting agents, deodorants, flame retardants, anti-weathering agents, antistatic agents, yarn friction reducing agents, slip agents, release agents, antioxidants, ion exchange agents, and color pigments. These additives are added in an amount of preferably 1 to 20% by mass, preferably 1 to 10% by mass, relative to the total amount of the resin composition.

(Inorganic Substance)

The colored substrate layer 2 contains an inorganic substance, and the specific gravity of the colored substrate layer 2 is 0.97 or higher and 1.5 or lower.

The inorganic substance may be, for example, one or more of calcium carbonate, titanium oxide, carbon black, silica, chromium, antimony, a titanium composite, and other oxides.

As described above, the colored substrate layer 2 contains biomass-derived ethylene in an amount of 5% by mass or more, preferably 5 to 90% by mass, more preferably 25 to 75% by mass, most preferably 40 to 75% by mass relative to the total amount of the colored substrate layer 2. When the concentration of biomass-derived ethylene in the colored substrate layer 2 is 5% by mass or more, it is possible to reduce the amount of fossil fuel used compared to conventional methods, and a carbon-neutral decorative sheet can be achieved.

Further, the inorganic substance is added to the colored substrate layer 2 so that it has a specific gravity of 0.97 or higher and 1.5 or lower. By adding the inorganic substance to the colored substrate layer 2 so that it has a specific gravity of 0.97 or higher and 1.5 or lower, the concealing properties of the colored substrate layer 2 can be improved.

The biomass-derived polyethylene contained in the colored substrate layer 2 may contain biomass-derived high-density polyethylene and biomass-derived low-density polyethylene, biomass-derived high-density polyethylene and fossil fuel-derived polyethylene, or fossil fuel-derived high-density polyethylene and biomass-derived low-density polyethylene. The biomass degree of the colored substrate layer 2 as a whole may be in the range of 10% or higher and 90% or lower.

Biomass-derived high-density polyethylene is polyethylene having a density greater than 0.94. Biomass-derived low-density polyethylene is polyethylene having a density of 0.94 or less.

The colored substrate layer 2 preferably contains, as the biomass-derived polyethylene, one that is obtained by blending biomass-derived high-density polyethylene and low-density polyethylene (either biomass-derived or fossil fuel-derived) at a ratio within the range of 95:5 to 70:30, respectively. When the content of the low-density polyethylene is low, the film formation becomes unstable, and when the content of the low-density polyethylene is high, the product becomes too soft.

The production method of the colored substrate layer 2 is not particularly limited, and a known production method can be used. In the tenth embodiment, preferably calendaring is used.

In addition, the colored substrate layer 2 may have added thereto, for example, one or more additives selected from various additives such as a colorant, a filler, an ultraviolet absorber, a light stabilizer, a heat stabilizer, an antioxidant, an antistatic agent, a lubricant, a flame retardant, an anti-bacterial agent, an antifungal agent, an antifriction agent, a light scattering agent and a gloss adjusting agent, according to need.

The thickness of the colored substrate layer 2 is preferably in the range of 40 [μm] or more and 200 [μm] or less, more preferably in the range of 51 [μm] or more and 200 [μm] or less, and even more preferably in the range of 55 [μm] or more and 100 [μm] or less. This is because, when the thickness of the colored substrate layer 2 is 40 [μm] or more, it can absorb irregularities or bumps on the underlying floor material or the like, which improves the finish of the decorative sheet 1. When the thickness of the colored substrate layer 2 is 200 [μm] or less, the manufacturing cost of the decorative sheet 1 can be reduced without forming the colored substrate layer 2 thicker than necessary.

Although the biomass-derived resin forming the colored substrate layer 2 was a biomass-derived polyethylene in the tenth embodiment, the present invention is not limited to this. For example, biomass-derived polypropylene, biomass-derived polybutylene, or the like may be used instead of the biomass-derived polyethylene described above. That is, in the tenth embodiment, a wide range of biomass-derived polyolefins can be used as the biomass-derived resin forming the colored substrate layer 2.

<Pattern Layer>

The pattern layer 3 is laminated on one side (the upper side in the FIGURE) of the colored substrate layer 2, and is a layer for adding a pattern for imparting design. The design layer 3 may be replaced with the coloring of the colored substrate layer 2, in which case the design layer 3 may be omitted.

The pattern layer 3 is formed using printing ink, a paint, or the like. The printing ink, paint, or the like forming the pattern layer 3 is formed by, for example, dissolving or dispersing a colorant such as a dye or pigment in a suitable diluent solvent together with a suitable binder resin.

The printing ink, paint, or the like forming the pattern layer 3 may be applied, for example, by using a printing method such as gravure printing or offset printing, or a coating method such as gravure coating or roll coating.

Examples of binder resins that can be used include, but are not limited to, urethane-based resins, acrylic resins, vinyl chloride-acetate resins, polyimide-based resins, nitrocellulose, or a mixture of these.

Any pattern may be used as the pattern, including, for example, a wood grain pattern, stone grain pattern, fabric grain pattern, abstract pattern, geometric pattern, characters, symbols, solid color, or a combination of two or more of these patterns. In addition, in order to improve the concealing properties of the decorative sheet 1, a concealing layer may be provided between the pattern layer 3 and the colored substrate layer 2. The concealing layer may be formed, for example, using opaque printing ink or paint containing a large amount of opaque pigment such as titanium dioxide or iron oxide.

The thickness of the pattern layer 3 is preferably within the range of 1 [μm] or more and 10 [μm] or less. This is because when the pattern layer 3 has a thickness of 1 [μm] or more, clear printing is possible. When the thickness of the pattern layer 3 is 10 [μm] or less, the printing process in manufacturing the decorative sheet 1 can be facilitated, and the manufacturing cost can be reduced.

In addition, in order to impart various functions, for example, functional additives such as an extender, a plasticizer, a dispersant, a surfactant, a tackifier, an adhesion aid, a desiccant, a curing agent, a curing accelerator, and a curing retarder may be added to the pattern layer 3.

The pattern layer 3 may include, for example, a solid colored substrate layer for hiding the color and pattern of a base to which the decorative sheet 1 is attached, and a pattern layer for adding a pattern for imparting the designability.

<Surface Protection Layer>

The surface protection layer 6 is laminated on one side (the upper side in the FIGURE) of the pattern layer 3 in order to provide the decorative sheet 1 with weather resistance, scratch resistance, stain resistance, design, or the like.

The surface protection layer 6 may be formed using, for example, an acrylic resin composition.

The surface protection layer 6 may contain various additives including a weather resistant agent, a plasticizer, a stabilizer, a filler, a dispersant, a colorant such as a dye or a pigment, a solvent, an ultraviolet absorber, a heat stabilizer, a light stabilizer, an anti-blocking agent, a catalyst scavenger, a colorant, a light scattering agent and a gloss adjusting agent, according to need. Furthermore, functional additives, such as an antimicrobial agent and an antifungal agent, for example, may be added to the surface protection layer 6 as needed.

<Primer Layer>

The primer layer 8 is a layer serving as an underlying base for improving adhesion and corrosion resistance of the colored substrate layer 2 and the substrate 9.

The primer layer 8 is laminated on the other side (the lower side in the FIGURE) of the colored substrate layer 2.

The primer layer 8 is formed using, for example, a polyester-based resin, an organic additive, a pigment, and the like.

An anticorrosion pigment may be added to the primer layer 8 to improve corrosion resistance.

The thickness of the primer layer 8 may be, for example, in the range of 1 [μm] or more and 10 [μm] or less.

<Specific Gravity of Decorative Sheet as a Whole>

The overall specific gravity of the decorative sheet 1 is preferably 0.97 or higher and 1.5 or lower. More preferably, the specific gravity is in the range of 0.99 or higher and 1.4 or lower. By doing so, for example, it is possible to form a decorative sheet 1 having concealing properties equivalent to that of a structure formed using a fossil fuel-derived polyethylene or the like.

<Total Thickness of Decorative Sheet>

The thickness of the decorative sheet 1 as a whole is preferably within the range of 50 [μm] or more and 200 [μm] or less. More preferably, it is in the range of 70 [μm] or more and 150 [μm] or less. By doing so, for example, it is possible to form a decorative sheet 1 having concealing properties equivalent to that of a structure formed using a fossil fuel-derived polyethylene or the like.

The embodiment described above is an example of the present invention, and the present invention is not limited to the embodiment described above. Various modifications can be made according to a design and the like without departing from the technical idea of the present invention.

Effects of Tenth Embodiment

The decorative sheet 1 of the tenth embodiment achieves the effects described below.

(1) The colored substrate layer 2 is a resin layer formed of a resin composition containing 5% by mass or more of biomass-derived ethylene, and also an inorganic substance is added thereto. The specific gravity of the colored substrate layer 2 is 0.97 or higher and 1.5 or lower.

Therefore, even when a biomass-derived polyethylene, which is a plant-derived material, is used, a colored substrate layer 2 can be formed that has concealing properties equivalent to that of a structure formed using, for example, fossil fuel-derived polyethylene.

As a result, a decorative sheet 1 capable of suppressing a decrease in concealing performance can be provided even when it is formed using a biomass-derived polyethylene, which is a plant-derived material.

In addition, since it is possible to provide the colored substrate layer 2 with concealing properties by adding an inorganic substance without forming a separate layer for concealing, a single-layer decorative sheet can be obtained. Therefore, it is possible to reduce the amount of resin compared to conventional multi-layered concealing films, thereby contributing to the realization of a carbon-neutral society.

(2) The colored substrate layer 2 may contain, as the biomass-derived polyethylene, biomass-derived high-density polyethylene and biomass-derived low-density polyethylene.

This makes it possible to form a colored substrate layer 2 having more flexibility.

(3) The colored substrate layer 2 may contain, as the biomass-derived polyethylene, biomass-derived high-density polyethylene and biomass-derived low-density polyethylene, and the biomass degree may be in the range of 10% or higher and 90% or lower.

This makes it possible to form a colored substrate layer 2 having more flexibility.

The decorative material 10 of the tenth embodiment achieves the effect described below.

(4) The decorative material 10 includes the substrate 9 and the decorative sheet 1 laminated on at least one side thereof.

As a result, a decorative material 10 capable of suppressing a decrease in concealing performance can be provided even when it is formed using a biomass-derived polyethylene, which is a plant-derived material.

Eighth Example

The decorative materials of Examples 1 to 7 and Comparative Examples 1 to 3 will be described below with reference to the tenth embodiment.

Example 1

After applying corona discharge to one side of the substrate, a pattern layer printed with urethane-based printing ink and a surface protection layer containing an acrylic resin composition as a main component were laminated on that side of the substrate in this order. After applying corona discharge to the other side of the substrate, a primer layer (thickness: 1 to 2 [μm]) made of polyester urethane resin was formed on that other side of the substrate. A decorative sheet (total thickness: 110 [μm]) of Example 1 was thus obtained. The biomass degree of the decorative sheet was 70%. The decorative material can be obtained by bonding an MDF (medium density fiberboard) to the primer layer side of the decorative sheet using, for example, the adhesive BA-10L manufactured by Japan Coating Resin Corporation and the curing agent BA-11B manufactured by Japan Coating Resin Corporation.

In Example 1, a colored substrate layer (thickness: 100 [μm]) formed of a resin composition containing a biomass-derived high-density polyethylene ("green polyethylene" manufactured by Braskem) and biomass-derived low-density polyethylene, and to which an inorganic substance was added was used as the substrate. Calcium carbonate and titanium oxide were mixed as inorganic substances so that the colored substrate layer had a specific gravity of 1.1. The colored substrate layer was obtained by extrusion-laminating this resin. The biomass degree of the colored substrate layer thus formed is 70%.

Example 2

A decorative sheet was obtained in the same manner as in Example 1, except that titanium oxide was added as an inorganic substance so that the colored substrate layer had a specific gravity of 0.97.

Example 3

A decorative sheet was obtained in the same manner as in Example 1, except that titanium oxide was added as an inorganic substance so that the colored substrate layer had a specific gravity of 1.5.

Example 4

A decorative sheet was obtained in the same manner as in Example 1, except that silica was added as an inorganic substance so that the colored substrate layer had a specific gravity of 1.0.

Example 5

The decorative sheet of Example 5 was obtained in the same manner as in Example 1, except that the colored substrate layer was formed of a resin composition containing biomass-derived high-density polyethylene and fossil fuel-derived low-density polyethylene.

Example 6

A decorative sheet was obtained in the same manner as in Example 1, except that the decorative sheet had a total thickness of 45 [μm].

Example 7

A decorative sheet was obtained in the same manner as in Example 1, except that the decorative sheet had a total thickness of 210 [μm].

Comparative Example 1

A decorative sheet was obtained in the same manner as in Example 1, except that calcium carbonate and titanium oxide were added as the inorganic substances so that the colored substrate layer had a specific gravity of 0.96.

Comparative Example 2

A decorative sheet was obtained in the same manner as in Example 1, except that calcium carbonate was added as the inorganic substance so that the colored substrate layer had a specific gravity of 0.95.

Comparative Example 3

A decorative sheet was obtained in the same manner as in Example 1, except that calcium carbonate and titanium oxide were added as the inorganic substances so that the colored substrate layer had a specific gravity of 1.6.

(Performance Evaluation and Evaluation Results)

The decorative sheets of Examples 1 to 7 and Comparative Examples 1 to 3 were evaluated on "concealing performance", "productivity of colored thermoplastic resin layer (colored substrate layer)", "suitability for printing", and "processability". The evaluation was carried out as follows.

<Concealing Performance>

The decorative sheet was subjected to the concealing performance test described in JIS 6921, Wallpaper and wallcoverings for decorative finish.

The samples were rated according to the criteria for concealing performance of JIS 6921. In the table, "A" represents grade 4 samples, "B" represents grade 3 samples, "C" represents grade 2 samples, and "D" represents grade 1 samples.

<Productivity of Colored Thermoplastic Resin Layer>

The defectiveness of decorative sheets was evaluated by visually observing them to check their suitability for film formation including surface condition, the presence or absence of fish eyes, the presence or absence of variation in thickness, and the like. Samples with almost no defect were rated as "A", samples that were defective but not to an extent that there would be an effect in the production were rated as "B", and samples that were so defective that there would be an effect in the production was rated as "C". Samples were rated "B" when the number of defective spots was about 1 to 2 per square meter.

<Suitability for Printing>

The decorative sheets were visually observed to determine whether there was poor ink adhesion, whether thermal wrinkling was formed during drying, and the like. Samples were rated "A" when their suitability for printing was not inferior to that of the current decorative sheets, rated "B" when they were less suitable for printing but not to an extent that there would be an effect in the production, and rated "C" when there would be an effect in the production depending on conditions.

<Processability>

The decorative sheet was visually observed to determine whether there was any abnormality such as cracks when it was subjected to lapping. Samples with no abnormality were rated as "Good", samples in which abnormality was partially observed were rated as "Fair", and samples in which abnormality was observed all over them were rated as "Poor".

TABLE 14

| | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| Concealing performance | A | B | A | B | A | C | A | D | D | A |
| Specific gravity of colored thermoplastic resin layer | 1.1 | 0.97 | 1.5 | 1.0 | 1.1 | 1.1 | 1.1 | 0.96 | 0.95 | 1.6 |
| Inorganic substance | Calcium carbonate Titanium oxide | Calcium carbonate | Titanium oxide | Silica | Calcium carbonate Titanium oxide | Calcium carbonate Titanium oxide | Calcium carbonate Titanium oxide | Calcium carbonate | Titanium oxide | Calcium carbonate Titanium oxide |
| Productivity of colored thermoplastic resin layer | B | A | B | A | B | C | B | A | A | D |
| Suitability for printing | A | A | B | A | A | A | A | A | A | C |
| Processability | Good | Good | Good | Good | Good | Poor | Fair | Good | Good | Good |
| Total thickness | 110 μm | 110 μm | 110 μm | 110 μm | 110 μm | 45 μm | 210 μm | 110 μm | 110 μm | 110 μm |
| Biomass degree of decorative sheet | 70 | 70 | 70 | 70 | 70 | 70 | 70 | 70 | 70 | 70 |

Table 1 shows the evaluation results for various items obtained using the above methods. The decorative sheets of Examples 1 to 7 mostly exhibited good performance in all evaluation tests. In other words, it was confirmed that functions and effects similar to those of current decorative sheets can be obtained in concealing properties, productivity, and physical properties. On the other hand, the decorative sheets of Comparative Examples 1 to 3 exhibited insufficient performance in at least part of the evaluation tests.

[Reference Signs List] 1 . . . Decorative sheet; 2 . . . Colored substrate layer; 3 . . . Pattern layer; 4 . . . Adhesive layer; 5 . . . Transparent resin layer; 6 . . . Surface protection layer; 7 . . . Uneven part; 8 . . . Primer layer; 9 . . . Substrate; 10 . . . Decorative material.

What is claimed is:

1. A decorative sheet, comprising:

a colored substrate layer having a first surface and a second surface opposite the first surface; and a transparent resin layer laminated on the first surface of the colored substrate layer, wherein:

the transparent resin layer consists of a resin composition consisting of plant-derived high-density polyethylene; and a nucleating agent to the resin composition in an amount of 500 ppm or more and 2000 ppm or less relative to mass of the high-density polyethylene.

2. The decorative sheet of claim 1, wherein:

the nucleating agent is added to the high-density polyethylene in an amount of 1500 ppm or more and 2000 ppm or less relative to mass of the high-density polyethylene.

3. The decorative sheet of claim 1 comprising a primer layer laminated on the second surface of the colored substrate layer.

4. A decorative material, comprising:

a substrate having a first surface and a second surface opposite the first surface; and the decorative sheet of claim 1 laminated on at least one of the first and second surfaces of the substrate.

5. A decorative sheet, comprising:

a colored substrate layer having a first surface and a second surface opposite the first surface; and a transparent resin layer laminated on the first surface of the colored substrate layer, wherein:

the colored substrate layer is formed using a first resin composition 70 mass % to 95 mass % of a plant-derived high-density polyethylene and 5 mass % to 30 mass % of a low-density polyethylene;

the transparent resin layer consisting of a second resin composition consisting of a plant-derived high-density polyethylene and optionally a low-density polyethylene; and a nucleating agent is added to the second resin composition 500 ppm or more and 2000 ppm or less relative to mass of the high-density polyethylene, wherein an amount of the high-density polyethylene in the second resin composition is 60 mass % to 100 mass % and an amount of the low-density polyethylene in the second resin composition is from 0 mass % to 40 mass %.

6. The decorative sheet of claim 5, wherein:

the low-density polyethylene forming the colored substrate layer is plant-derived low-density polyethylene.

7. The decorative sheet of claim 5, wherein:

the low-density in the second resin composition is a plant-derived low-density polyethylene.

8. The decorative sheet of claim 7, wherein:

a ratio at which the high-density polyethylene and the low-density polyethylene are mixed in the transparent resin layer is within the range of 80:20 to 60:40, respectively.

9. The decorative sheet of claim 5, wherein:

the nucleating agent is added to the high-density polyethylene in an amount of 1500 ppm or more and 2000 ppm or less relative to the mass of the high-density polyethylene.

10. The decorative sheet of claim 5 comprising a primer layer laminated on the second surface of the colored substrate layer.

11. A decorative material, comprising:

a substrate having a first surface and a second surface opposite the first surface; and the decorative sheet of claim 5 laminated on at least one of the first and second surfaces of the substrate.

* * * * *